(12) United States Patent
Shioda et al.

(10) Patent No.: US 6,853,847 B2
(45) Date of Patent: Feb. 8, 2005

(54) METHOD AND APPARATUS FOR POSITIONING A MOBILE STATION

(75) Inventors: Takehiko Shioda, Tsurugashima (JP); Manabu Nohara, Tsurugashima (JP)

(73) Assignee: Pioneer Corporation, Tokyo (JP)

(*) Notice: Subject to any disclaimer, the term of this patent is extended or adjusted under 35 U.S.C. 154(b) by 499 days.

(21) Appl. No.: 10/105,938

(22) Filed: Mar. 26, 2002

(65) Prior Publication Data

US 2002/0183071 A1 Dec. 5, 2002

(30) Foreign Application Priority Data

Mar. 27, 2001 (JP) .......................................... 2001-90928

(51) Int. Cl.$^7$ ................................................. H04Q 7/20
(52) U.S. Cl. ................................ 455/456.1; 455/456.5; 455/561; 342/450; 342/457; 342/463; 342/126; 342/146; 342/148
(58) Field of Search .................. 455/414.2, 456.1–457, 455/550.1, 561, 357.11, 509.4–6; 342/457, 450, 463, 126, 146, 148

(56) References Cited

U.S. PATENT DOCUMENTS

| | | | | |
|---|---|---|---|---|
| 6,026,304 A | * | 2/2000 | Hilsenrath et al. | 455/456.2 |
| 6,070,079 A | * | 5/2000 | Kuwahara | 455/456.2 |
| 6,466,565 B1 | * | 10/2002 | Wax et al. | 370/342 |
| 6,492,944 B1 | * | 12/2002 | Stilp | 342/387 |
| 6,707,422 B2 | * | 3/2004 | Sheynblat et al. | 342/357.12 |
| 2002/0151314 A1 | * | 10/2002 | Nohara | 455/456 |
| 2003/0114170 A1 | * | 6/2003 | Rick et al. | 455/456 |
| 2004/0157621 A1 | * | 8/2004 | Yamasaki et al. | 455/456.1 |

* cited by examiner

*Primary Examiner*—William Trost
*Assistant Examiner*—Marcos L. Torres
(74) *Attorney, Agent, or Firm*—McGinn & Gibb, PLLC

(57) ABSTRACT

A positioning apparatus and method for accurately determining a current position of a mobile station. The current position of the mobile station is determined utilizing radio waves arriving from a plurality of base stations installed in a communication area. For calculating a propagation range of a radio wave arriving from each base station, error correction processing is performed using a predetermined error correction coefficient previously calculated by measuring a radio wave propagation situation around each base station to estimate a propagation range of a direct wave within incoming radio waves. The current position of the mobile station is determined using the estimated propagation range and the positions of the respective base station.

28 Claims, 27 Drawing Sheets

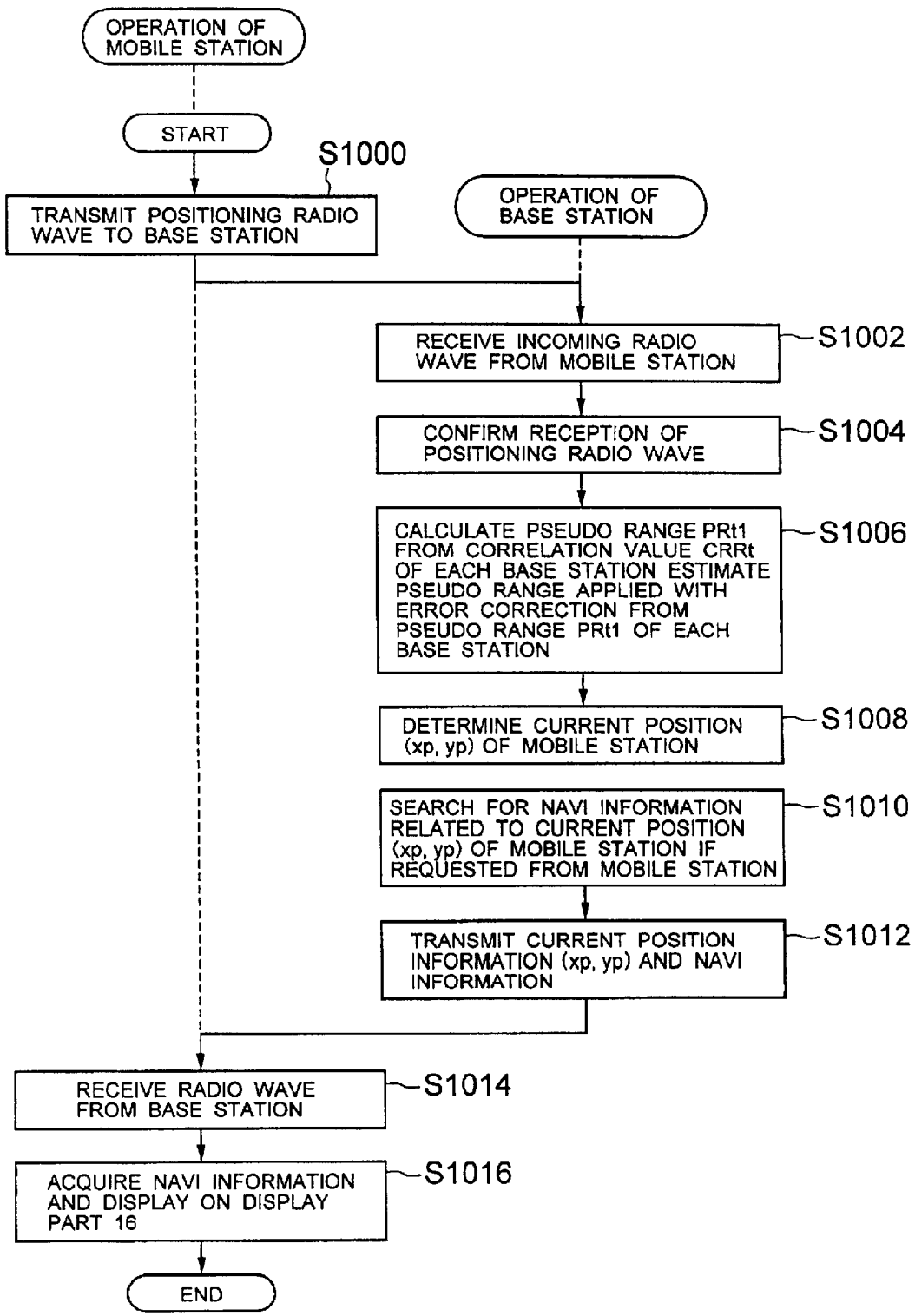

METHOD AND APPARATUS FOR POSITIONING A MOBILE STATION

BACKGROUND OF THE INVENTION

1. Field of the Invention

The present invention generally relates to a communications system which utilizes radio communications, and more particularly, to positioning method and apparatus for detecting the position of a mobile station such as a portable telephone.

2. Description of Related Art

In recent years, communications systems utilizing radio communications have been rapidly popularizing, and further progress is expected, for example, in such fields as mobile communications systems such as portable telephones and pagers, navigation systems for detecting the position of a moving person or vehicle, and the like.

For promoting the further progress of such communications systems, the development is desired for a positioning apparatus which is capable of accurately determining the position of a mobile station such as a movable portable telephone, navigation apparatus and the like, establishing a stable communication state between a base station and the mobile station based on the positioning result, and supporting widely diversified mobile communications systems and navigation systems.

As a positioning method for use in a conventional positioning apparatus, a positioning system in a mobile communications system in accordance with a code division multiple access scheme (hereinafter simply called the "CDMA scheme") is known.

In this positioning method, as illustrated in FIG. 1, a mobile station P, which is a mobile radio terminal such as a portable telephone, receives radio waves transmitted from a plurality of base stations, for example, A, B, C installed in a communication area of the communications system. The propagation ranges of the radio waves are calculated from propagation times of the respective radio waves taken to arrive at the mobile station P from the respective base stations A, B, C. Then, the position of the mobile station P is detected by an analysis, to which the triangulation is applied, based on known position information of the respective base stations.

Describing more specifically a procedure of the conventional positioning system, the mobile station P is provided with a positioning apparatus which comprises a receiving part 1, and a range measureing part 6 and a position calculating part 7 connected to the receiving part 1, as illustrated in FIG. 2.

Specifically, in the mobile station P which comprises the receiving part 1, transmitting part 2, high frequency signal processing part (RF part) 3 and transmission/reception antenna ANT for performing radio communications with a base station, as the antenna ANT receives incoming radio waves from the respective base stations A, B, C, the high frequency signal processing part 3 converts the frequency of the received signal recovered from the radio waves. Subsequently, the downconverted signal is converted to digital data Dd which is further passed through a roll off filter 4, and despread in a demodulator 5 to generate received data Drx. Then, the position measureing part 6 and position calculating part 7 provided in the mobile station P performs the aforementioned triangulation-based analysis using Dd which is the output of the roll off filter 4, and Drx which is the output of the demodulator 5, to detect the current position of the mobile station P.

The range measureing part 6 illustrated in FIG. 2 is provided with a correlator 8 and a range calculating part 9, as illustrated in FIG. 3. The correlator 8 calculates correlation values between correlation data DA, DB, DC correlated to incoming radio waves from the respective base stations A, B, C, and Dd which the output of the roll off filter 4, respectively. The range calculating part 9 in turn analyzes the correlation values CRRA, CRRB, CRRC calculated by the correlation calculation to derive propagation ranges LA, LB, LC of the respective incoming radio waves.

Specifically, as illustrated in FIGS. 4A through 4C, as the correlator 8 calculates correlation values CRRA, CRRB, CRRC corresponding to the incoming radio waves from the respective base stations A, B, C, the range calculating part 9 compares these correlation values with a predetermined threshold value THC to detect a peak value of each correlation value. Subsequently, the range calculating part 9 calculates delay times tA, tB, tC to the detection of the respective peak values. Then, regarding these delay times as propagation times of the radio waves arriving from the respective base stations, the range calculating part 9 converts the delay times to propagation ranges to derive the propagation ranges LA, LB, LC of the respective incoming radio waves.

The position calculating part 7 performs the aforementioned triangulation-based analysis using the propagation ranges LA, LB, LC to find the current position of the mobile station P. Specifically, each of the base stations A, B, C is to transmit position information of each base station (the latitude and longitude at which each base station exists) on a transmitted radio wave. Therefore, in a communication between the mobile station P and each base station, the position calculating part 7 extracts the position information of each base station from received data Drx, and performs the triangulation-based analysis using the position information and the aforementioned propagation ranges LA, LB, LC to find position data Dp indicative of the current position of the mobile station P.

However, the foregoing conventional positioning method has a problem in that it is affected by so-called multipath fading and noise to degrade the positioning accuracy, and that it encounters difficulties in improving the positioning accuracy due to its susceptibility to such external factors.

For giving a specific example in explaining this problem, reference is made to FIG. 5. Specifically, suppose that an obstacle BL1 such as a building exists between the base station A and the mobile station P, causing a reduction in the level of direct wave emitted from the base station A to the mobile station P. Suppose further that the direct wave from the base station A is reflected by reflecting objects BL2, BL3 such as buildings, so that they arrive at the mobile station P as so-called multipath waves.

In this case, as illustrated in FIG. 6A, a plurality of peaks appear due to the direct wave and multipath waves in a correlation value CRRA which is the output of the correlator 8 in the range measureing part 6 of the mobile station P. Then, if the plurality of peak values appear as larger values than the predetermined threshold value THD, it is impossible to determine which peak is attributable to the direct wave. For this reason, the conventional positioning method has a problem in that it could erroneously determine a peak of the correlation value caused by a multipath wave as a peak attributable to the direct wave.

Also, due to the influence of the obstacle BL1, the level of the direct wave arriving at the mobile station P becomes relatively lower, as compared with the level of the multipath waves, so that the peak value attributable to the direct wave is lower than the threshold value THD, and the peak value attributable to the multipath wave exceeding the threshold value THD. In this case, a problem arises that the range calculating part 9 in the range measureing part 6 could determine that a delay tAe to the appearance of the peak due to the multipath wave is attributable to the direct wave, as illustrated in FIG. 6B.

Further, the situation as illustrated in FIGS. 6A, 6B can be encountered, in addition to the influence of the multipath waves, when the mobile station receives noise correlated to correlation data DA corresponding to the base station A, and a peak appears in a correlation value CRRA due to the nose, causing difficulties in distinguishing the direct wave from such noise.

When the propagation range LAe calculated from the position tAe at which a peak of a correlation value appears due to the multipath waves or noise is erroneously determined as the range from the base station A, a position Pe deviated from the essential position (true position) of the mobile station P is determined as the current position of the mobile station, as illustrated in FIG. 7, resulting in a degraded positioning accuracy.

While the foregoing exemplary case has been described for the case where a direct wave from the base station A cannot be accurately detected, it is possible in an actual operation that a direct wave cannot be accurately detected due to disturbance such as multipath waves for the remaining base stations B, C. This makes an improvement in positioning accuracy more difficult.

Specifically, the positions of the base stations A, B, C are known, so that if the propagation ranges LA, LB, LC of direct waves from the respective base stations can be accurately detected, the true position of the base station P can be determined by drawing three circles centered at the centers of the respective base stations A, B, C and having radii equal to the propagation ranges LA, LB, LC of direct waves from the respective base stations, using the triangulation, and finding a point at which the three circles intersect. However, under an actual communication environment in which detected range values from the base stations A, B, C to the mobile station P include randomly varying errors due to the influence of multipath fading and noise, the conventional positioning method could erroneously recognize a variety of positions within a hatched region shown in FIG. 7 as the current position of the mobile station

OBJECT AND SUMMARY OF THE INVENTION

The present invention has been made in view of those problems inherent in the prior art, and it is an object of the invention to provide a positioning apparatus which is capable of more accurately positioning a mobile station.

To achieve the above object, a positioning apparatus, a positioning method and a positioning system according to the present invention are configured to determine a current position of a mobile station located in a communication area utilizing radio waves arriving from a plurality of base stations installed in the communication area, and involve receiving radio waves arriving from the plurality of base stations to generate a received signal in accordance with each received radio wave, extracting at least one or more direct wave candidate for each base station from the respective radio waves arriving from the plurality of base stations based on the received signals, performing predetermined error correction processing on an extracted direct wave candidate to estimate at least one or more corrected direct wave candidate, deriving a received signal corresponding to a true direct wave using at least one or more direct wave candidate for each base station within the extracted and estimated direct wave candidates and corrected direct wave candidate, and determining the current position of the mobile station based on the received signal corresponding to the derived true direct wave.

Also, to achieve the above object, a positioning apparatus, a positioning method and a positioning system according to the present invention are configured to determine a current position of a mobile station utilizing a radio wave arriving at a plurality of base stations installed in the communication area from the mobile station, and involve receiving a radio wave arriving from the mobile station to generate a received signal in accordance with each received radio wave in each of the plurality of base stations, extracting at least one or more direct wave candidate for each base station from each radio wave arriving at each of the plurality of base stations based on the received signal, performing predetermined error correction processing on the extracted direct wave candidate to estimate at least one or more corrected direct wave candidate, deriving a received signal corresponding to a true direct wave using at least one or more direct wave candidate for each base station within the extracted and estimated direct wave candidates and corrected direct wave candidate, and determining the current position of the mobile station based on the received signal corresponding to the derived true direct wave.

BRIEF DESCRIPTION OF THE DRAWINGS

FIG. 27 is a flow chart for explaining the operation in the third embodiment.

DETAILED DESCRIPTION OF THE EMBODIMENTS

In the following, a first embodiment of the present invention will be described.

Figure 8:
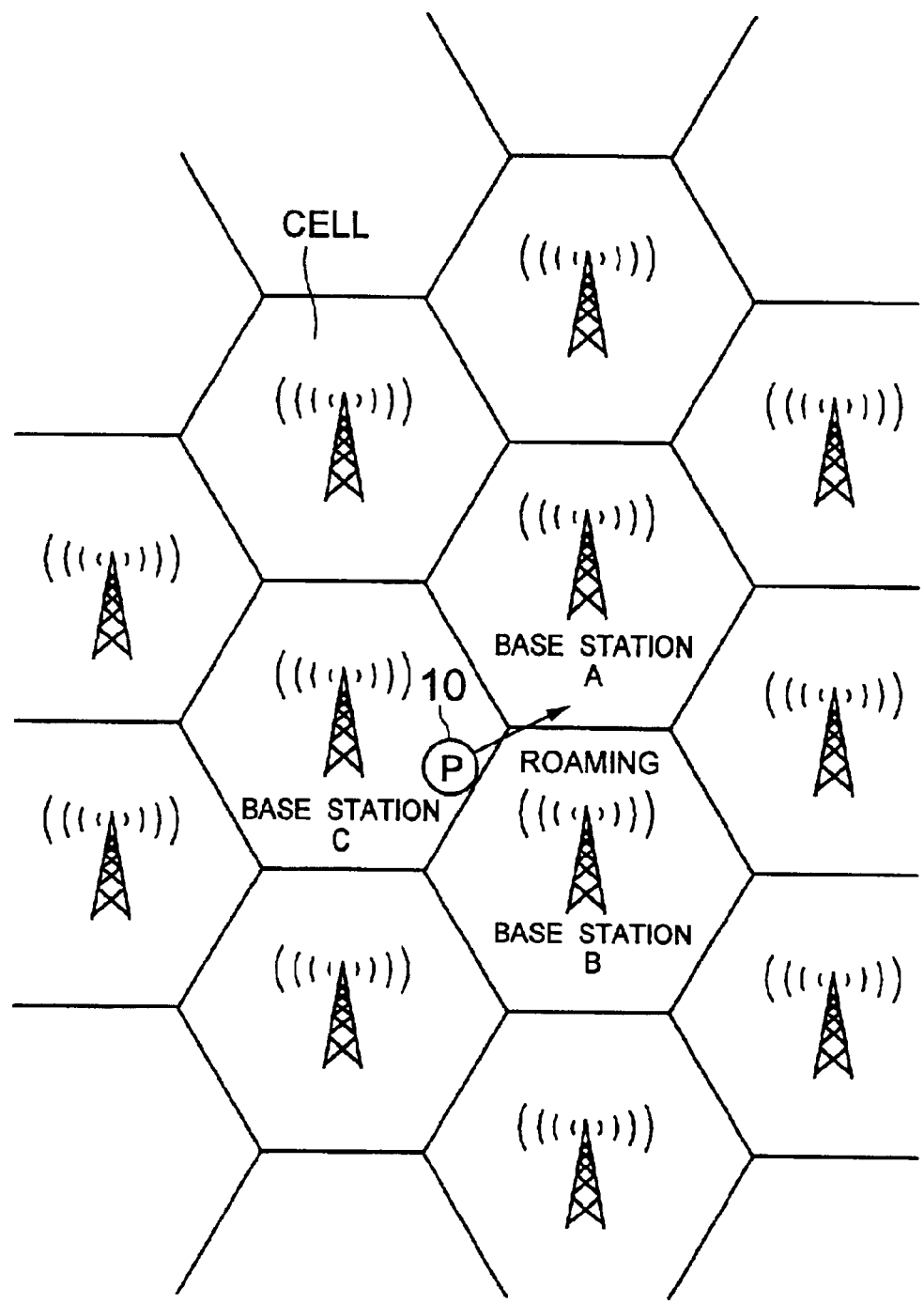
FIG. 8 is an explanatory diagram schematically illustrating the configuration of cells in a communication area.

FIG. 8 is a diagram schematically representing the general configuration of a mobile communications system which utilizes a broadband CDMA (Code Division Multiple Access) scheme, one type of spread spectrum (SS) scheme, wherein a hexagonal cell based zone organization method is shown as one example. For reference, a zone refers to an area in which radio waves from a base station can reach, and the zone organization method refers to a method which involves assigning a plurality of predetermined frequencies to base stations in respective zones and relying on the zones to closely cover a whole communication service area.

Specifically, in the mobile communications system according to the first embodiment, the communication area has been previously partitioned into a plurality of hexagonal zones called "cells." A base station is installed in each cell, and is designed such that each cell extends over a range in which radio waves can reach from each base station. In addition, the range in which radio waves can reach is overlapped in adjacent cells to obviate a communication disabled area from occurring.

As a mobile station 10 such as a portable telephone, a navigation apparatus or the like roams within the communication area illustrated in FIG. 8 together with its user, the mobile station 10 communicates with base stations, for example, A, B, C which are located around the mobile station 10.

Figure 9:
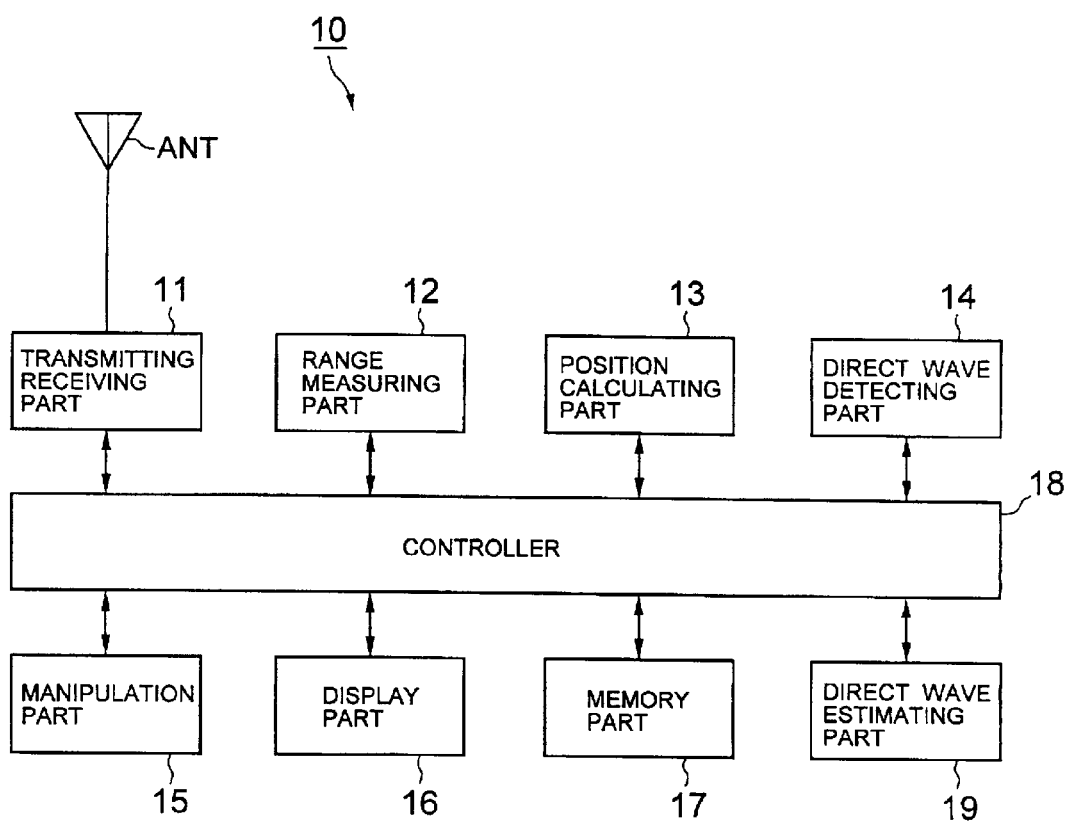
FIG. 9 is a block diagram illustrating the configuration of a main portion of a mobile station in a first embodiment according to the first embodiment.
Figure 10:
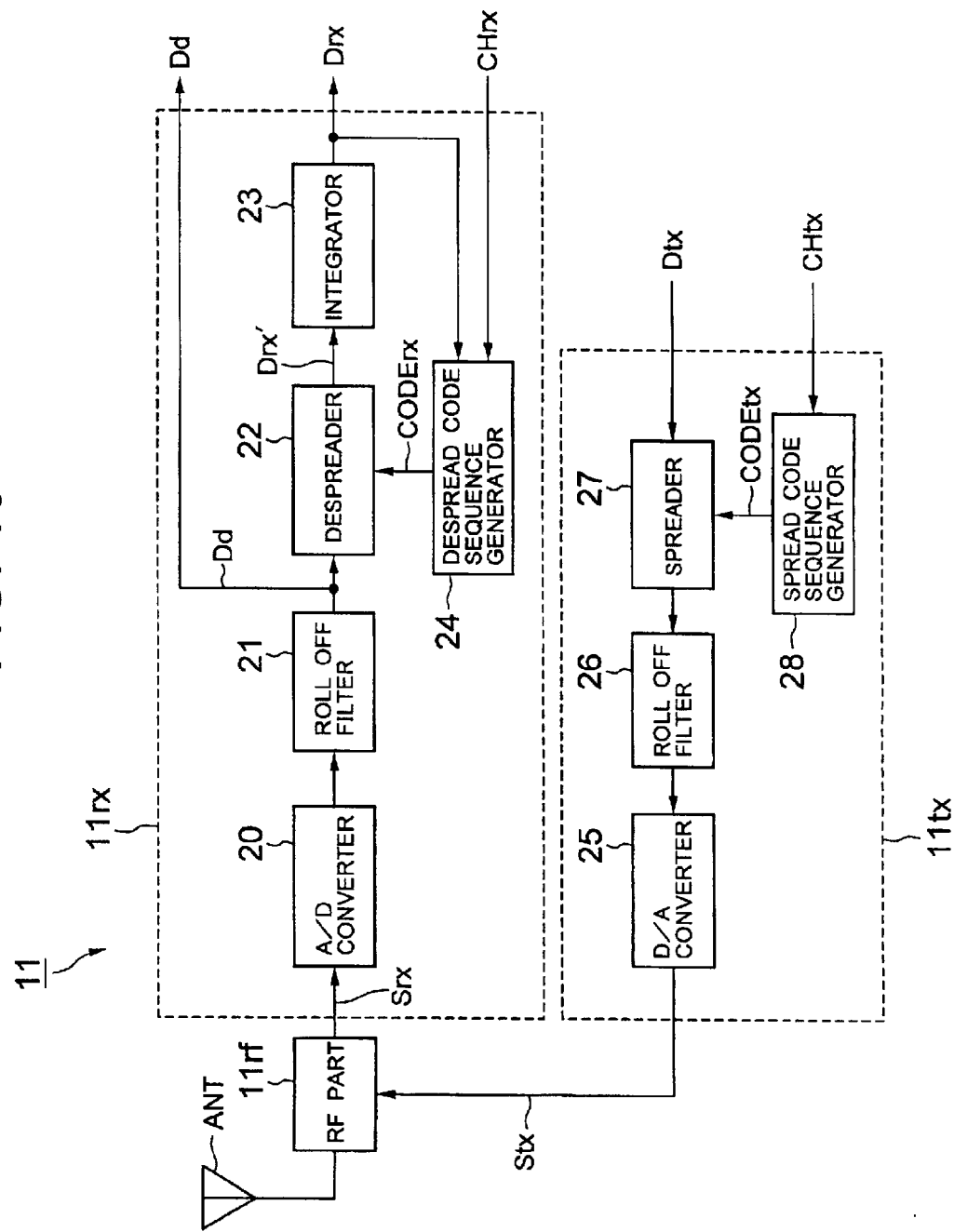
FIG. 10 is a block diagram illustrating the configuration of a transmitting/receiving part provided in a mobile station.
Figure 11:
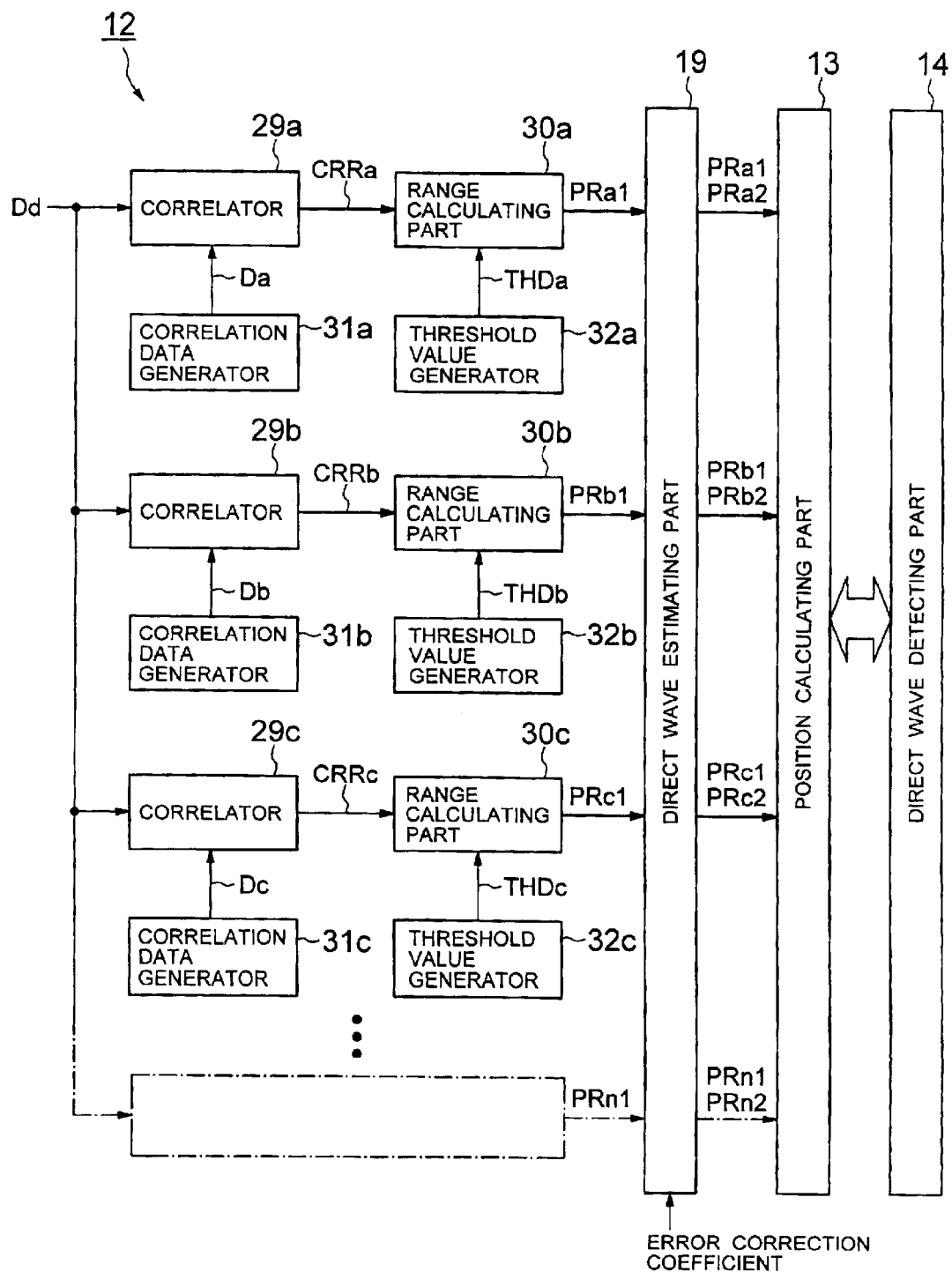
FIG. 11 is a block diagram illustrating the configuration of a range measureing part, a direct wave estimating part, a position calculating part, and a direct wave detecting part provided in the mobile station.

FIG. 9 is a block diagram illustrating the configuration of a main portion of a positioning apparatus provided in the mobile station 10. FIG. 10 in turn is a block diagram illustrating the configuration of a transmitting/receiving part 11 in FIG. 9, and FIG. 11 is a block diagram illustrating the configuration of a range measureing part 12, a direct wave estimating part 19, a position calculating part 13, and a direct wave detecting part 14 in FIG. 9.

In the following description, the positioning apparatus provided in the mobile station 10 is designated the same reference numeral as the mobile station 10, and is described as the positioning apparatus 10.

In FIG. 9, the positioning apparatus 10 comprises a transmission/reception antenna ANT; the transmitting/receiving part 11; the range measureing part 12; the position calculating part 13; the direct wave detecting part 14; a manipulation part 15; a display part 16; a memory part 17; a controller 18; and the direct wave estimating part 19. The manipulation part 15 comprises a plurality of manipulation keys such as push button switches, numeral keys and the like, while the display part 16 is comprised of a liquid crystal display and a plurality of LEDs. The memory part 17 comprises memory devices such as ROM, RAM and other non-volatile memory devices, and the controller 18 mainly comprises a control device such as a $\mu$CPU and governs functions of controlling the overall operation of the positioning apparatus 10.

In the following, a main portion constituting the positioning apparatus 10 illustrated in FIG. 9 will be described.

First, the transmitting/receiving part 11 comprises a receiver section 11$rx$ for receiving an incoming reception radio wave from a base station through the antenna ANT and a high frequency signal processing part 11$rf$; and a transmitter section 11$tx$ for transmitting a transmission radio wave to a base station through the high frequency signal processing part 11$rf$ and antenna ANT.

The receiver section 11$rx$ further comprises an A/D converter 20, a roll off filter 21, a despreader 22, an integrator 23, and a despread code sequence generator 24. The transmitter section 11$tx$ further comprises a D/A converter 25, a roll off filter 26, a spreader 27, and a spread code sequence generator 28.

For receiving a received radio wave arriving from a base station, the antenna ANT receives the incoming radio wave, and the high frequency signal processing part 11$rf$ down-converts the resulting received radio wave. Then, the down-converted radio wave is supplied to the receiver section 11$rx$ as a received signal Srx. In the receiver section 11$rx$, the A/D converter 20 converts the received signal Srx to digital data which is passed through the roll off filter 21 and despread by the despreader 22. Subsequently, the resulting despread data Drx' is digitally integrated by the integrator 23 to reproduce received data Drx sent from the base station.

In the aforementioned despread processing, the despread code sequence generator 24 generates a despread code sequence CODErx corresponding to a specified base station in accordance with base station specifying data CHrx supplied from the controller 18. Then, the despreader 22 correlates the despread code sequence CODErx to output data Dd of the roll off filter 21 to generate the despread data Drx'.

The despread code sequence generator 24 further senses the state of the received data Drx output from the integrator 23, and performs processing such as a fine adjustment of the phase of the despread code sequence CODErx within a so-called chip duration in accordance with the sensed state to conduct a feedback control to generate favorable received data Drx. The chip duration refers to a time width of a minimum unit rectangular wave which constitutes the despread code sequence CODErx.

On the other hand, for transmitting data from the positioning apparatus 10 to a base station, the spreader 27 spreads transmission data Dtx supplied from the controller 18 to perform a so-called CDM (Code Division Multiplexing) modulation (hereinafter simply called the "CDM modulation"). Then, the modulated signal is passed through the roll off filter 26, and converted to an analog transmission signal Stx by the D/A converter 25. Subsequently, the transmission signal Stx is upconverted to a predetermined frequency band in the high frequency signal processing part 11rf, and transmitted through the antenna ANT to a base station as a transmission radio wave.

In the spreading processing, the spread code sequence generator 28 generates a spread code sequence CODEtx corresponding to a destination base station in accordance with base station specifying data CHtx supplied from the controller 18. Then, the spreader 27 correlates the spread code sequence CODEtx to transmission data Dtx, thereby performing the CDM modulation to generate the aforementioned modulated signal.

Next, as illustrated in FIG. 11, the range measureing part 12 comprises a plurality of signal processing systems which are formed of a plurality of correlators $29a$, $29b$, $29c$, . . . ; range calculating parts $30a$, $30b$, $30c$, . . . ; correlation data generators $31a$, $31b$, $31c$, . . . ; and threshold value generators $32a$, $32b$, $32c$, . . .

A first signal processing system in the range measureing part 12 is formed of the correlator $29a$, range calculating part $30a$, correlation data generator $31a$, and threshold value generator $32a$; a second signal processing system is formed of the correlator $29b$, range calculating part $30b$, correlation data generator $31b$, and threshold value generator $32b$; a third signal processing system is formed of the correlator $29c$, range calculating part $30c$, correlation data generator $31c$, and threshold value generator $32c$; and the remaining signal processing systems are formed in a similar manner. Then, the correlators $29a$, $29b$, $29c$, . . . of the respective signal processing systems are supplied with output data Dd, which has been bandwidth limited by the roll off filter 21 of the receiver section 11rx, through the controller 18.

At least three signal processing systems are required, and an arbitrary number equal to or larger than three of systems may be provided. The following description will be made on the range measureing part 12 comprised of three signal processing systems, which is the most basic configuration, for convenience of description.

First, the correlator $29a$ in the first signal processing system performs a cross correlation calculation of correlation data Da generated in the correlation data generator $31a$ and the output Dd from the roll off filter 21, and supplies the range calculating part $30a$ with a correlation value CRRa which is the result of the calculation. Assume that the correlation value CRRa is a normalized correlation value on the basis of a maximum peak value of the correlation value (set to one).

The correlation data generator $31a$, on the other hand, generates the correlation data Da having a correlation with a CDM modulated code embedded in a radio wave arriving from a base station (for example, the base station A shown in FIG. 8) installed near the positioning apparatus 10 in accordance with an instruction from the controller 18.

Specifically, as the receiver section 11rx shown in FIG. 10 reproduces received data Drx which is supplied to the controller 18, the controller 18 determines an originating base station from base station identification data (a data code is omitted) included in the received data Drx. Then, determining, for example, that the base station is the base station A in FIG. 8, the controller 18 supplies the correlation data generator $31a$ with instruction data (a data code is omitted) for identifying the base station A. The correlation data generator $31a$ generates the correlation data Da correlated to a CDM modulation code embedded in the radio wave arriving from the base station A, in accordance with the instruction data, and supplies the correlation data Da to the correlator $29a$.

Figure 12A:
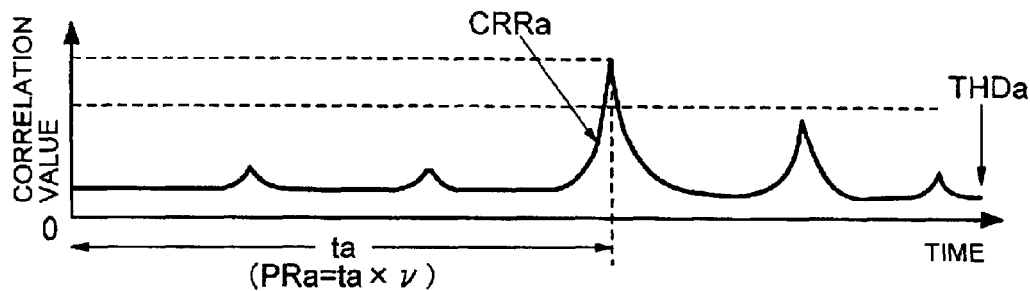
FIGS. 12A through 12C are explanatory diagrams for explaining the operation of the range measureing part for detecting a pseudo range.

Thus, the correlator $29a$ can generate a correlation value CRRA which is highly correlated to the incoming radio wave from the base station A by calculating the correlation of the correlation data Da to the output data Dd, as illustrated in FIG. 12A.

The range calculating part $30a$ first compares the correlation value CRRa with a threshold value THDa generated in the threshold value generator $32a$ to find a maximum peak value, and detects the position at which this peak appears. Specifically, the threshold value generator $32a$ variably adjusts the threshold value THDa in accordance with an instruction of the controller 18, and the range calculating part $30a$ detects the position at which appears the peak of the correlation value higher than the threshold value THDa.

Next, the range calculating part $30a$ calculates a delay time ta to the detection of the peak value in the correlation value CRRa. This delay time ta corresponds to a propagation delay time of a radio wave incoming from the base station A to the positioning apparatus 10. Therefore, the range calculating part $30a$ multiplies the propagation delay time ta by a radio wave propagation velocity v to calculate a propagation range PRa1 (=taxv) of the incoming radio wave. The range calculating part $30a$ outputs the calculated propagation range PRa1 to the direct wave estimating part 19 as one of pseudo range candidates between the base station A and measuring apparatus 10.

The direct wave estimating part 19 performs an error correcting calculation using a predetermined error correction coefficient for the propagation range (pseudo range) PRa1 to calculate another pseudo range candidate PRa2 between the base station A and positioning apparatus 10. Then, the direct wave estimating part 19 supplies the position calculating part 13 with the two propagation ranges (pseudo ranges), i.e., the original pseudo range candidate PRa1 detected by the range measureing part 12, and the pseudo range candidate PRa2 applied with the error correction.

As described above, an incoming radio wave from the base station A may include multipath waves as well as a direct wave, so that peaks may appear in the correlation value CRRa corresponding not only to the direct wave but also to the multipath waves. Particularly, when obstacles such as buildings exist between the base station A and positioning apparatus 10, the level of multipath wave reflected by an reflecting object such as another building may become higher than the level of the direct wave. Therefore, it is not clear whether a calculated propagation range is attributable to the direct wave or the multipath wave only by simply detecting a peak in the correlation value CRRa, and calculating the propagation range of the incoming radio wave from a propagation delay time to that position of detection. To solve this problem, in the first embodiment, predetermined error correction processing is applied to the propagation range (pseudo range) PRa1 calculated by the range calculating part 30a to derive the second propagation range (pseudo range) PRa2 so that these two values are used to perform positioning processing, later described.

A method of processing the error correction, and a method of calculating a predetermined error correction coefficient in the direct wave estimating part 19 will be described later.

In the range measureing part 12 and direct wave estimating part 19, the remaining signal processing systems and the like also perform similar processing to that of the first signal processing system and the like, described above, to calculate propagation ranges (pseudo ranges) PRb1, PRb2 and PRc1 PRc2 which are supplied to the position calculating part 13.

Figure 12B:
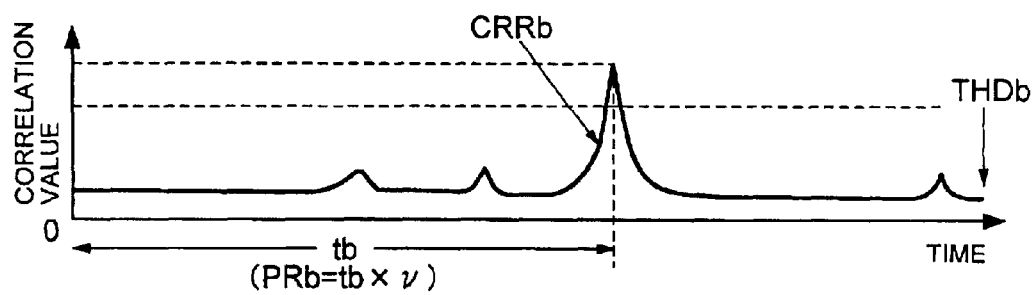

Specifically, when the controller 18 identifies base station identification data (not shown) included in received data Drx from a base station to determine that an incoming radio wave from the base station B illustrated in FIG. 8 has been received, the correlator 29b in the second signal processing system shown in FIG. 11 derives a normalized correlation value CRRb by correlating correlation data (correlation data correlated to the incoming radio wave from the base station B) Db generated in the correlation data generator 31b to the output data Dd. Then, the range calculating part 30b compares the correlation value CRRb with a threshold value THDb from the threshold value generator 32b to find a delay time tb to the appearance of a peak in the correlation value CRRb, as illustrated in FIG. 12B. The range calculating part 30b further calculates a propagation range (pseudo range) PRb1 corresponding to the delay time tb, and supplies this to the direct wave estimating part 19. The direct wave estimating part 19 performs predetermined error correction processing based on the propagation range (pseudo range) PRb1 to calculate another propagation range (pseudo range) PRb2 and supplies these values to the position calculating part 13.

Figure 12C:
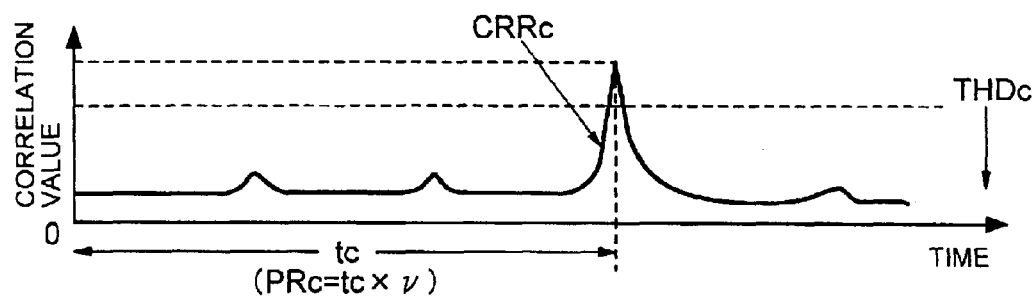

Also, when the controller 18 identifies base station identification data (not shown) included in received data Drx from a base station to determine that an incoming radio wave from the base station C illustrated in FIG. 8 has been received, the correlator 29c in the third signal processing system shown in FIG. 11 derives a normalized correlation value CRRc by correlating correlation data (correlation data correlated to the incoming radio wave from the base station C) Dc generated in the correlation data generator 31c to the output data Dd. Then, the range calculating part 30c compares the correlation value CRRc with a threshold value THDc from the threshold value generator 32c to find a delay time tc to the appearance of a peak in the correlation value CRRc, as illustrated in FIG. 12C. The range calculating part 30c further calculates a propagation range (pseudo range) PRc1 corresponding to the delay time tc, and supplies this to the direct wave estimating part 19. The direct wave estimating part 19 performs predetermined error correction processing based on the propagation range (pseudo range) PRc1 to calculate another propagation range (pseudo range) PRc2 and supplies these values to the position calculating part 13.

The correspondence of aforementioned first through third signal processing systems to the respective base stations A, B, C, have not been previously fixed. In other words, upon determining that incoming radio waves have been received from arbitrary three base stations, the controller 18 corresponds these three base stations to the first through third signal processing systems as appropriate, and forces the correlators 29a, 29b, 29c in the respective systems to perform the aforementioned correlation calculation. Therefore, even when the positioning apparatus 10 moves to an arbitrary position within the communication area shown in FIG. 8 and receives incoming radio waves from three base stations other than the aforementioned combination of the base stations A, B, C, the positioning apparatus 10 can perform the positioning processing.

Next, a method of performing an error correction and a method of calculating a predetermined error correction coefficient in the direct wave estimating part 19 will be described.

Figure 6A:
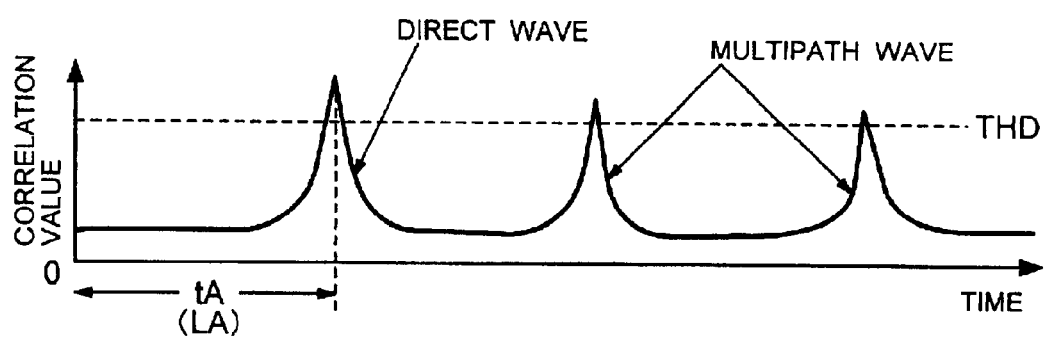
FIGS. 6A and 6B are explanatory diagrams for explaining problems in the conventional propagation range detection.
Figure 6B:
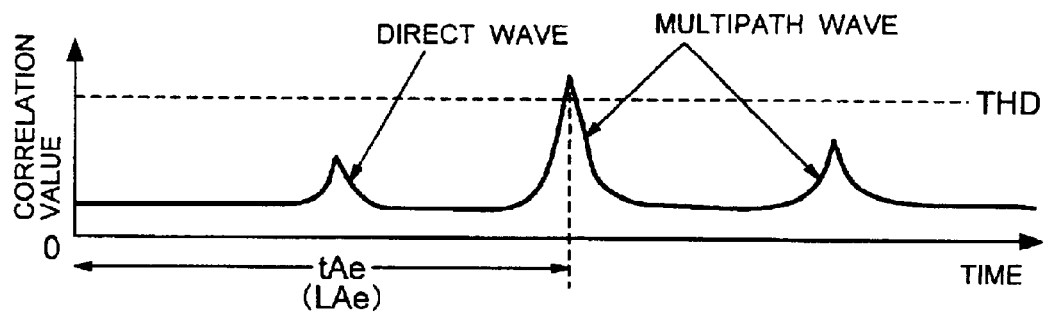
Figure 7:
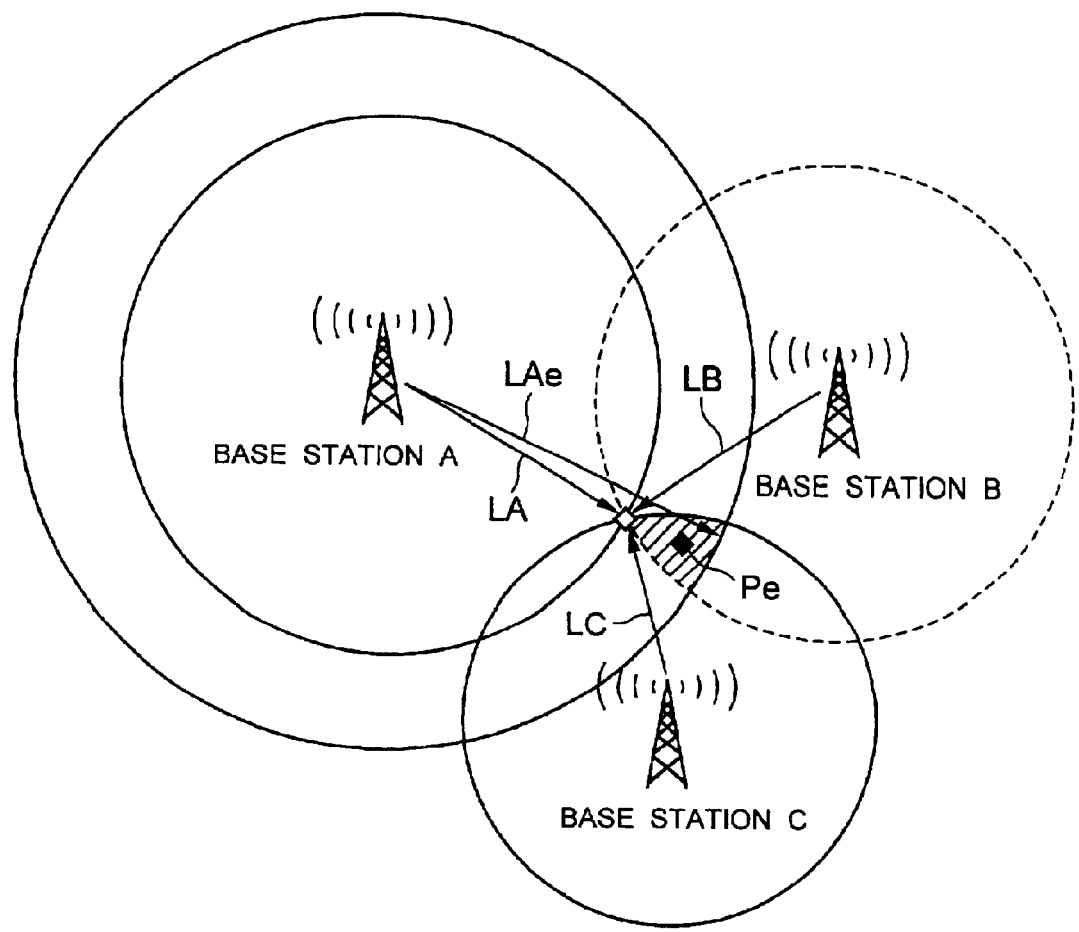
FIG. 7 is an explanatory diagram for explaining a problem in the conventional positioning method.

Assume that the positioning apparatus 10 in the mobile station has received an incoming radio wave, for example, from the base station A and generated a correlation value CRRa from the received signal. The correlation value CRRa generally includes peaks attributable not only to a direct wave but also to multipath waves and noise, as shown in the aforementioned FIG. 6B. Particularly, when a peak attributable to a multipath wave becomes larger than a peak attributable to the direct wave as shown in FIG. 6, the range calculating part 30a in the range estimating part 12 detects the peak attributable to the multipath wave as a peak value for the correlation value CRRa.

Figure 1:
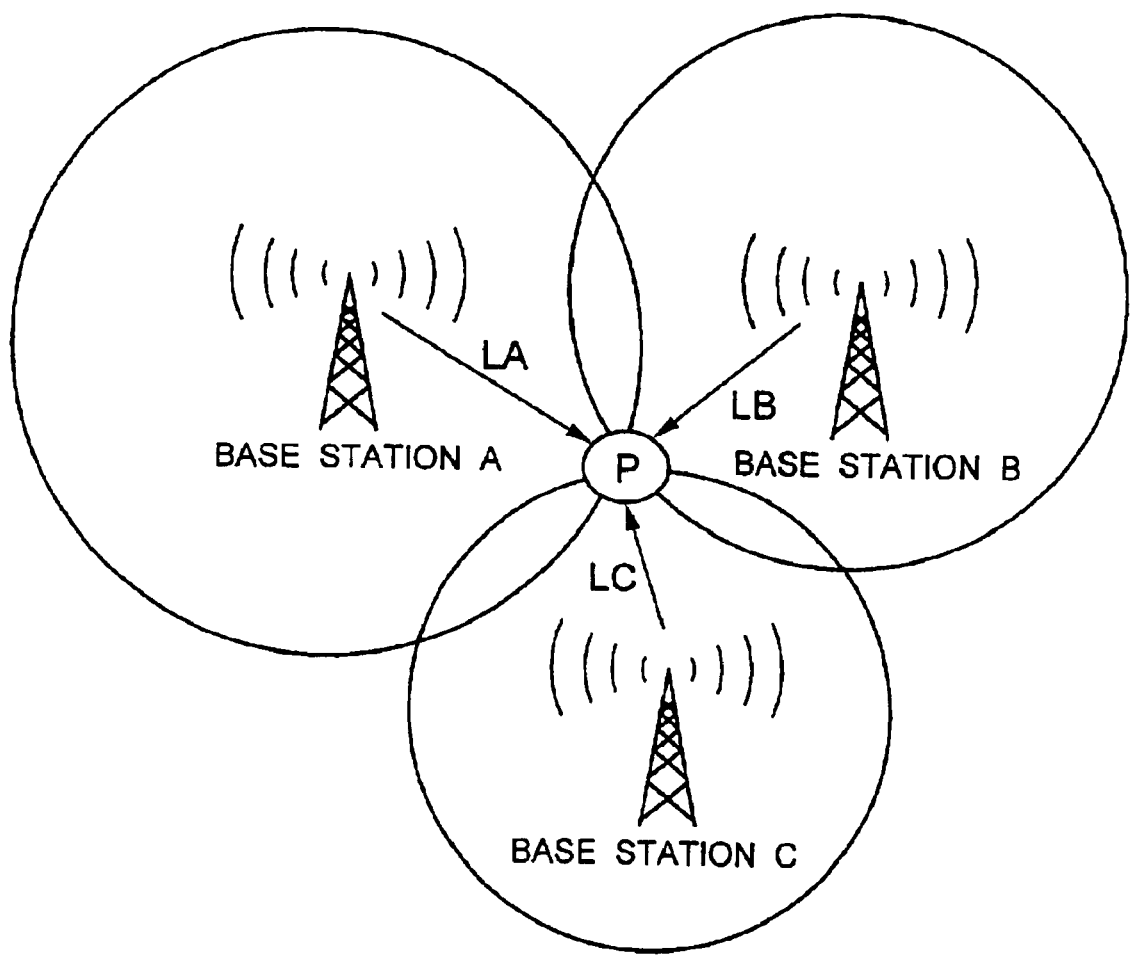
FIG. 1 is an explanatory diagram illustrating the configuration of a conventional mobile communications system.
Figure 2:
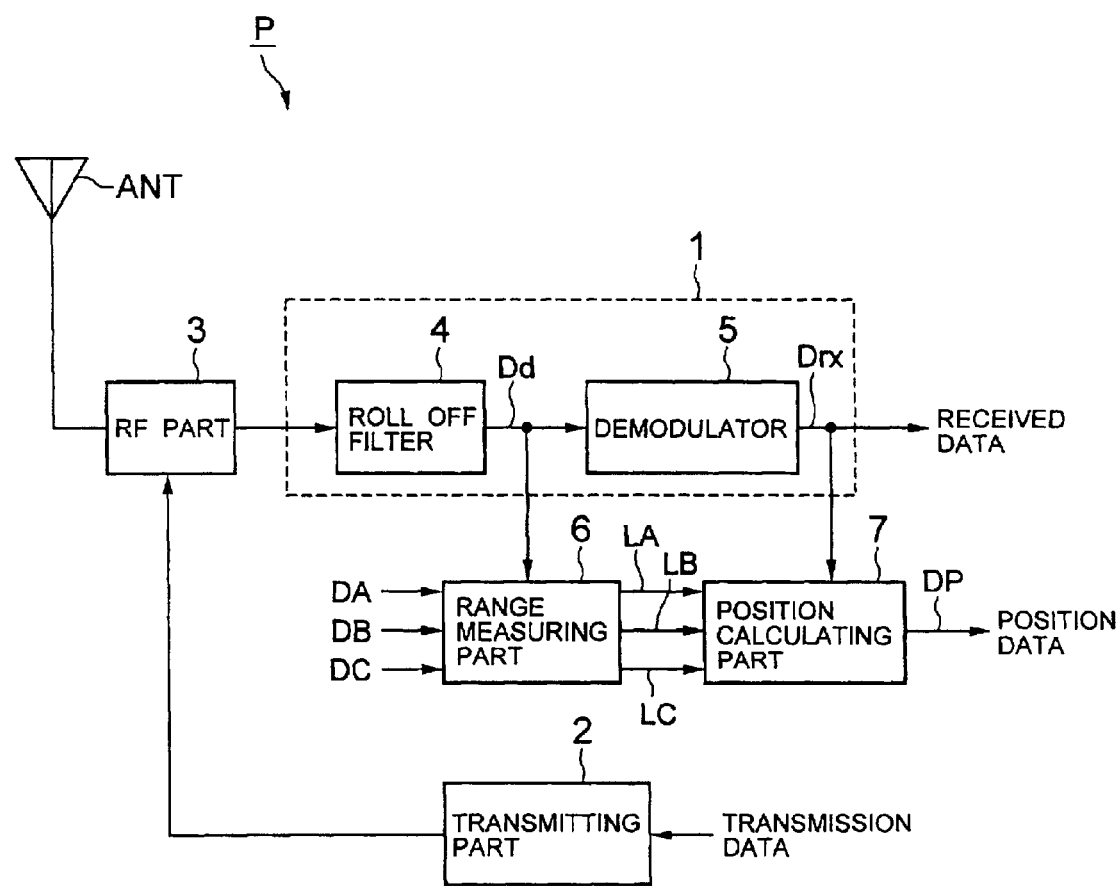
FIG. 2 is a block diagram illustrating the configuration of a conventional portable telephone.
Figure 3:
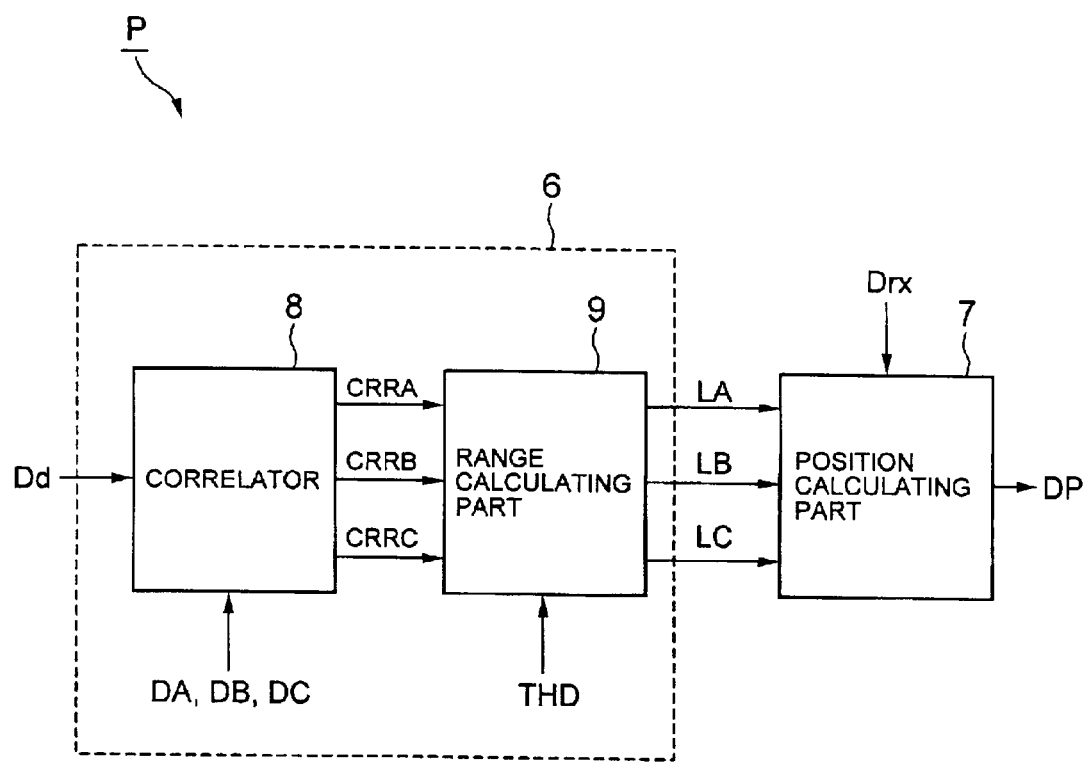
FIG. 3 is a block diagram illustrating the configuration of a range measureing part and a position calculating part provided in the conventional portable telephone.
Figure 4A:
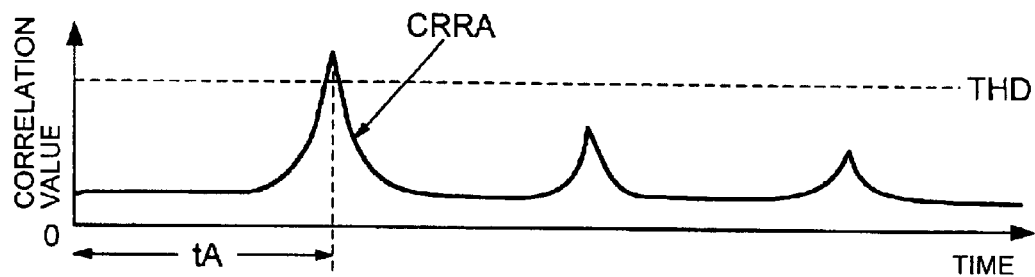
FIGS. 4A through 4C are explanatory diagrams for explaining a conventional method of detecting a propagation range of a received radio wave.
Figure 4B:
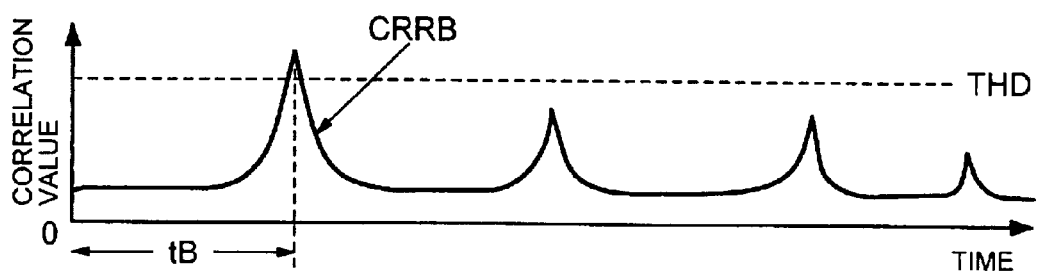
Figure 4C:
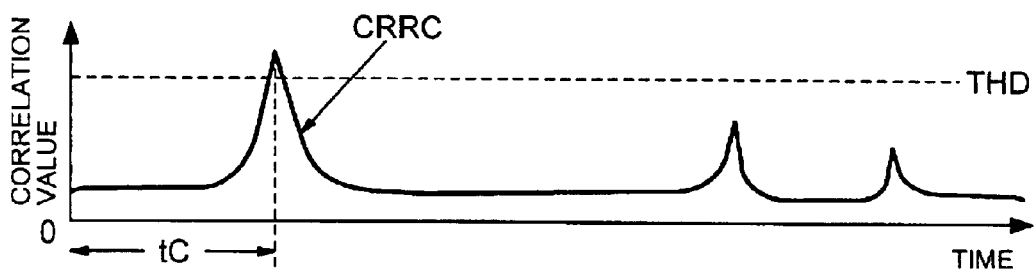
Figure 5:
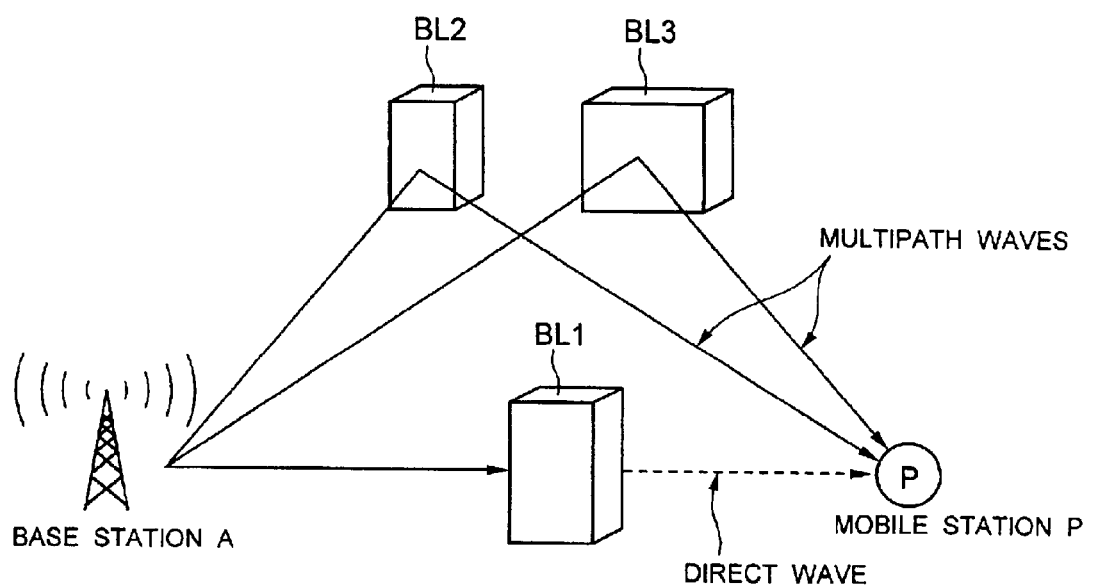
FIG. 5 is an explanatory diagram showing how multipath fading occurs and a direct wave is attenuated.

A multipath wave is generated by a radio wave from the base station which is reflected by a reflecting object such as a building and then propagating to the mobile station P, as shown in the aforementioned FIG. 5. Also, a lower peak value attributable to the direct wave in the correlation value CRRa is caused by the direct wave propagating from the base station A to the mobile station P which is blocked by an obstacle such as a building to cause a reduction in a received electric field strength of the direct wave in the mobile station P, i.e., due to attenuation of the direct wave, as shown likewise in the aforementioned FIG. 5.

These phenomena such as the generation of multipath waves, the attenuation of the direct wave, and the like highly depend on the radio wave propagation characteristics of a region in which a base station or a mobile station exists.

For example, in a region such as an urban district where buildings and other artificial constructions are densely populated, radio waves are more likely to be reflected by these constructions, so that multipath waves are also generated with a higher possibility. Also, since the constructions act as obstacles for radio waves, the direct wave is remarkably attenuated by them.

On the contrary, in a non-urban district having a fine view, a communication can be made by a line-of-sight distance, so that multipath waves are hardly generated, and the direct wave is less susceptible to attenuation. Actually, although the radio wave propagation state may vary depending on the meteorologic situation such as radio duct, it can be said that its influence is extremely small as compared with the influence exerted by the topography and natural feature mentioned above.

Therefore, when a so-called electric measurement testing is conducted for measuring a radio wave propagation situation for radio waves used in a predetermined region, it is possible to previously know the radio wave propagation situation in this region.

Of course, a radio wave propagation path varies depending on a relative position of a base station to a mobile station, so that the radio wave propagation situation previously known by the electric measurement testing is strictly statistic. However, by sufficiently increasing the number of measuring points and the number of times of the electric measurement testing in a predetermined region, it is possible to know the radio wave propagation situation in the predetermined region to a practical level.

Specifically, by conducting the electric measurement testing at a large number of points and a sufficient number of times within a predetermined region, it is possible to quantitatively predict, for example, a propagation delay time of a multipath wave as compared with a propagation delay time of a direct wave. Then, in a region in which such a predicted value has been quantitatively known, it is possible to estimate a propagation delay time of a direct wave by performing the error correction processing on a propagation delay time of a multipath wave, if detected, using a predetermined error correction coefficient, even if the direct wave from a base station is difficult to detect.

Specifically, turning back to the aforementioned exemplary case with the base station A, even if a peak detected from the correlation value CRRa is attributable to a multipath wave, with a radio wave propagation situation previously known about a region around the base station A, the error correction processing is applied to a delay time to the detection of the peak or a pseudo range calculated from the delay time using a predetermined error correction coefficient to calculate a pseudo range of the direct wave between the base station A and mobile station P.

Next, a specific method of calculating an error correction coefficient will be described.

Assume in this embodiment that a radio wave propagation situation has been previously measured in each of the cells in the communication area shown in FIG. 8. A variety of methods are available for measuring the radio wave propagation situation in each cell. For example, the radio wave propagation situation may be measured by a method as shown below.

First, a measurement is made to the range Lt1 between the base station A and the mobile station P located at an arbitrary point (1) in the cell in which the base station A is installed. Next, an incoming radio wave from the base station A is received in the mobile station P, and a correlation value signal CRRa is generated from the received signal to detect a peak of the correlation value, thereby calculating a pseudo range Le1 between the base station A and mobile station P. Then, an error correction coefficient in this case is represented by Er1 which is defined as shown in the following equation (1):

$$Er1 = (Le1 - Lt1)/Le1 \qquad (1)$$

Stated another way, the error correction coefficient Er is expressed by the ratio of a difference between the pseudo range Le affected by a multipath wave and the true range Lt between the base station and the mobile station to the pseudo range Le.

The foregoing measurement and calculation are made while the position of the mobile station P is changed with respect to the base station A to derive ten values Er1–Er10. An average value of these values is calculated by the following equation (2):

$$Era = \Sigma(Er1 \sim Er10)/10 \qquad (2)$$

and is defined as an error correction coefficient Era for the base station A. It should be understood that the number of times of measurements is not limited to the aforementioned value, and a higher accuracy is provided for the error correction coefficient Er as the number of times of measurements, i.e., the number of measuring points within the same cell is increased.

Subsequently, similar measurement and calculation are made for the remaining base stations B, C and the like, and resulting values are defined likewise as error correction coefficients Erb, Erc, and the like in the respective base stations B, C and the like.

As described above, the multipath waves and the attenuation of direct wave affect prominently when a communication area is in an urban district. Therefore, the measurement and calculation for deriving the error correction coefficients may be made only for base stations which are installed in an urban district.

It should be noted that a "base station installation environment" mentioned in the present invention strictly means an environmental condition from a viewpoint of the radio wave propagation. Therefore, even in a non-urban district, in a region in which a radio wave communication by a line-of-sight distance is difficult, such as a hill area and a valley area, for example, the measurement and calculation for deriving the error correction coefficients are required as is the case with an urban district.

The influence exerted by the topography and land feature on a radio wave propagation situation can be macroscopically considered to some degree when taken locally. Therefore, it is thought that when the error correction coefficients are calculated only for base stations in urban districts, an average value may be calculated for the error correction coefficients calculated for a plurality of base stations to represent a universal error correction coefficient ErC in the urban district.

Stated another way, when an error correction coefficient ErC is calculated based on the following equation (3), this value can be regarded as a universal error correction coefficient at a base station installed in the urban district:

$$Erc = \Sigma(Eri(i=1 \sim n))/n \qquad (3)$$

where Eri (i=1n) is assumed to be error correction coefficients calculated at n base stations in an urban district.

For calculating the error correction coefficient Eri at each base station or the universal error correction coefficient ErC at a base station in an urban district, an average value must be calculated for a plurality of error correction coefficients, as mentioned above, and a standard deviation σ is derived in course of the calculation. Therefore, the standard deviations may be combined with the average value to provide a plurality of error correction coefficients for a base station in an urban district, for example, ErC±σ or ErC±2σ and the like, rather than the single error correction coefficient ErC.

Next, a method of performing the error correction processing using the aforementioned error correction coefficient will be described.

For the error correction processing performed in the direct wave estimating part 19 of the positioning apparatus 10 in this embodiment, several different processing methods are available depending on whether a previously calculated error correction coefficient is stored in the mobile station or stored in the base station. Therefore, these methods will be individually described in sequence.

Described first is a method which is employed when the error correction coefficient is stored in the mobile station. In this case, ErC which is calculated as a universal error correction coefficient in the urban district is used in principle as the error correction coefficient. Specifically, assume that the memory part 17 in the positioning apparatus 10 illustrated in FIG. 9 previously stores the error correction coefficient ErC. The error correction coefficient may be stored during the manufacturing of the device in the manufacturer, or may be stored as one of various data which are initially set in a sales agent when a user purchases the device.

When the mobile station such as a portable telephone roams in the communication area as shown in FIG. 8, so-called position registration processing is performed in order to automatically and rapidly connect an incoming call wherever in the area the mobile station is located. This position registration processing involves a periodic automatic communication of the mobile station with a base station in a cell in which the mobile station is located to allow a management center or the like which manages the entire communication area to recognize the position of the mobile station.

In this embodiment, assume that the base station which has communicated with the mobile station in the event of the position registration processing transmits to the mobile station information on an environment in which the base station is installed, i.e., whether the base station is installed in an urban district or in a non-urban district. This information may be identified by ON/OFF of a particular bit in data transmitted from the base station during the position registration processing. Alternatively, a particular code indicative of the installation environment may be included in the transmitted data.

The positioning apparatus 10 of the mobile station can know the environment in which the base station is installed in a cell in which the mobile station is currently located by receiving the above information from the base station through the receiver section 11$rx$ shown in FIG. 10. Then, when the base station is installed in an urban district, the error correction processing is performed in subsequent positioning processing using the error correction coefficient ErC previously stored in the memory part 17 in the positioning apparatus 10.

This processing may be described along an exemplary case as follows.

Assume for example that the mobile station P lies in a cell of the base station A located in an urban district in the communication area shown in FIG. 8. Because of the position registration processing periodically performed between the mobile station P and the base station A, the mobile station P recognizes that its current position is in an urban district from information communicated with the base station A during the position registration processing.

Therefore, as the positioning processing is started in the positioning apparatus 10, and a pseudo range PRa1 between the base station A and the mobile station P is output from the range calculating part 30$a$ of the first signal processing system in the range measureing part 12 to the direct wave estimating part 19 as described above, the direct wave estimating part 19 executes the error correction processing with reference to the error correction coefficient ErC stored in the memory part 17 through the controller 18.

The error correction calculation performed in the error correction processing may be performed to calculate the true range Lt1 using the pseudo range Le1 detected by the aforementioned equation (1) and the error correction coefficient Er1. In other words, the equation (1) is transformed as expressed by the following equation (4):

$$Lt1 = Le1 \times (1 - Er1) \tag{4}$$

In this exemplary case, a pseudo range PRa2 estimated to be attributable to a direct wave from the base station A corresponds to Lt1 in the above equation; a pseudo range PRa1 detected by the range calculating part 30$a$ to Le1; and the error correction coefficient ErC stored in the memory part 17 to Er1, respectively. In other words, the error correction calculating equation in the error correction processing of this exemplary case is expressed by the following equation (5):

$$PRa2 = PRa1 \times (1 - ErC) \tag{5}$$

Specifically, in this exemplary case, the direct wave estimating part 19 supplies the position calculating part 13 with the pseudo range PRa1 detected by the range calculating part 30$a$ in the range measureing part 12, and the pseudo range PRa2, applied with the error correction processing based on the pseudo range PRa1, as candidates of the pseudo range between the base station A and the mobile station P.

Since the radio wave propagation situation can be macroscopically taken to some degree in an associated propagation region, it can be thought that the other base stations B, C in urban districts adjacent to the base station A are in a similar radio wave propagation environment to the base station A. Therefore, the direct wave estimating part 19 performs similar error correction calculation for pseudo ranges PRb1, PRc1 for the base stations B, C detected by the range calculating part 30$b$ and range calculating part 30$c$ in the range calculating part 12. Specifically, as is the case with the calculation of PRa2, the pseudo ranges PRb2, PRc2 are calculated by error correction calculations expressed by the following equations (6), (7):

$$PRb2 = PRb1 \times (1 - ErC) \tag{6}$$

$$PRc2 = PRc1 \times (1 - ErC) \tag{7}$$

Then, these pseudo ranges are also supplied from the direct wave estimating part 19 to the position calculating part 13 as candidates of the pseudo ranges between the base stations B, C and the mobile station P.

Next described is a method which is employed when the error correction coefficient is stored in a base station.

In this case, employed as the error correction coefficient may be only ErC which is calculated as the aforementioned universal error correction coefficient in an urban district, or the error correction coefficient Eri (i=a, b, c, . . . ) calculated for each base station in an urban district. The communication area shown in FIG. 8 is taken as an example for explaining this method as follows.

Specifically, when the error correction coefficient ErC is only used, each base station installed in an urban district in the area of FIG. 8 uniformly stores the value of ErC as the error correction coefficient. On the other hand, when the error correction coefficient Eri for each base station is used, each base station in the urban district stores an error correction coefficient calculated for the base station in such a manner that the base station A in FIG. 8 stores an error correction coefficient Era, the base station B stores an error correction coefficient Erb, and so forth.

When the error correction coefficients are stored in the base stations, data transmitted from a base station to the mobile station during the aforementioned position registration processing is not the installation environment information on the base station but the error correction coefficient itself stored in the base station. Therefore, when the universal error correction coefficient ErC is used, the mobile station, which has performed the position registration processing, receives the error correction coefficient from the associated base station in which the position has been registered, and stores the error correction coefficient in the memory part 17 of the positioning apparatus 10. Then, when the positioning processing is requested, the direct wave estimating part 19 performs the aforementioned error correction calculation using the error correction coefficient to find a pseudo range to which a correction is added for each base station.

Generally, the position registration processing in a mobile communications system such as a portable telephone, a pager and the like is performed between a mobile station and a plurality of neighboring base stations rather than in a single base station in order to improve the reliability of an incoming connection. Therefore, even when a different error correction coefficient Eri is used for each base station in an urban district, the mobile station can store in the memory part 17 the name of each base station, with which the mobile station has performed the position registration processing, and an error correction coefficient in a corresponding relationship. With this action taken by the mobile station, the direct wave estimating part 19 can correct a pseudo range using an error correction coefficient calculated for each base station, so that highly accurate positioning processing can be accomplished.

Now, turning back to description on each component in the first embodiment, reference is made to block diagrams in FIGS. 9–11.

Figure 13:
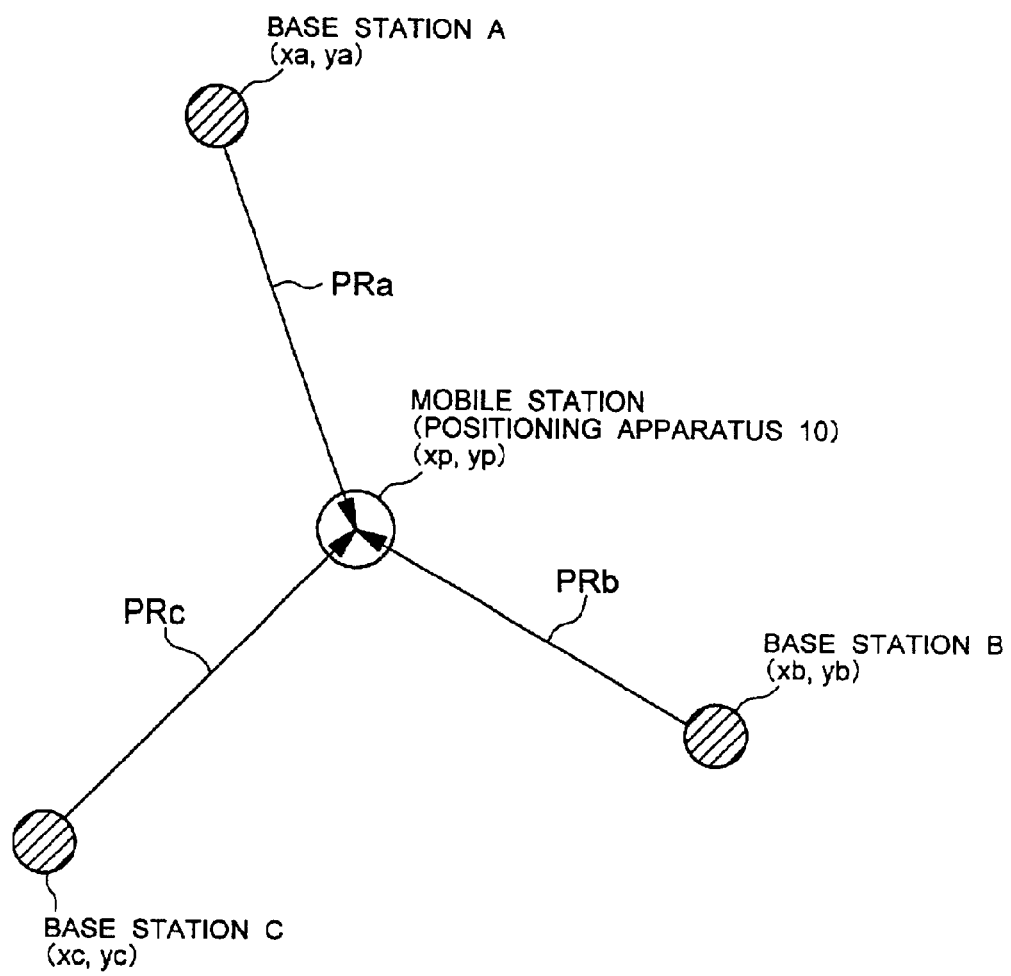
FIG. 13 is an explanatory diagram for showing the definition of terms used in the description of embodiments, and for explaining the positioning principles.

The position calculating part 13 calculates a current position (xp, yp) of the positioning apparatus 10 based on the triangulation using the pseudo ranges PRa1, PRa2 with the base station A, the pseudo ranges PRb1, PRb2 with the base station B, and the pseudo range PRc1 PRc2 with the base station C, all of which are supplied from the direct wave estimating part 19, and the positions (xa, ya), (xb, yb), (xc, yc) of the respective base stations A, B, C included in received data from the respective base stations (see FIG. 13).

Specifically, upon determining that incoming radio waves have been received from the illustrated base stations A, B, C from received data Drx, the controller 18 extracts respective position information indicative of the position (xa, ya) of the base station A, the position (xb, yb) of the base station B, and the position (xc, yc) of the base station C included in the received data Drx. Then, the controller 18 supplies the extracted position information to the position calculating part 13. The position calculating part 13 calculates the current position (xp, yp) of the positioning apparatus 10 based on the triangulation using the supplied positions (xa, ya), (xb, yb), (xc, yc) and the pseudo ranges PRa1, PRa2, PRb1, PRb2, PRc1, PRc2 supplied from the direct wave estimating part 19.

Though details will be described later, the position calculating part 13 does not simply calculate the position of the positioning apparatus 10 based on the triangulation, but first calculates positions near the true position of the positioning apparatus 10 based on successive approximation as rough positions POSI. Then, the position calculating part 13 selects the most accurate one of a plurality of calculated rough positions POSI as the true position, i.e., the current position (xp, yp) of the positioning apparatus 10. When the position calculating part 13 calculates a rough position POSI based on the successive approximation, a position error calculation parameter PARA, later described, is calculated as a parameter indicative of the accuracy of the rough position.

The direct wave detecting part 14 further calculates a positioning error HDOP, later described, from the position error calculation parameter PARA generated in the position calculating part 13, determines that three pseudo ranges calculated when the positioning error HDOP is minimized are the propagation ranges of the direct waves from the base stations A, B, C, and notifies the position calculating part 13 of the determination information.

As the position calculating part 13 is provided with the determination information from the direct wave detecting part 14 in this manner, the position calculating part 13 determines the rough position POSI, which is calculated based on the three pseudo ranges calculated when the positioning error HDOP is minimized, i.e., the determined propagation range of the direct waves arriving from the base stations A, B, C, as the position nearest from the true position of the positioning apparatus 10, i.e., the current position (xp, yp), and generates positioning data Dps indicative of the current position which is output to the controller 18.

As will be apparent from the foregoing description, in this embodiment, upon receipt of incoming radio waves from the three base stations A, B, C, two pseudo ranges are calculated for each base station (i.e., a total of six pseudo ranges for the three stations). Then, based on a combination of the pseudo ranges corresponding to these base stations A, B, C, a plurality of rough positions POSI are calculated, and the rough position POSI, with which the positioning error HDOP is minimized, is selected as the current position of the positioning apparatus 10 from among the calculated rough positions POSI. For calculating a particular rough position POSI, the use of the successive approximation can provide the rough position POSI with largely reduced influences of multipath fading and noise.

In the block diagram of the positioning apparatus 10 illustrated in FIG. 9, the manipulation part 15 comprises manipulation keys including a plurality of push button switches, as mentioned above. As the user selectively manipulates a predetermined manipulation key, the user can instruct the controller 18 to position the current position of the positioning apparatus 10, instruct the base station to deliver information on a surrounding map and surrounding facilities of the current position information (xp, yp) derived by the positioning processing.

Specifically, as the range measureing part 12, position calculating part 13, direct wave detecting part 14 and direct wave estimating part 19 position the current position (xp, yp) of the positioning apparatus 10 in response to an instruction of the user, the controller 18 transmits the positioning data Dps indicative of the current position (xp, yp) to the nearest base station from the transmitter section 11tx, included in transmission data Dtx to the base station. With this transmission processing, the user can request the base station to deliver information on surroundings of the current position of the positioning apparatus 10 from a database system provided in the base station. As the information requested by the user, such as a map is delivered from the base station, the receiver section 11rx receives the information to reproduce received data Drx, and downloads the reproduced received data in the memory part 17, so that the received data Drx can be preserved. As the user issues an appropriate instruction through the manipulation part 15, the display part 16 can display information on a map around the current position of the positioning apparatus 10 on a liquid crystal screen or the like based on the stored received data Drx, and can additionally provide a blinking display or the like indicative of the current position (xp, yp) based on the positioning data Dps in the displayed data.

The display part 16 is configured to display in accordance with display data supplied from the controller 18, and other than displaying the aforementioned information such as a map, displays a menu for prompting the user to perform a desired manipulation, and displays information entered from the manipulation part 15 for confirmation by the user.

The memory part 17, in addition to storing information such as a map delivered from a base station, previously stores menu display data, stores information such as the addresses (telephone numbers, mail numbers and the like) of destinations and data transmission destinations set by the user in the form of file, and preserves information entered from the manipulation part 15.

Also, when the transmitter section 11tx requests a base station to deliver content information such as image data, music data and the like in response to an instruction of the user, and the base station delivers the content information in response to the request, the receiver section 11rx receives the content information delivered from the base station, the memory part 17 downloads the content information for storage therein and also supplies image data to the display part 16, thereby permitting such image data to be displayed on the display screen of the display part 16. Further, in regard to music data delivered from a base station, the music data can be reproduced, utilizing an audio reproducing part, the illustration of which is omitted in the block diagram of FIG. 9.

The memory part 17 has an expansible memory region by additionally installing removable semiconductor memories in the body of the positioning apparatus 10.

Next, the operation of the positioning apparatus 10 having the foregoing configuration will be described with reference to FIGS. 13 through 22. As a matter of course, the description on the operation will be centered on the operation involved in positioning the current position of the positioning apparatus 10.

First, referring to FIG. 13, description will be made on the definition of terms in this embodiment, and the positioning principles of the present invention.

FIG. 13 illustrates, as a general example, the positioning apparatus 10 of the mobile station which is located at a position at which the positioning apparatus 10 can receive incoming radio waves from the base stations A, B, C. In FIG. 13, the respective positions (xa, ya), (xb, yb), (xc, yc) of the base stations A, B, C are known, and the propagation ranges of the respective radio waves arriving at the positioning apparatus 10 from the base stations A, B, C are indicated by the pseudo ranges PRa, PRb, PRc, respectively.

Assume herein that the three base stations A, B, C are represented by a variable t (=a, b, c), and the respective positions (xa, ya), (xb, yb), (xc, yc) of the base stations A, B, C are collectively represented by (xt, yt), and the pseudo ranges PRa, PRb, PRc are collectively represented by PRt.

Also, as described above, in this embodiment, the range measureing part 12 and direct wave estimating part 19 are used to detect two each of the pseudo ranges PRa, PRb, PRc for each base station, so that two pseudo ranges corresponding to the pseudo range PRa are represented by PRa1 and PRa2 which are collectively represented by PRai (where, i=1, 2). Likewise, two pseudo ranges corresponding to the pseudo range PRb are represented by PRb1 and PRb2, which are collectively represented by PRbj (where j=1, 2), and two pseudo ranges corresponding to the pseudo range PRbc are represented by PRc1 and PRc2, which are collectively represented by PRck (where k=1, 2).

Further, in this embodiment, a plurality of rough positions POSI are calculated based on the successive approximation, respective rough position POSI are represented by POSIa, POSIb, POSIc, which have suffixes added thereto for indicating the relativity to the base stations A, B, C, in order to distinguish the respective rough positions POSI.

Also, since each of the rough positions POSIa, POSIb, POSIc is calculated using two pseudo ranges for each base station as described above, a notation is added to each rough position for distinguishing a combination of three pseudo ranges, which are used to calculate the rough position, chosen from the pseudo ranges PRa1–PRa2, PRb1–PRb2, and PRc–PRc2. For example, rough positions are represented by POSIa[a1, b1, c1] and POSIa[a2, b1, c1 ] when they are derived by fixing the pseudo ranges PRb1, PRc1 derived from incoming radio waves from the base stations B, C, and applying two pseudo ranges PRa1 PRa2 derived from an incoming radio wave from the base station A as variables.

Similarly, rough positions are represented by POSIb[a1, b1, c1] and POSIb[a1, b2, c1] when they are derived by fixing the pseudo ranges PRa1, PRc1 derived from incoming radio waves from the base stations A, C, and applying two pseudo ranges Prb1, PRb2 derived from an incoming radio wave from the base station B as variables.

Also, rough positions are represented by POSIc[a1, b1, c1 ] and POSIc[a1, b1, c2] when they are derived by fixing the pseudo ranges PRa1 PRb1 derived from incoming radio waves from the base stations A, B, and applying two pseudo ranges PRc1, PRc2 derived from an incoming radio wave from the base station C as variables.

Based on the foregoing premise, the position calculating part 13 and direct wave detecting part 14 calculate rough positions POSI of the positioning apparatus 10 based on the following positioning principles, and determines the current position of the positioning apparatus 10 from the rough positions POSI thus calculated.

Specifically, according to the triangulation, the pseudo range PRt, the known position (xt, yt) of each base station A, B, C, and the current position (xp, yp) of the positioning apparatus 10 have a relationship represented by the following equation (8). Then, the current position (xp, yp) of the positioning apparatus 10 can be calculated by expanding the equation (8):

$$PRt=\sqrt{(xp-xt)^2+(yp-yt)^2} \qquad (8)$$

(where t is a, b, c)

However, the pseudo range PR1 is a parameter which has been affected by multipath fading, noise and the like, and errors may be included in a time base, i.e., a time measuring circuit (not shown) contained in each of the base stations A, B, C and positioning apparatus 10, which is referenced when the pseudo range PRt is calculated. Therefore, even if the current position (xp, yp) of the positioning apparatus 10 is simply calculated by expanding the equation (8), the resulting value does not always represent the true position of the positioning apparatus 10.

To address this problem, an influence amount of an offset in a time measurement result of the time base exerted on the pseudo range PRt is represented by s in each of the base stations and positioning apparatus 10 when the receiver section 11rx of the positioning apparatus 10 of the mobile station receives an incoming radio wave from each base station. A latitude component xp and a longitude component yp in the current position (xp, yp) of the positioning apparatus 10 are represented as in the following equation (9). In the equation (9), variables x', y' and s' are approximate values, and variables Δx, Δy and Δs are correction values. Then, the latitude component xp is represented by the sum of the approximate value x' and correction value Δx; the longitude component yp is represented by the sum of the approximate value y' and correction value Δy; and the influence amount s is represented by the sum of the approximate value s' and correction value Δs.

$$xp=x'+\Delta x$$

$$yp=y'+\Delta y$$

$$s=s'+\Delta s \qquad (9)$$

Further, by applying the equation (9) to the aforementioned equation (8), the current position (xp, yp) of the positioning apparatus 10 is represented by the following equation (10) which is more practical than the equation (8):

$$PRt' = \sqrt{(x'-xt)^2 + (y'-yt)^2} + s \qquad (10)$$

(where t is a, b, c)

The position calculating part 13 repeats the calculation until these correction values Δx, Δy, Δs converge to a level of calculation error (i.e., to zero as close as possible) by the successive approximation. Then, the position calculating part 13 determines a position (x', y') indicated by the approximate value x' of the latitude component and the approximate value y' of the longitude component, derived by the foregoing calculations, as the rough position POSI of the positioning apparatus 10.

Here, for purposes of illustration, the rough position POSIa[a1, b1, c1] may be calculated based on the successive approximation using a combination of the respective pseudo ranges PRa1. Prb1, PRc1 derived from incoming radio waves from the base stations A, B, C, and the respective positions (xa, ya), (xb, yb), (xc, yc) of the base stations A, B, C, in the following manner.

Specifically, initial latitude component xp and longitude component yp are calculated by first setting proper values to the aforementioned correction values, and the correction values are added to the approximate values to find a preliminary solution. Next, when new longitude component and latitude component xp, yp are calculated, the new longitude component and latitude component xp, yp are replaced with the sum of the preliminarily found solution and new correction values, and a processing similar to the first processing is performed. Then, the resulting correction values are added to the approximate values, and used as the next solution.

If the correction values Δx, Δy, Δs are not converged to the level of calculation error even with the foregoing processing, similar processing is performed at the third time onward. By repeating these calculations, the correction values Δx, Δy, Δs gradually converge to the level of calculation error, and the calculations are stopped when they no longer converge (i.e., when they are sufficiently reduced to the level of calculation error). Then, the position (x', y') represented by the finally derived latitude component and longitude component x', y' is determined as the rough position POSIa[a1, b1, c1] of the positioning apparatus 10.

A plurality of rough positions POSI derived by the successive approximation may include a variety of errors (for example, a positioning error which adversely affects the positioning accuracy, and the like) depending on a communication environment between the base stations A, B, C and the positioning apparatus 10.

To address this problem, in this embodiment, the following algorithm is applied to determine the rough position with the smallest positioning error from a plurality of rough positions POSI.

Specifically, since the current position matching the true position of the positioning apparatus 10 is actually unknown, the aforementioned equation (10) is represented in the form of partial differential equation shown in the following equation (11):

$$PRt = RT + s + \frac{\partial PRT}{\partial xp}\Delta x + \frac{\partial PRt}{\partial yp}\Delta y \qquad (11)$$

Further, the equation (11) is represented by a matrix of the following equation (12):

Here, terms αa–αc, βa–βc in the matrix (12) have the nature of being direction cosine when viewing the positioning $$\begin{bmatrix} \alpha a & \beta a & 1 \\ \alpha a & \beta a & 1 \\ \alpha a & \beta a & 1 \end{bmatrix} \begin{bmatrix} \Delta x \\ \Delta y \\ S \end{bmatrix} = \begin{bmatrix} \Delta PRa \\ \Delta PRb \\ \Delta PRc \end{bmatrix} \qquad (12)$$

apparatus 10 from the respective base stations A, B, C. Also, terms Δx, Δy represent the correction values described in the aforementioned equation (10), and a term s represents the influence amount. Further, ΔPRa–ΔPRc each represent a difference between the pseudo range PRt derived by detecting a peak of the correlation value and the pseudo range closest to the true range Rt which is found in course of the successive approximation, as expressed by the relationship of the following equation (13):

$$PRt - RT = \Delta PRt \qquad (13)$$

(where t is a, b, c)

Next, the matrix shown in the aforementioned equation (12) is represented in the form of abbreviated description shown in the following equation (14) for convenience:

$$A \cdot \delta X = \delta R \qquad (14)$$

Further, as the equation (14) is transformed into the following equation (15), a matrix is provided for calculating the terms Δx, Δy, Δs:

$$\delta X = A^{-1} \cdot \delta R \qquad (15)$$

Then, as shown in an equation (16), a covariance matrix $(A^T \cdot A)^{-1}$ is derived from the equation (15):

Further, the covariance matrix $(A^T \cdot A)^{-1}$ can be $$COV(\delta X) = A^{-1} \cdot COV(\delta R) \cdot (A^{-1})^T \qquad (16)$$
$$\approx (A^T \cdot A)^{-1}$$

represented by the next equation (17):

$$(A^T \cdot A)^{-1} = \begin{bmatrix} 2 & 2 & 2 \\ \sigma xx & \sigma xy & \sigma xs \\ 2 & 2 & 2 \\ \sigma yx & \sigma yy & \sigma ys \\ 2 & 2 & 2 \\ \sigma sx & \sigma sy & \sigma ss \end{bmatrix} \qquad (17)$$

As the covariance matrix $(A^T \cdot A)^{-1}$ is derived in this manner, the respective terms σxx, σxy, ayx, σyy constituting the matrix (17) indicate a variance which has the nature of a weighting coefficient that adversely affects the positioning accuracy, in accordance with communication environments between the base stations A, B, C and the positioning apparatus 10. Therefore, when the terms σxx, σxy, σyx, σyy have small values, this means that a resulting rough position POSI exhibits a small positioning error and a high positioning accuracy.

Thus, as shown in the following equation (18), the value HDOP (Honzontal Dilution Of Precision) of a square root of square sum of the terms σxx, σyy is calculated, and this value HDOP is determined as a value indicative of a quantified positioning error on a horizontal coordinate plane.

$$HDOP = \sqrt{\sigma xx^2 + \sigma yy^2} \quad (18)$$

Specifically, the direct wave detecting part 14 detects, from a plurality of calculated pseudo ranges PRt, a pseudo range corresponding to the base station A, a pseudo range corresponding to the base station B, and a pseudo range corresponding to the base station C when HDOP becomes the smallest. Then, it is estimated that these three pseudo ranges are attributable to the respective direct waves arriving at the positioning apparatus 10 from the base stations A, B, C. The position calculating part 13 determines the rough position POSI which is calculated using the pseudo ranges estimated to be attributable to the respective direct waves as the current position (xp, yp) of the positioning apparatus 10, and supplies the controller 18 with positioning data Dps indicative of this current position.

Assume in the following description that the covariance matrix $(A^T \cdot A)^{-1}$ is called a "weighting coefficient matrix," and HDOP is called the "positioning error." Further, since the positioning error HDOP is calculated for each of the rough positions POSIa, POSIb, POSIc, respective positioning errors are represented by HDOPa, HDOPb, HDOPc corresponding to these rough positions.

The positioning errors HDOPa, HDOPb, HDOPc are calculated from a combination of pseudo ranges PRa1–PRa2, PRb1–PRb2, PRc1–PRc2 derived from incoming radio waves from the base stations A, B, C, and the positions (xa, ya), (xb, yb), (xc, yc) of the base stations A, B, C. Therefore, the positioning error is represented with a notation about a pseudo range used in the calculation, such as HDOPa[a1, b1, c1], by way of example.

The terms σxx, σxy, σyx, σyy and the like in the covariance matrix $(A^T \cdot A)^{-1}$ are called the "position error calculating parameters," and represented by a reference PARA. The position error calculating parameter PARA is also calculated using a combination of pseudo ranges PRa1–PRa2, PRb1–PRb2, PRc1–PRc2 derived from incoming radio waves from the base stations A, B, C, and the positions (xa, ya), (xb, yb), (xc, yc) of the base stations A, B, C. Therefore, the position error calculating parameter PARA is represented with a notation about a pseudo range used in the calculation, such as PARAa[a1, b1, c1], by way of example.

Next, the positioning operation in this embodiment will be described in detail with reference to flow charts illustrated in FIGS. 14–21.

Figure 14:
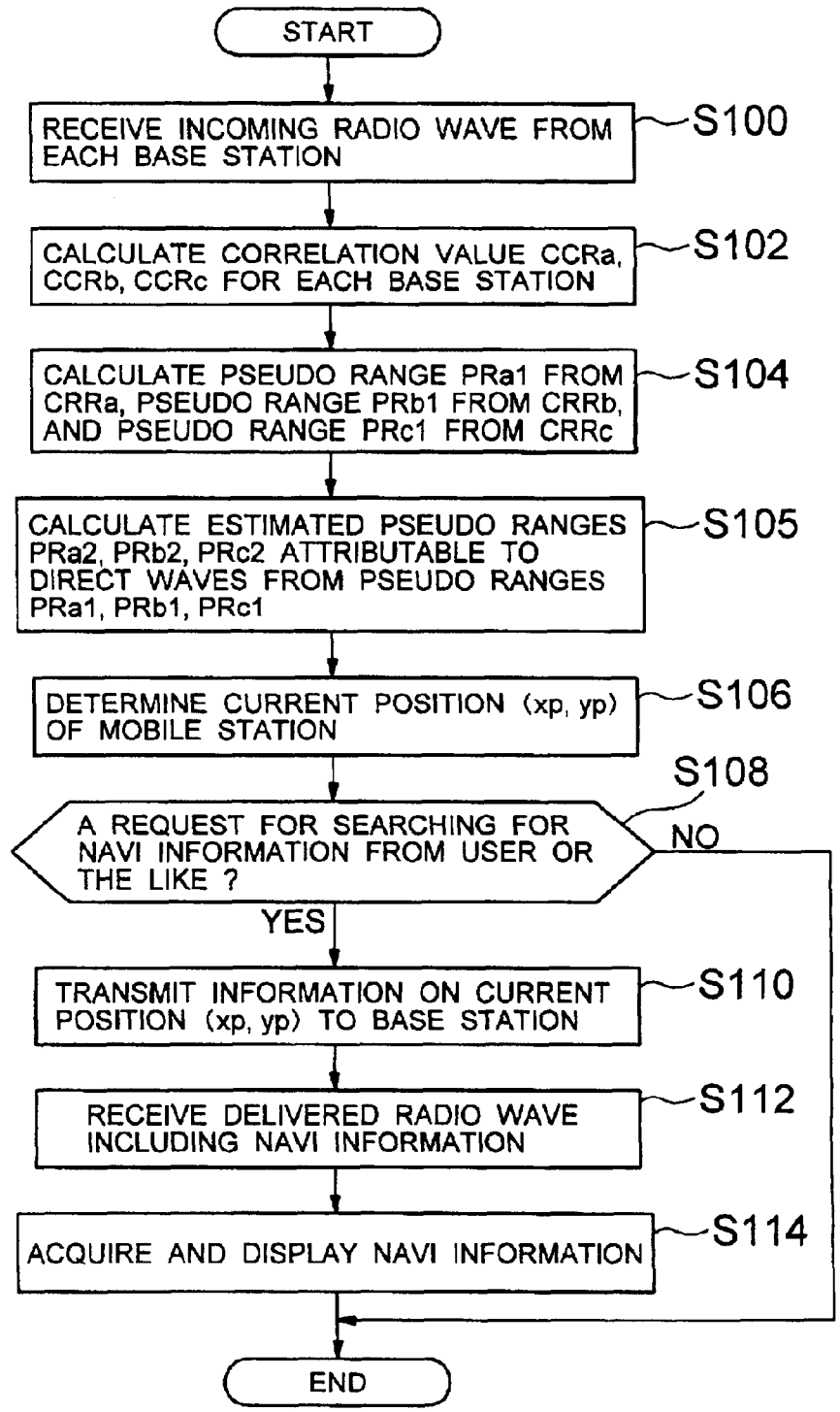
FIG. 14 is a flow chart for explaining a positioning operation of the mobile station in the first embodiment.

First, FIG. 14 is a flow chart illustrating the general operation of the positioning apparatus 10 in the positioning operation. In FIG. 14, upon starting the positioning operation in response to an instruction of the user, the receiver section 11rx receives an incoming radio wave from each base station at step S100. For example, when radio waves emitted from the respective base stations A, B, C arrive at the positioning apparatus 10 as illustrated in FIG. 13, the receiver section 11rx receives these incoming radio waves.

Next, at step S102, the range measureing part 12 correlates received data Dd of each base station A, B, C derived by receiving the incoming radio waves to correlation data Da, Db, Dc to find correlation values CRRa, CRRb, CRRc, respectively. Then, at step S104, as illustrated in the aforementioned FIGS. 12A through 12C, a peak is detected for each of the correlation values CRRa, CRRb, CRRc. In this manner, respective pseudo ranges PRa1, PRb1, PRc1 are derived.

Next, at step S105, the direct wave estimating part 19 performs the aforementioned predetermined error correction calculation processing on these pseudo ranges to calculate pseudo ranges PRa2, PRb2, PRc2 which are applied with error corrections.

Then, at step S106, the current position (xp, yp) of the positioning apparatus 10 is positioned using the pseudo ranges PRa1 PRa2, Prb1, PRb2, PRc1, PRc2. This positioning processing is performed in accordance with the flow charts illustrated in FIGS. 15 through 21, later described. As the positioning processing is completed, the flow proceeds to step S108.

At step S108, the controller 18 determines whether or not a request to search for navigation information (hereinafter referred to as "navi information") has been made by an instruction from the user. When the request has been made (i.e., when "YES"), the flow proceeds to step S110.

At step 110, the positioning data DPs indicative of the current position (xp,yp) of the positioning apparatus 10, which is the positioning result, is transmitted to a nearby base station to which a request is made for delivering the navi information instructed by the user. For example, when the user requests information on a map of surroundings including the current position (xp, yp) as the navi information, the nearby base station is requested to deliver map information. It is also possible to request the base station to deliver a variety of navi information such as information required for shopping such as restaurants, shops and so on located around the current position (xp, yp), amusement facilities, public facilities, sight-seeing spots, and the like.

Next, at step S112, as a delivered radio wave, including the navi information, is transmitted from the base station, the receiver section 11rx receives the delivered radio wave, and acquires the navi information from received data Drx. Then, at step S114, the receiver section 11rx displays the acquired navi information, and the current position (xp, yp), which is the positioning result, on the display part 16 for provision to the user.

Figure 22A:
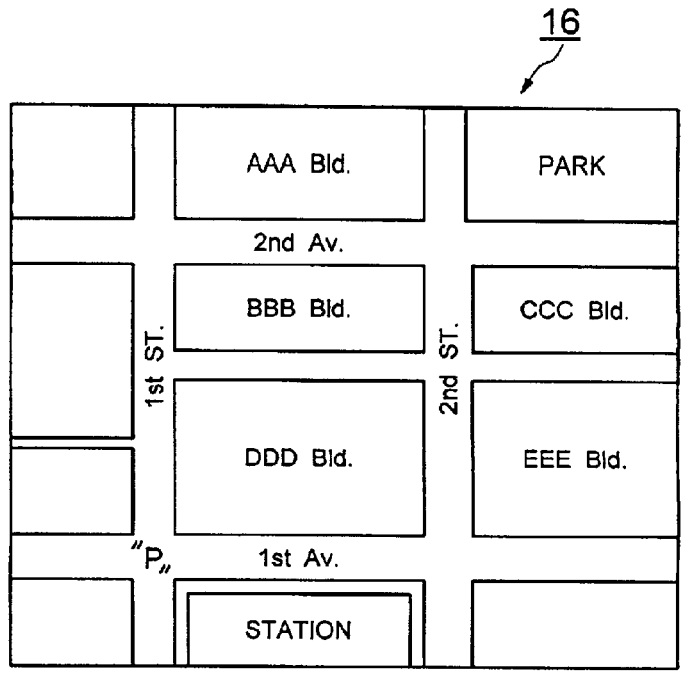
FIGS. 22A and 22B are explanatory diagrams showing exemplary displays on a display part of the mobile station.
Figure 22B:
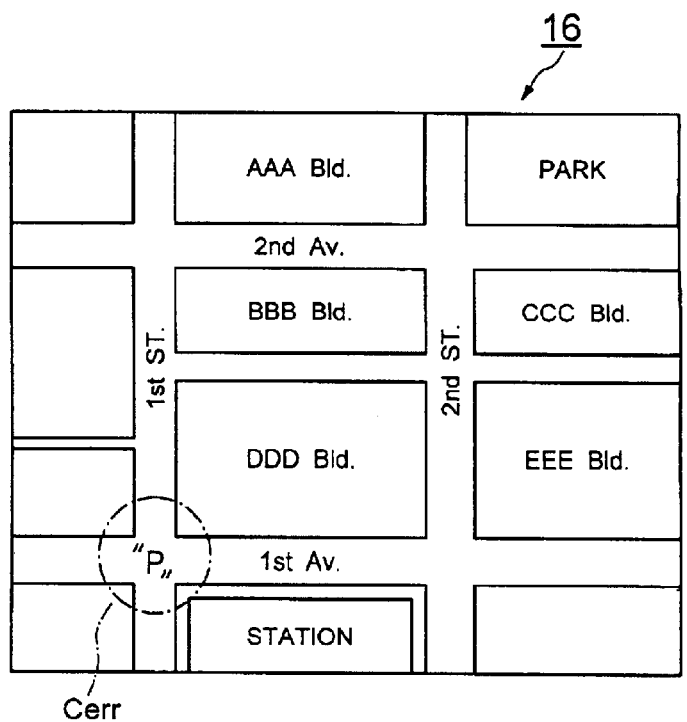

For example, as illustrated in FIG. 22A, the map information delivered thereto is displayed on the display part 16, and a symbol "P" indicative of the current position (xp, yp) is blinked in the map, thereby improving the convenience of the user. Also, when the value of the positioning error HDOP, which was calculated when determining the current position (xp, yp), corresponding to the current position is larger than a predetermined value, the positioning error HDOP is converted to a distance, and as illustrated in FIG. 22B, a circle Cerr centered at the current position (xp, yp) and having a radius equal to the distance converted from the positioning error HDOP is displayed. In this manner, it is also possible to allow the user to recognize to which degree the current position (xp, yp) is correct.

When no request is made for navi information from the user at the aforementioned step S108 (i.e., when "NO"), the processing of the flow chart in FIG. 14 is terminated without performing the processing at steps S110–S114. However, even in this case, rather than simply terminating the processing, the current position (xp, yp) found by the positioning processing can be utilized for applications other than a request for navi information. For example, the positioning data Dps indicative of the current position (xp, yp) may be transmitted to a base station which confirms the position of the user, and the presence and absence of an accident to the user. Such an application may be utilized, for example, for care for the aged.

Next, the positioning processing at step S106 shown in FIG. 14 will be described in detail.

Figure 15:
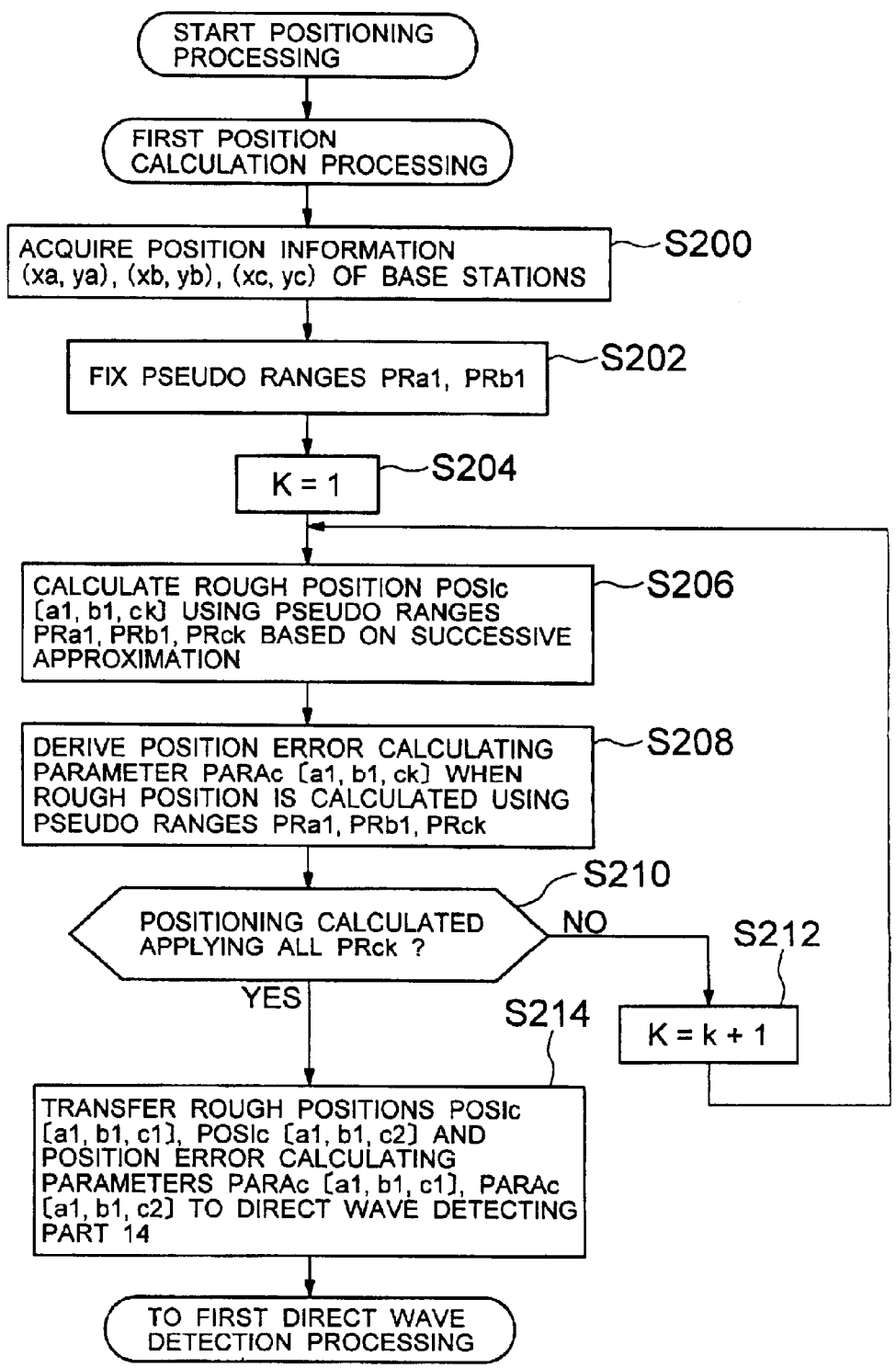
FIG. 15 is a flow chart for explaining the positioning operation of the mobile station, specifically, the operation of first position calculation processing.

Specifically, in the flow chart of FIG. 14, the processing from step S100 to S104 is performed, and the flow proceeds to step S106, starting the positioning calculation processing illustrated in the flow chart of FIG. 15.

As the positioning calculation processing is started, the first positioning calculation processing is performed by the position calculating part 13. First, at step S200 in FIG. 15, the position calculating part 13 acquires information on the positions (xa, ya), (xb, yb), (xc, yc) of the respective base stations A, B, C from the received data Drx which was reproduced when the incoming radio waves from the base stations A, B, C were received.

Then, at step S202, the position calculating part 13 selects the first pseudo ranges PRa1 PRb1 corresponding to the incoming radio waves from the base stations A, B, and the two pseudo ranges PRc1 PRc2 corresponding to the incoming radio wave from the base station C, from the six pseudo ranges PRa1 PRa2, Prb1, PRb2, PRc1, PRc2 derived at steps S104, S105 in the flow chart of FIG. 14, as candidates for the first combination, fixes the pseudo ranges PRa1, Prb1, and starts the positioning calculation based on the triangulation and successive approximation.

In this embodiment, the pseudo ranges PRa1 PRb1 associated with the base stations A, B are fixed, and the two pseudo ranges PRc1, PRc2 associated with the base station C are selected as the first candidates. Alternatively, another combination may be selected. Specifically, the pseudo ranges PRa1 PRc1 associated with the base stations A, C may be fixed, and the two pseudo ranges Prb1, PRb2 associated with the base station B may be selected as candidates for the first combination. Alternatively, the pseudo ranges PRb1, PRc1 associated with the base stations B, C may be fixed, and the two pseudo ranges PRa1, PRa2 associated with the base station A may be selected as the first candidates. It is essential only that pseudo ranges associated with two of the base stations A, B, C are selected, and two pseudo ranges associated with the remaining base station are selected as so-called variables. Therefore, in this embodiment, the pseudo ranges PRa1, PRb1 associated with the base stations A, B are fixed, and the two pseudo ranges PRc1, PRc2 associated with the base station C are selected as candidates for the first combination, as described above.

While in this embodiment, fixed pseudo ranges are the first pseudo ranges PRa1, PRb1 corresponding to the incoming radio waves from the base stations A, B, the second pseudo ranges PRa2, PRb2 may be fixed instead. Specifically, for calculating the current position (xp, yp) of the positioning apparatus 10, the triangulation-based analysis may be performed for calculating the current position (xp, yp) from a combination of two pseudo ranges associated with the base stations A, B, C, and the order of their combination is not particularly limited. Therefore, in this embodiment, the processing is performed in the order of the combination specified in the flow chart illustrated in the accompanying drawings in consideration of faster positioning calculation processing.

Next, at step S204, the first (k=1) pseudo range (PRck= PRc1 ) is selected for the calculation from the two pseudo ranges PRc1, PRc2 corresponding to the incoming radio wave from the base station C, and the flow proceeds to step S206.

At step S206, a rough position POSIc[a1, b1, c1] of the positioning apparatus 10 is calculated using the positions (xa, ya), (xb, yb), (xc, yc) of the base stations A, B, C, the aforementioned fixed pseudo ranges PRa1, PRb1, and the pseudo range PRc1 which is used as a variable. For the calculation, the aforementioned successive approximation based calculation processing is performed.

Next, at step S208, a position error calculating parameter PARAc[a1, b1, c1], which is calculated when the rough position POSIc[a1, b1, c1], is calculated, is derived. Specifically, the position error calculating parameter PARAc [a1, b1, c], is calculated when the rough position POSIc[a1, b1, c], is finally reached by the successive approximation.

Then, at step S210, it is determined whether or not the rough position POSIc has been calculated by applying all of the two pseudo ranges PRc1 PRc2 corresponding to the incoming radio wave from the base station C. If the calculation processing has not been terminated (i.e., "NO"), the next pseudo range PRck is selected for the calculation at step S212, followed by a repetition of the processing from step S206.

Thus, by performing the processing at steps S204–S212, the positioning calculation is performed using a combination of the pseudo ranges PRc1 PRc2 specified by the variable k, and the fixed pseudo ranges PRa1, PRb1, and as a result, two rough positions POSIc[a1, b1, c1], and POSIc[a1, b1, c2] are derived. Further, the position error calculating parameters PARAa[a1, b1, c1], and PARAc[a1, b1, c2] corresponding to the respective rough positions are also derived.

Figure 16:
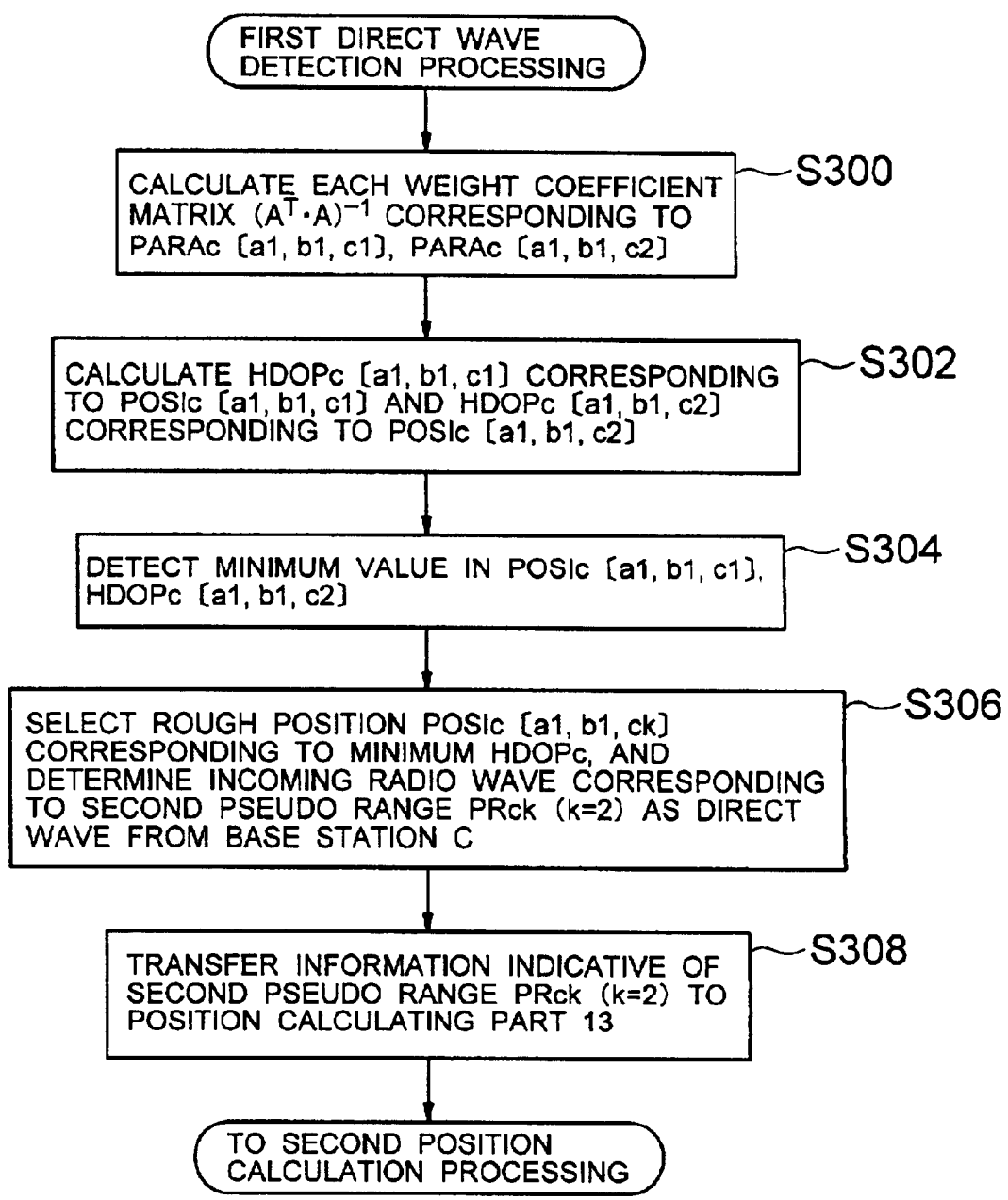
FIG. 16 is a flow chart for explaining the positioning operation of the mobile station, specifically, the operation of first direct wave detection processing.

Next, after calculating two each of the rough positions POSIC and position error calculating parameters PARAc, the flow proceeds to step S214, where these rough positions POSIc[a1, b1, c1] and POSIc[a1, b1, c2] and position error calculating parameters PARAa[a1, b1, c1] and PARAc[a1, b1, c2] are transferred to the direct wave detecting part 14, followed by transition to the first direct wave detection processing by the direct wave detecting part 14 illustrated in the flow chart of FIG. 16.

In the flow chart of FIG. 16, first, at step S300, each weighting coefficient matrix (see the aforementioned equation (16) and equation (17)) is calculated, corresponding to the position error calculating parameters PARAa[a1, b1, c1] and PARAc[a1, b1, c2].

Further, at step S302, the positioning error HDOPc is calculated from each weighting coefficient matrix. Specifically, the calculation described in connection with the aforementioned equation (18) is performed to calculate a positioning error HDOPc[a1, b1, c1] corresponding to the rough position POSIc[a1, b1, c1] and a positioning error HDOPc[a1, b1, c2] corresponding to the rough position POSIc[a1, b1, c2].

Next, at step S304, the positioning error having a minimum value is detected from the positioning errors HDOPc [a1, b1, c1] and HDOPc[a1, b1, c2] calculated at the aforementioned step. Then, at step S306, the rough position POSIC corresponding to the minimum HDOPc (i.e., the positioning error having the minimum value) is selected from the rough positions POSIc[a1, b1, c1], POSIc[a1, b1, c2].

In the foregoing description on this embodiment, assuming that the second positioning error HDOPc[a1, b1, c2] (k=2) is minimal for convenience, the rough position POSIc [a1, b1, c2] corresponding thereto is selected. Then, the incoming radio wave corresponding to the second pseudo range PRck (PRc2 ) (k=2) is determined to be the direct wave from the base station C.

For reference, in this case, the pseudo range PRc2 calculated by the direct wave estimating part 19 which performs the aforementioned error correction calculation based on PRc1 is determined as the pseudo range attributable to the direct wave from the base station C, rather than the pseudo range PRc1 derived by the range measureing part 12 from the peak of the correlation value CRRc.

Next, at step S308, information indicative of the determination of the direct wave, i.e., determination information indicating that the second pseudo range PRc2 associated with the base station C is attributable to the direct wave from the base station C, is transferred to the position calculating part 13. Then, the flow proceeds to the processing in the flow chart illustrated in FIG. 17, wherein the second position calculation processing is performed by the position calculating part 13.

Figure 17:
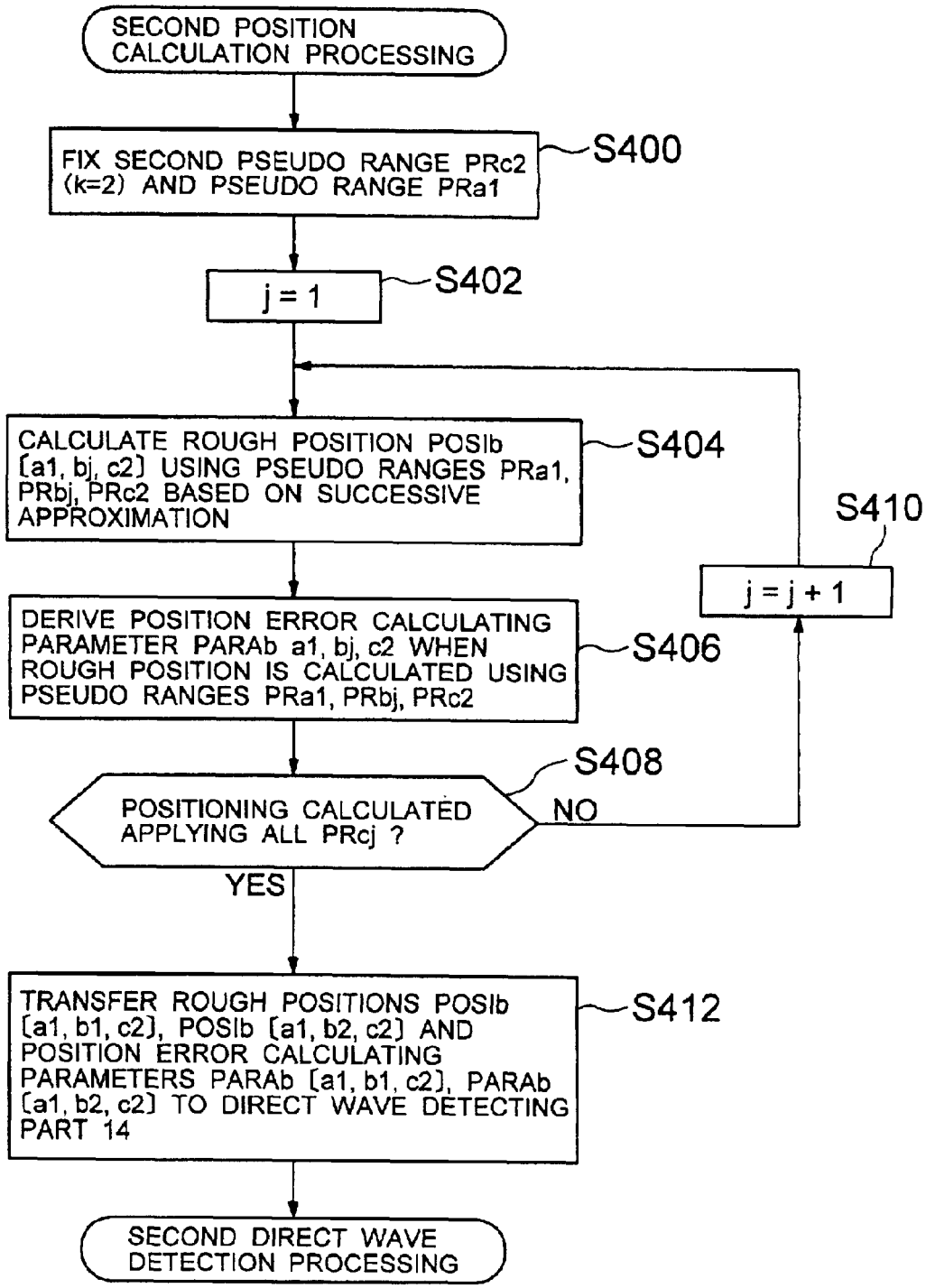
FIG. 17 is a flow chart for further explaining the positioning operation of the mobile station, specifically, the operation of second position calculation processing.

In the flow chart illustrated in FIG. 17, first, at step 400, upon receipt of the determination information indicating that the aforementioned second pseudo range PRc2 (k=2) is attributable to the direct wave from the base station C, the second pseudo range PRc2 (k=2) corresponding to the base station C is fixed, the pseudo range PRa1 corresponding to the radio wave from the base station A is fixed, and the two pseudo ranges Prb1, PRb2 corresponding to the incoming radio wave from the base station B are selected as a combination of candidates for the second position calculation processing.

Specifically, in the first position calculation processing described in connection with FIG. 15, the pseudo ranges PRa1 PRb1 derived from the incoming radio waves from the base stations A, B are fixed, while the pseudo ranges PRc1 PRc2 derived from the incoming radio wave from the base station C are used as variables to calculate the rough position POSIc. As a result, the second pseudo range PRc2 (k=2) is determined to be attributable to the direct wave which arrives from the base station C. Thus, at step S400 in the second position calculation processing, the calculation processing may be performed by fixing the second pseudo range PRc2 derived by the direct wave from the base station C, and fixing either the pseudo range derived by the incoming radio wave from the base station A or the pseudo range derived by the incoming radio wave from the base station B.

Therefore, while the fixed pseudo range may be any of the pseudo ranges associated with the base stations A, B, the pseudo range PRa1 derived by the incoming radio wave from the base station A is fixed in the second position calculation processing in this embodiment.

Next, at step S402, the first pseudo range PRb1 (j=1) is selected for the calculation from the two pseudo ranges PRb1, PRb2 corresponding to the incoming radio wave from the base station B, followed by transition to step S404. Then, at step S404, the rough position POSIb[a1, b1, c2] of the positioning apparatus 10 is calculated using the positions (xa, ya), (xb, yb), (xc, yc) of the base stations A, B, C, the fixed pseudo ranges PRa1 PRc2 and the first pseudo range PRb1 (k=1) at the base station B. It should be understood that the aforementioned successive approximation based processing is performed for this calculation.

Next, at step S406, the position error calculating parameter PARAb[a1, b1, c2], which is calculated when the rough position POSIb[a1, b1, c2] is calculated, is derived. Specifically, the position error calculating parameter PARAb[a1, b1, c2] is calculated when the rough position POSIb[a1, b1, c2] is finally reached by the successive approximation.

Subsequently, at step S408, it is determined whether or not the rough position POSIb has been calculated by applying all of the two pseudo ranges Prb1, PRb2 corresponding to the incoming radio wave from the base station B. If the calculation processing has not been terminated (i.e., "NO"), the next pseudo range PRbj is selected for the calculation at step S410, followed by a repetition of the processing from step S404.

Thus, by performing the processing at steps S402–S410, the calculation is performed using a combination of the pseudo ranges Prb1, PRb2 specified by the variable j, and the fixed pseudo ranges PRa1, PRc2 and as a result, two rough positions POSIb[a1, b1, c2] and POSIb[a1, b2, c2] are derived. Further, the position error calculating parameters PARAb[a1, b1, c2] and PARAb[a1, b2, c2] corresponding to the respective rough positions are also derived together with them.

Figure 18:
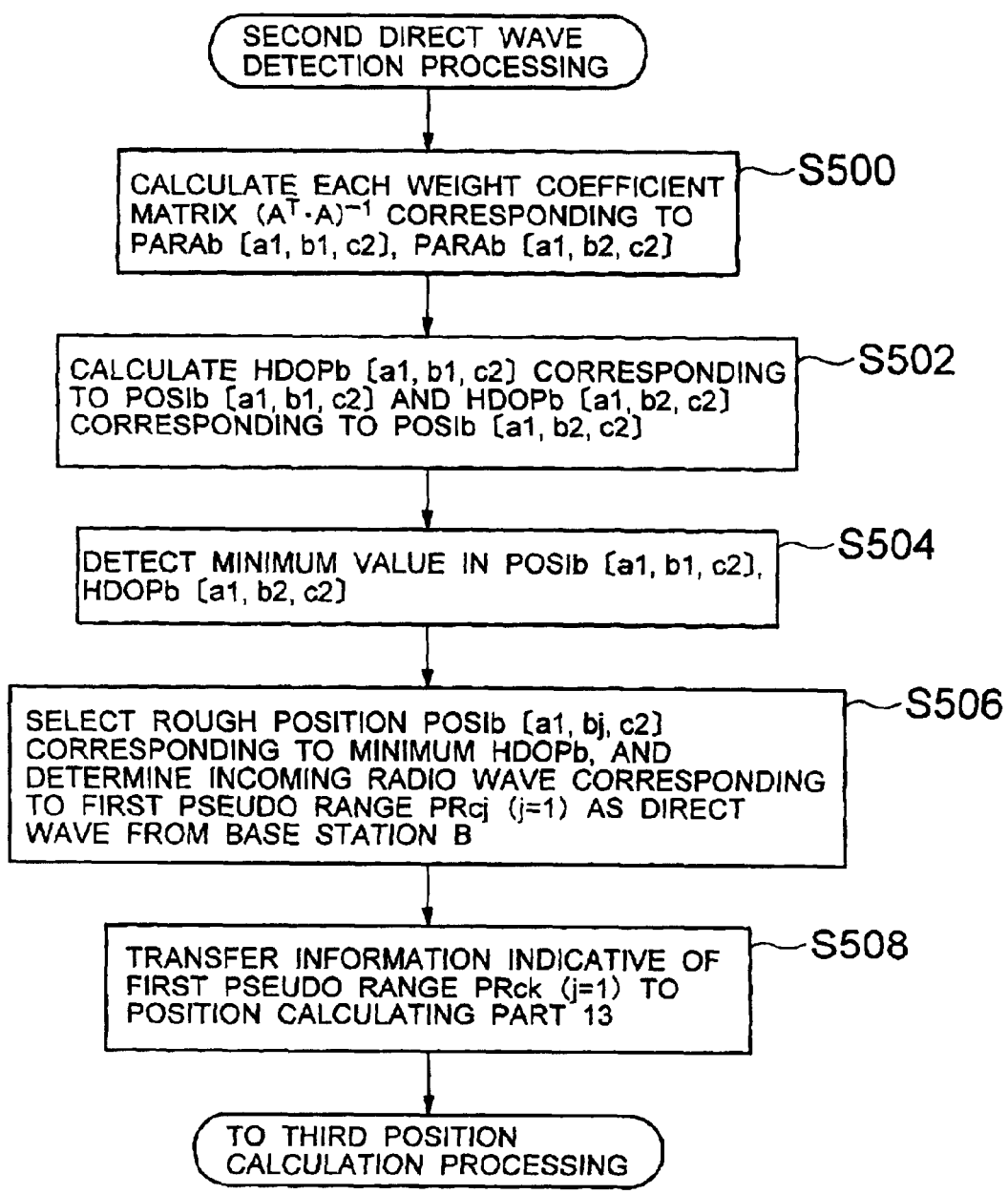
FIG. 18 is a flow chart for further explaining the positioning operation of the mobile station, specifically, the operation of second direct wave detection processing.

Next, after these rough positions POSIb[a1, b1, c2] and POSIb[a1, b2, c2] and position error calculating parameters PARAb[a1, b1, c2] and PARAb[a1, b2, c2] are transferred to the direct wave detecting part 14 at step S412, the flow proceeds to the processing flow chart of FIG. 18 where the second direct wave detection processing is performed by the direct wave detecting part 14.

In the flow chart illustrated in FIG. 18, first at step S500, each weighting coefficient matrix is calculated, corresponding to the position error calculating parameters PARAb[a1, b1, c2] and PARAb[a1, b2, c2]. Further, at step S502, the positioning error HDOPc is calculated from each weighting coefficient matrix. Specifically, the calculation described in connection with the aforementioned equation (18) is performed to calculate a positioning error HDOPb[a1, b1, c2] corresponding to the rough position POSIb[a1, b1, c2] and a positioning error HDOPb[a1, b2, c2] corresponding to the rough position POSIb[a1, b2, c2].

Next, at step S504, the positioning error having a minimum value is detected from the calculated positioning errors HDOPb[a1, b1, c2] and HDOPb[a1, b2, c2]. Then, at step S506, the rough position corresponding to the minimum HDOPb (i.e., the positioning error having the minimum value) is selected from the rough positions POSIb[a1, b1, c2], POSIb[a1, b2, c2].

In this exemplary case, assume that the first positioning error HDOPb[a1, b1, c2] (j=1) is minimal for convenience. And accordingly, the rough position POSIb[a1, b1, c2] corresponding thereto is selected. Then, the incoming radio wave corresponding to the first pseudo range PRb1 (j=1) is determined to be the direct wave from the base station B.

Next, at step S508, determination information indicating that the first pseudo range PRb1 (j=1) of the pseudo ranges Prb1, PRb2 is attributable to the direct wave from the base station B, is transferred to the position calculating part 13. Then, the flow proceeds to the processing in the flow chart illustrated in FIG. 19, wherein the third position calculation processing is performed by the position calculating part 13.

Figure 19:
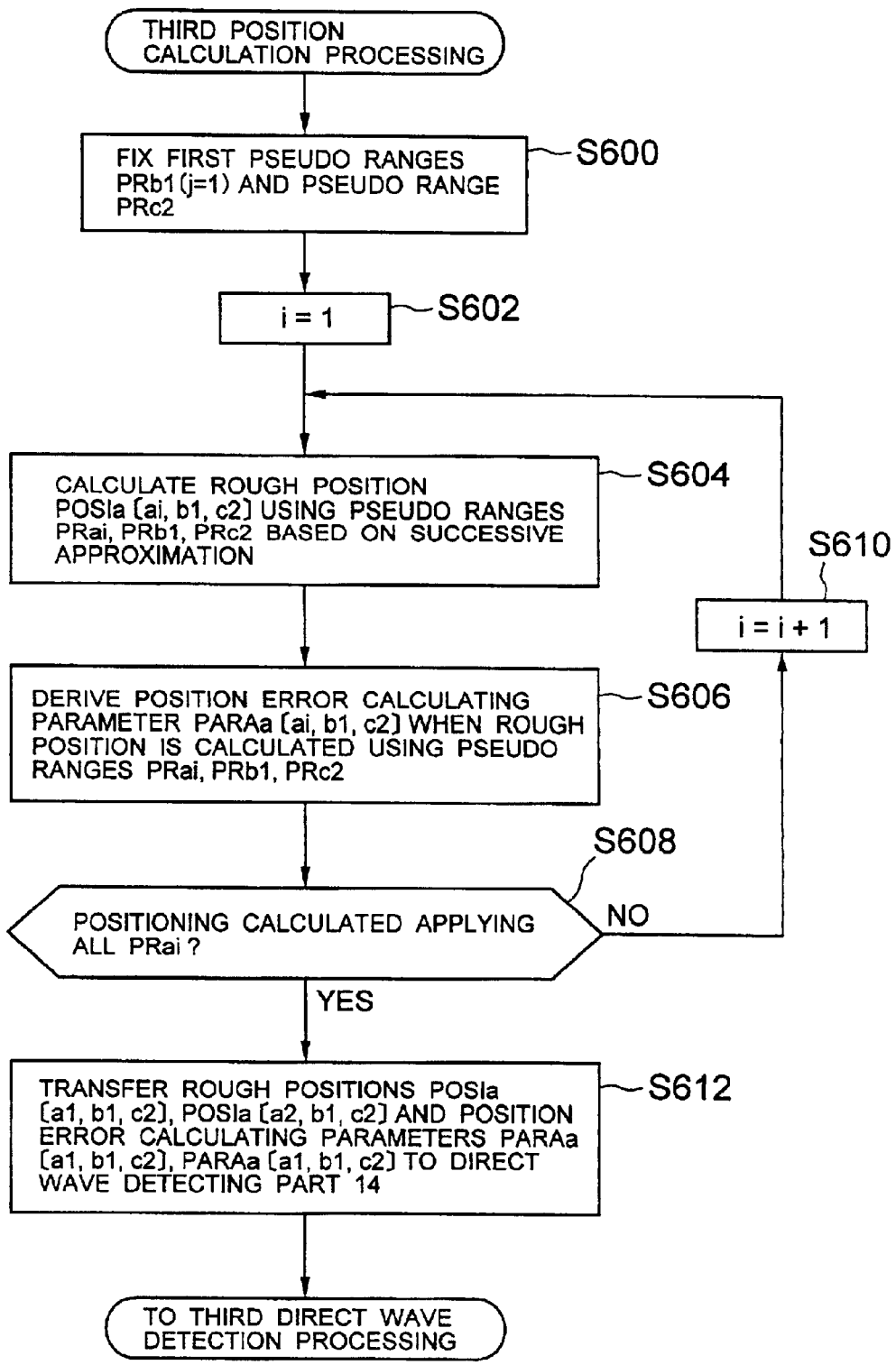
FIG. 19 is a flow chart for further explaining the positioning operation of the mobile station, specifically, the operation of third position calculation processing.

In the third position calculation processing illustrated in the flow chart of FIG. 19, first, at step S600, upon receipt of the determination information indicating that the pseudo range PRc2 is attributable to the direct wave from the base station C and the pseudo range PRb1 is attributable to the direct wave from the base station B, the pseudo ranges PRc2, PRb1 are fixed, and the two pseudo range PRa1, PRa2 corresponding to the radio wave from the base station A are selected as a combination of candidates for the third position calculation processing.

Next, at step S602, first pseudo range PRb1 (i=1) is selected for the calculation from the two pseudo ranges PRb1, PRb2, followed by transition to step S604. Then, at step S604, the rough position POSIa[a1, b1, c2] of the positioning apparatus 10 is calculated using the positions (xa, ya), (xb, yb), (xc, yc) of the base stations A, B, C, the fixed pseudo ranges Prb1, PRc2 and the first pseudo range PRa1 (i=1). It should be understood that the aforementioned successive approximation based processing is performed for this calculation, as is the case with the aforementioned position calculation processing.

Next, at step S606, the position error calculating parameter PARAa[a1, b1, c2], which is calculated when the rough position POSIa[a1, b1, c2] is calculated, is derived.

Specifically, the position error calculating parameter is calculated when the rough position POSIa[a1, b1, c2] is finally reached by the successive approximation.

Subsequently, at step S608, it is determined whether or not the rough position POSIa has been calculated by applying all of the two pseudo ranges PRa1, PRa2 corresponding to the incoming radio wave from the base station A. If the calculation processing has not been terminated (i.e., "NO"), the next pseudo range PRai is selected for the calculation at step S610, followed by a repetition of the processing from step S604.

Thus, by performing the processing at steps S602–S610, the calculation is performed using a combination of the pseudo ranges PRa1, PRa2 specified by the variable i, and the fixed pseudo ranges Prb1, PRc2 and as a result, two rough positions POSIa[a1, b1, c2] and POSIa[a2, b1, c2] are derived. Further, the position error calculating parameters PARAa[a1, b1, c2] and PARAa[a2, b1, c2] corresponding to the respective rough positions are also derived together with them.

Figure 20:
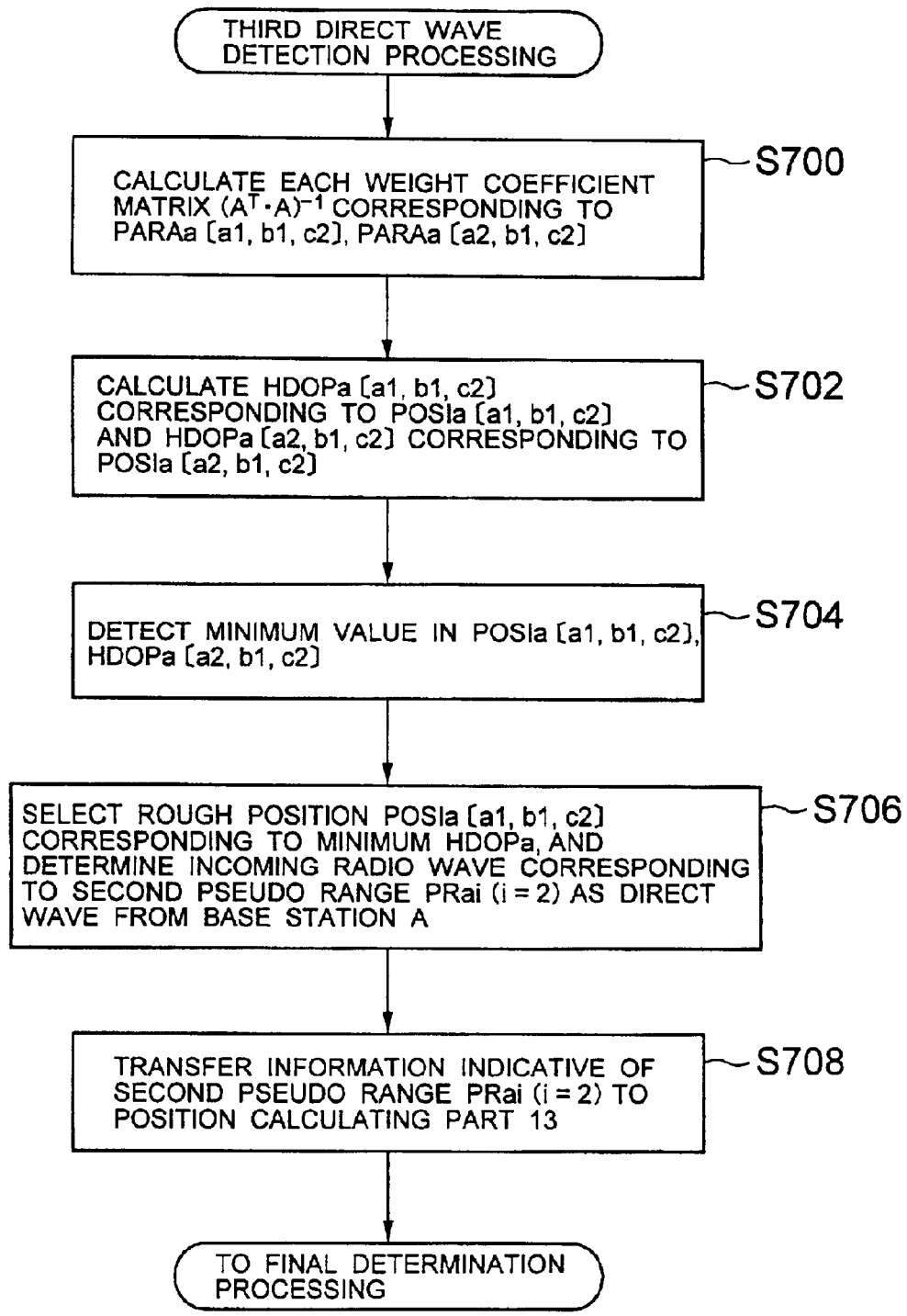
FIG. 20 is a flow chart for further explaining the positioning operation of the mobile station, specifically, the operation of third direct wave detection processing.

Next, the flow proceeds to step S612, where these rough positions POSIb[a1, b1, c2] and POSIb[a2, b1, c2] and position error calculating parameters PARAb[a1, b1, c2] and PARAb[a2, b1, c2] are transferred to the direct wave detecting part 14, followed by transition to the processing flow chart of FIG. 20 where the third direct wave detection processing is performed by the direct wave detecting part 14.

In the flow chart illustrated in FIG. 20, first at step S700, each weighting coefficient matrix is calculated, corresponding to the position error calculating parameters PARAa[a1, b1, c2] and PARAa[a2, b1, c2]. Further, at step S702, the positioning error HDOPa is calculated from each weighting coefficient matrix. Specifically, the calculation described in connection with the aforementioned equation (18) is performed to calculate a positioning error HDOPa[a1, b1, c2] corresponding to the rough position POSIa[a1, b1, c2] and a positioning error HDOPa[a2, b1, c2] corresponding to the rough position POSIa[a2, b1, c2].

Next, at step S704, the positioning error having a minimum value is detected from the calculated positioning errors HDOPa[a1, b1, c2] and HDOPa[a2, b1, c2]. Then, at step S706, the rough position corresponding to the minimum HDOPa (i.e., the positioning error having the minimum value) is selected from the rough positions POSIa[a1, b1, c2], POSIa[a2, b1, c2].

In this embodiment, assume that the second positioning error HDOPa[a2, b1, c2] (i=2) is minimal for convenience. And accordingly, the rough position POSIa[a2, b1, c2] corresponding thereto is selected. Then, the incoming radio wave corresponding to the second pseudo range PR2a (i=2) is determined to be the direct wave from the base station A.

Next, at step S708, determination information indicating that the second pseudo range PRa2 (i=2) of the pseudo ranges PRa1, PRa2 is attributable to the direct wave from the base station A, is transferred to the position calculating part 13. Then, the flow proceeds to the processing in the flow chart illustrated in FIG. 21, wherein the final determination processing is performed by the position calculating part 13.

Figure 21:
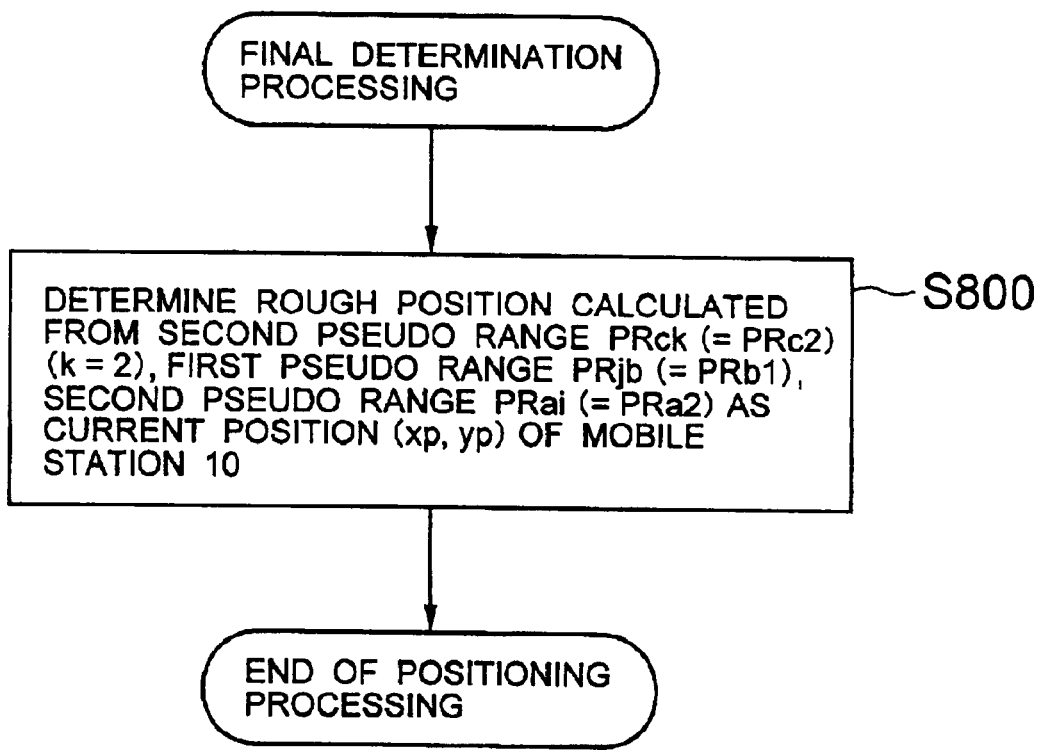
FIG. 21 is a flow chart for further explaining the positioning operation of the mobile station, specifically, the operation of final determination processing.

In the final determination processing illustrated in FIG. 21, at step S800, the rough position POSIa[a2, b1, c2], calculated from the pseudo range PRck (i.e., the second pseudo range PRc2 (k=2)) determined to be attributable to the direct wave from the base station C, the pseudo range PRbj (i.e., the first pseudo range PRb1 (j=1)) determined to be attributable to the direct wave from the base station B, and the pseudo range PRai (i.e., the second pseudo range PRa2 (i=2)) determined to be attributable to the direct wave from the base station A, is determined as the current position (xp, yp) of the positioning apparatus 10.

Then, the positioning data Dps indicative of the current position (xp, yp) is supplied from the position calculating part 13 to the controller 18, followed by completion of the positioning processing. In other words, the processing at step S106 in the flow chart illustrated in FIG. 14 is completed, followed by transition to the processing at step S108 onward in the same figure.

As described above in detail, according to this embodiment, incoming radio waves are first received from at least three base stations (for example, the base stations A, B, C) located around the positioning apparatus 10, and the correlation values CRRa, CRRb, CRRc are calculated by correlation calculations of output data Dd derived from the incoming radio waves with predetermined correlation data Da, Db, Dc for the respective base stations A, B, C. Next, as illustrated in FIGS. 12A through 12C, peaks are detected in these correlation values CRRa, CRRb, CRRc to detect respective pseudo ranges PRa1, Prb1, PRc1.

Notably, the error correction calculation processing is performed on the pseudo ranges derived from the detection of the peaks using predetermined error correction coefficients to calculate pseudo ranges PRa2, PRb2, PRc2 which are estimated to be attributable to the direct waves from the respective base stations. In this manner, the present invention provides significant effects of the ability to appropriately estimate the pseudo ranges of the direct waves arriving at the positioning apparatus 10 of the mobile station P from the respective base stations A, B, C and to facilitate the detection of the direct waves in the subsequent positioning processing.

Further, two pseudo ranges PRa1, PRa2, Prb1, PRb2, PRc1, PRc2 for each base station are corresponded to the respective base stations A, B, C, and the rough positions POSI are calculated by the triangulation with a combination of three pseudo ranges regarded as candidate. Then, the successive approximation based processing is performed for deriving the rough positions, thereby making it possible to derive more accurate rough positions POSI.

Specifically, a plurality of rough positions POSI are derived in accordance with the combination of three pseudo ranges, and the position error calculating parameters PARA and positioning errors HDOP, which represent positioning accuracies of the respective rough positions in this event, are calculated. The rough positions POSI are gradually narrowed down when the positioning error HDOP becomes minimal, and the finally reached rough position POSI is determined as the current position (xp, yp) of the positioning apparatus 10.

By narrowing down the rough positions in the foregoing manner, it is possible to select a direct wave less affected by multipath fading, noise and the like from a plurality of pseudo range candidates. Then, as the rough position POSI calculated using such a direct wave is determined as the current position (xp, yp) of the positioning apparatus 10, it is possible to accomplish the extremely accurate positioning processing which suppresses the influence of multipath fading, noise and the like.

Further, as illustrated in the aforementioned FIG. 22B, when the positioning error HDOP is larger than a predetermined value, the circle Cerr corresponding to the magnitude of the positioning error HDOP may be displayed on the display screen of the display part 16, in addition to the display "P" indicative of the current position (xp, yp), so that the use can be notified of to which degree the positioning result is correct, i.e., whether the positioning environment is good or bad, thereby improving the convenience.

(Second Embodiment)

Next, a second embodiment of the present invention will be described. For reference, the second embodiment relates to a modified embodiment of the positioning apparatus 10 described in the first embodiment.

The mobile station of the second embodiment is similar in configuration to the mobile station 10 of the first embodiment illustrated in FIGS. 9 through 11. Also, since the positioning processing is performed based on the principles similar to the positioning principles described with reference to FIGS. 11 and 12A through 12C, description on the configuration and positioning principles of the mobile station in the second embodiment is omitted.

However, the mobile station in the second embodiment operates in accordance with the positioning processing illustrated in FIG. 23 instead of the positioning processing illustrated in FIGS. 15 through 21 in the positioning processing steps of the positioning apparatus 10 in the first embodiment described with reference to FIGS. 11 through FIGS. 22A, 22B.

Specifically, in the aforementioned positioning apparatus 10 of the first embodiment, after the range measureing part 12 detects the pseudo ranges PRa1 Prb1, PRc1 and the direct wave estimating part 19 estimates the pseudo ranges PRa2 PRb2 PRc2 through the error correction processing at steps S100 through S105 illustrated in FIG. 14, the positioning processing at step S106 is performed in accordance with the flow charts illustrated in FIGS. 15–21. During this positioning processing, the calculation of the rough position POSI and position error calculating parameter PARA by the position calculating part 13, and the determination of the direct waves by the direct wave detecting part 14 are respectively repeated a plurality of times (three times in the first embodiment) to narrow down to a rough position POSI at which the positioning error HDOP becomes minimal, and the finally reached rough position POSI is determined as the current position (xp, yp) of the positioning apparatus 10.

Figure 23:
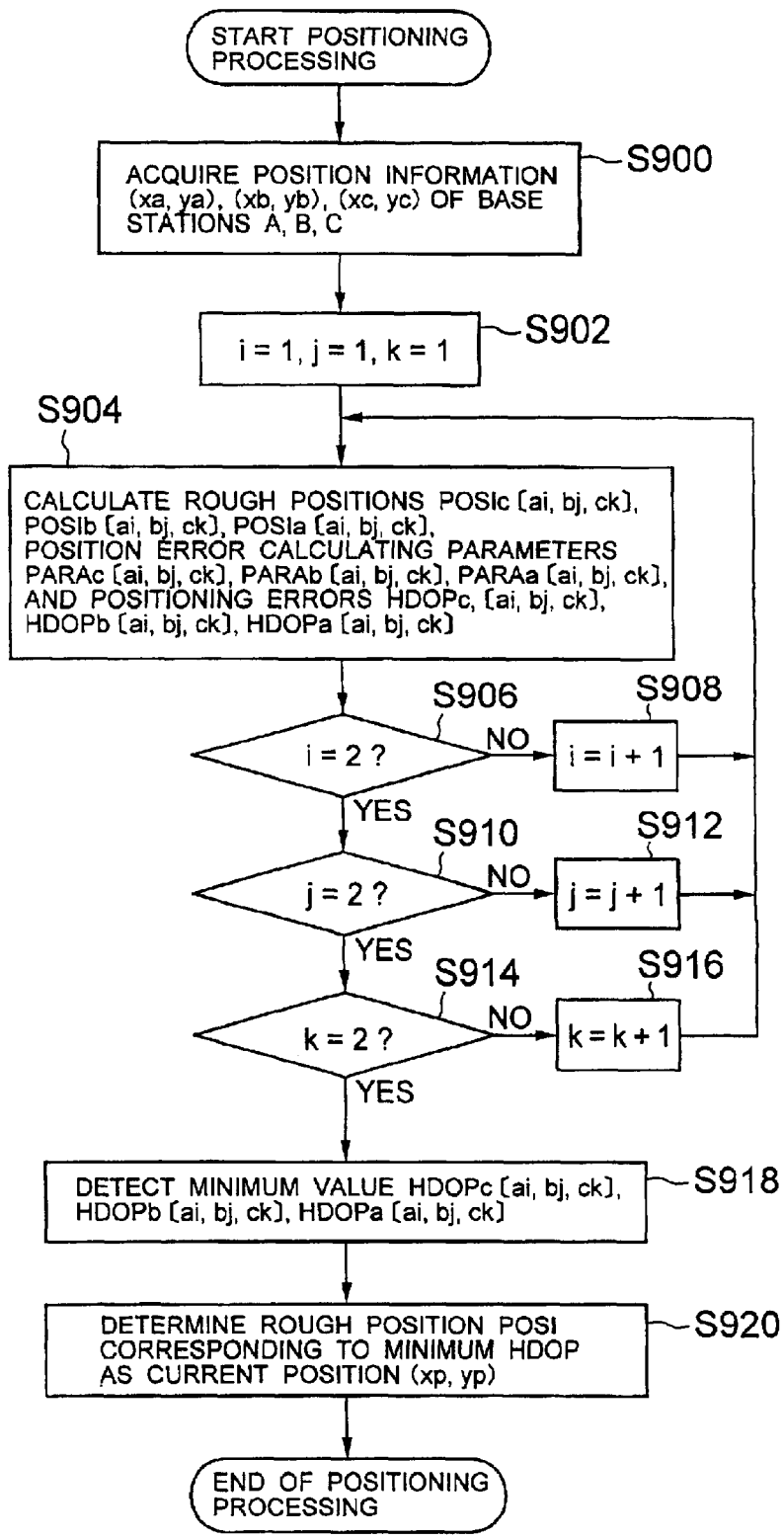
FIG. 23 is a flow chart for explaining the operation of a second embodiment.

On the other hand, the positioning apparatus in the second embodiment performs the positioning processing at step S106 shown in FIG. 14 in accordance with the flow chart of FIG. 23, without performing the processing of narrowing down to the rough position POSI at which the positioning error HDOP becomes minimal, as done in the first embodiment.

Specifically, in the positioning apparatus in the second embodiment, in the flow chart of FIG. 14, the range measureing part 12 detects the pseudo ranges PRa1 PRb1, PRc1 and the direct wave estimating part 19 estimates the pseudo ranges PRa2, PRb2, PRc2, followed by transition to step S900 in the flow chart of FIG. 23.

Then, at step S900, the position calculating part 13 first acquires information indicative of the positions (xa, ya), (xb, yb), (xc, yc) of the base stations A, B, C included in received data Drx.

Next, at steps S902–S916 in FIG. 23, the position calculating part 13 sequentially changes the variables i, j, k corresponding to the base stations A, B, C to select a combination of three pseudo ranges PRai, PRbj, PRck corresponding to the base stations A, B, C from among the pseudo ranges PRa1–PRa2, PRb1–PRb2, PRc1 PRc2. Then, in accordance with the three selected pseudo ranges PRai, PRbj, PRck, and the positions (xa, ya), (xb, yb), (xc, yc) of the base stations A, B, C, rough positions POSIc[ai, bj, ck], POSIb[ai, bj, ck], POSIa[ai, bj, ck], position error calculating parameters PARAc[ai, bj, ck], PARAb[ai, bj, ck], PARAa[ai, bj, ck], and positioning errors HDOPc[ai, bj, ck], HDOPb[ai, bj, ck], HDOPa[ai, bj, ck] are calculated based on the successive approximation.

Specifically, after the variables i, j, k are set to initial values (i=1, j=1, k=1) at step S902, the first rough position POSI, position error calculating parameter PARA and positioning error HDOP are collectively calculated using a combination of three pseudo ranges PRai, PRbj, PRck, and the positions (xa, ya), (xb, yb), (xc, yc) of the base stations A, B, C at step S904.

Next, at steps S906–916, the variables i, j, k are sequentially incremented, and the calculation processing at step S904 is repeated until all of the variables i, j, k reach two.

In this manner, eight rough positions POSIc[ai, bj, ck], POSIb[ai, bj, ck], POSIa[ai, bj, ck], eight position error calculating parameters PARAc[ai, bj, ck], PARAb[ai, bj, ck], PARAa[ai, bj, ck], and eight positioning errors HDOPc[ai, bj, ck], HDOPb[ai, bj, ck], HDOPa[ai, bj, ck] are calculated corresponding to all possible combinations (i.e., 2×2×2=8 combinations) of three pseudo ranges PRai, PRbj, PRck for each of the base stations A, B, C.

As eight each of the rough positions POSI, position error calculating parameters PARA and positioning errors HDOP have been calculated in the foregoing manner, the direct wave detecting part 14 next detects a minimum value of the eight positioning errors HDOP and notifies the position calculating part 13 of this information at step S918.

Next, at step S920, the position calculating part 13 determines the rough position POSI corresponding to the minimum value of positioning error HDOP as the current position (xp, yp) of the positioning apparatus 10, based on the information from the direct wave detecting part 14. Then, the position calculating part 13 supplies the controller 18 with positioning data Dps indicative of the current position (xp, yp), followed by transition to step S108 shown in FIG. 14.

In this manner, after eight each of the rough positions POSI, position error calculating parameters PARA and positioning errors HDOP are calculated based on the all possible combinations (eight combinations) of two each of the pseudo ranges PRa1–PRa2, PRb1–PRb2, PRc1–PRc2 for each base stations, derived by receiving the incoming radio waves from the base stations A, B, C, the rough position POSI at which the positioning error HDOP becomes minimal can be determined as the current position (xp, yp) of the positioning apparatus 10, making it possible to likewise accomplish the highly accurate positioning which suppresses the influence of multipath fading and noise.

(Third Embodiment)

Next, a third embodiment of the present invention will be described with reference to FIGS. 24–27.

In the aforementioned first and second embodiments, the positioning apparatus 10 of the mobile station receives incoming radio waves from base stations to determine its own current position (xp, yp). On the other hand, the third embodiment, described below, is such that base stations determine the current position (xp, yp) of a mobile station to accomplish highly accurate positioning which suppresses the influence of multipath fading, noise and the like.

Figure 24:
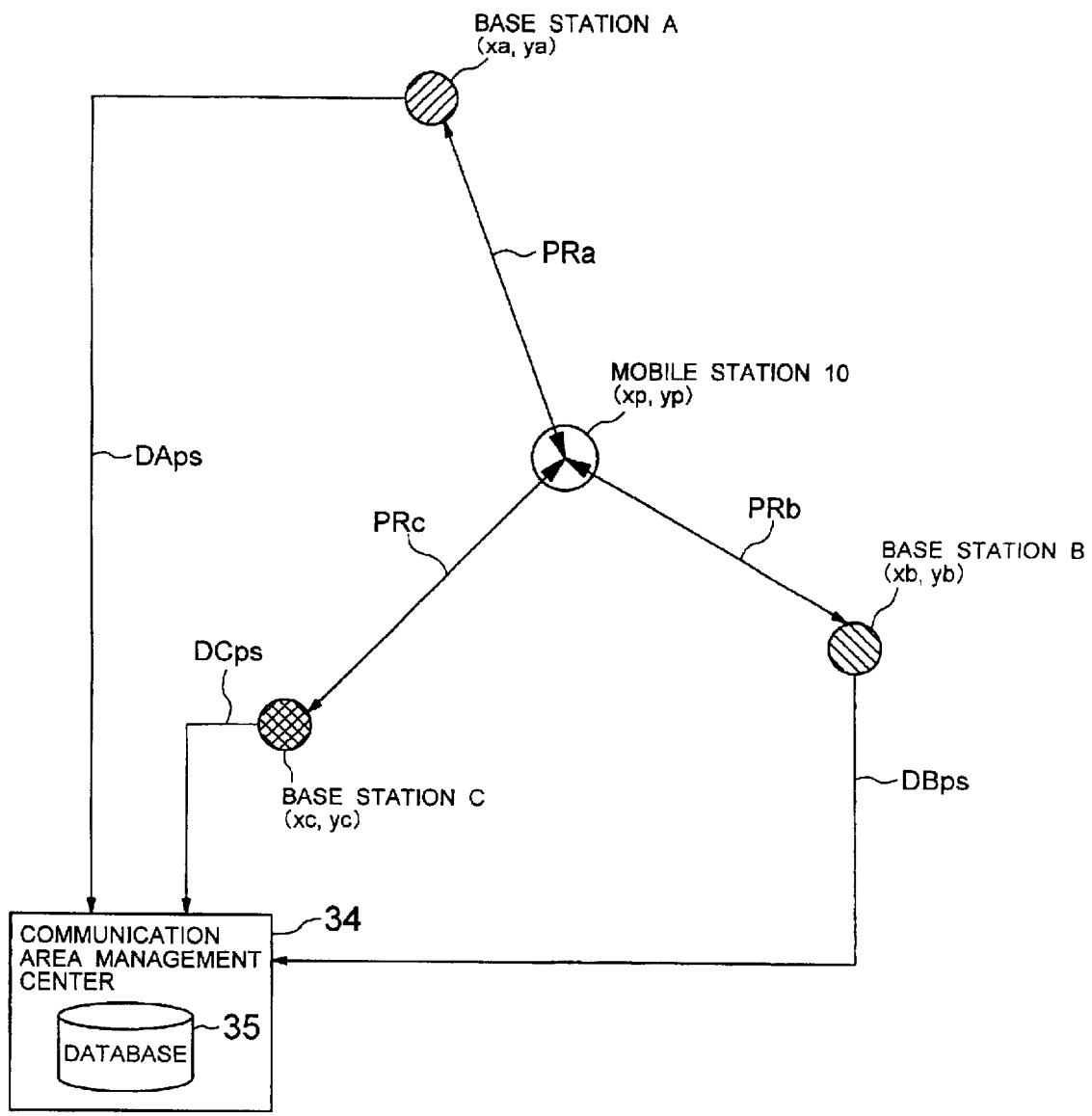
FIG. 24 is an explanatory diagram for explaining the positioning principles in a third embodiment.

Specifically, according to the third embodiment, as schematically illustrated in FIG. 24, as a mobile station 10 transmits a radio wave for requesting positioning (hereinafter called the "positioning radio wave") at an arbitrary position within a communication area, base stations A, B, C, for example, located around the mobile station 10 receive this positioning radio wave. Then, each of the base stations A, B, C and a communication area management center 34 responsible for managing the base stations A, B, C determine the current position (xp, yp) of the mobile station 10. Specifically, when a request for navi information such as a map is made from the mobile station 10, a database 35 provided in the communication area management center 34 is searched for navi information related to the current position (xp, yp) of the mobile station 10, and the determined current position (xp, yp) of the mobile station and the searched navi information are transmitted to the mobile station 10 through any of the base stations A, B, C or through another base station.

Figure 25:
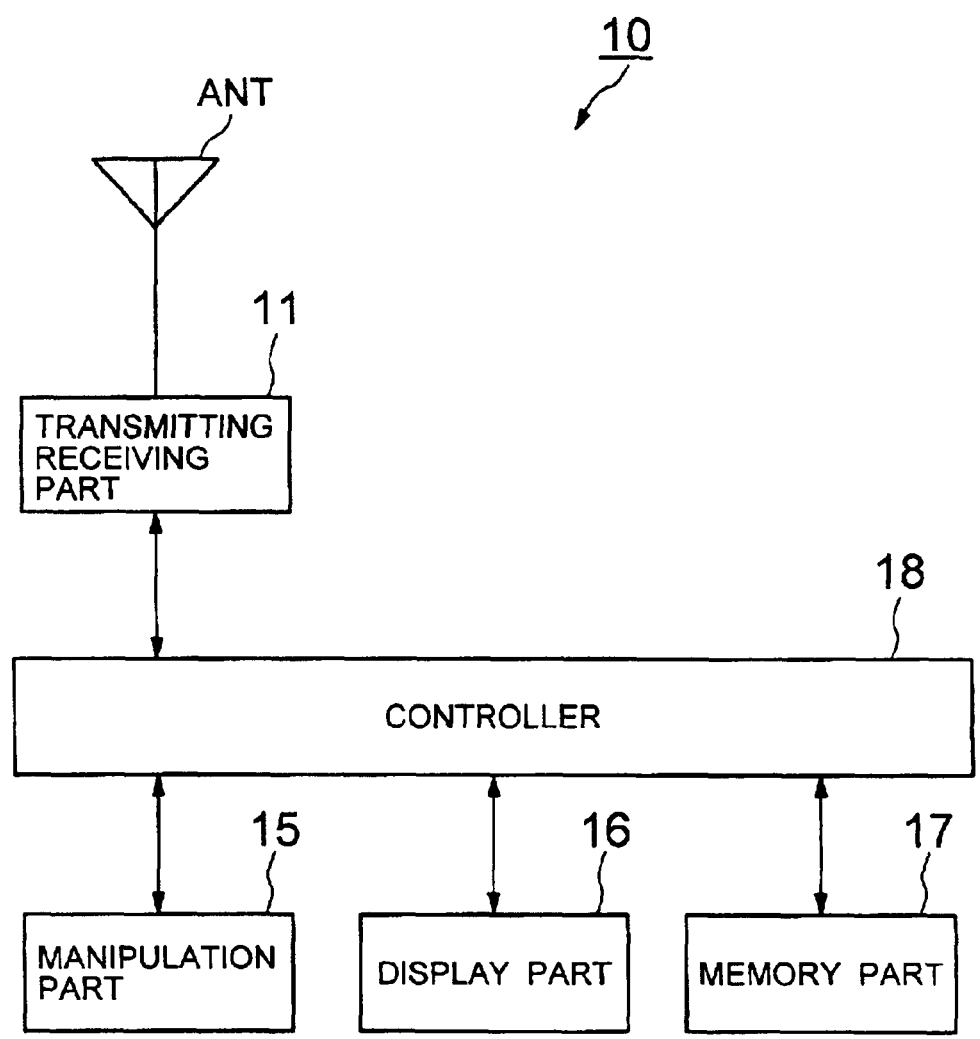
FIG. 25 is a block diagram illustrating the configuration of a mobile station in the third embodiment.
Figure 26A:
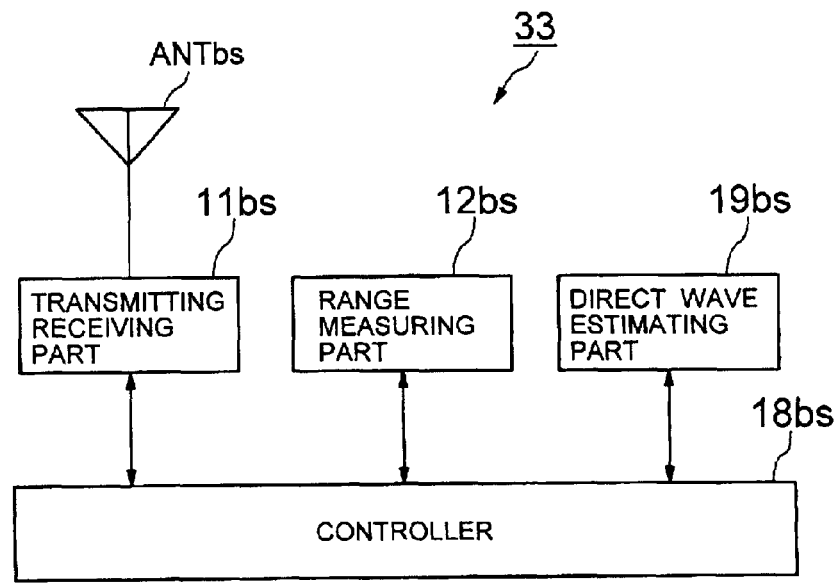
FIGS. 26A and 26B are block diagrams illustrating the configuration of a positioning apparatus installed in a base station, and a management center in the third embodiment, respectively.
Figure 26B:
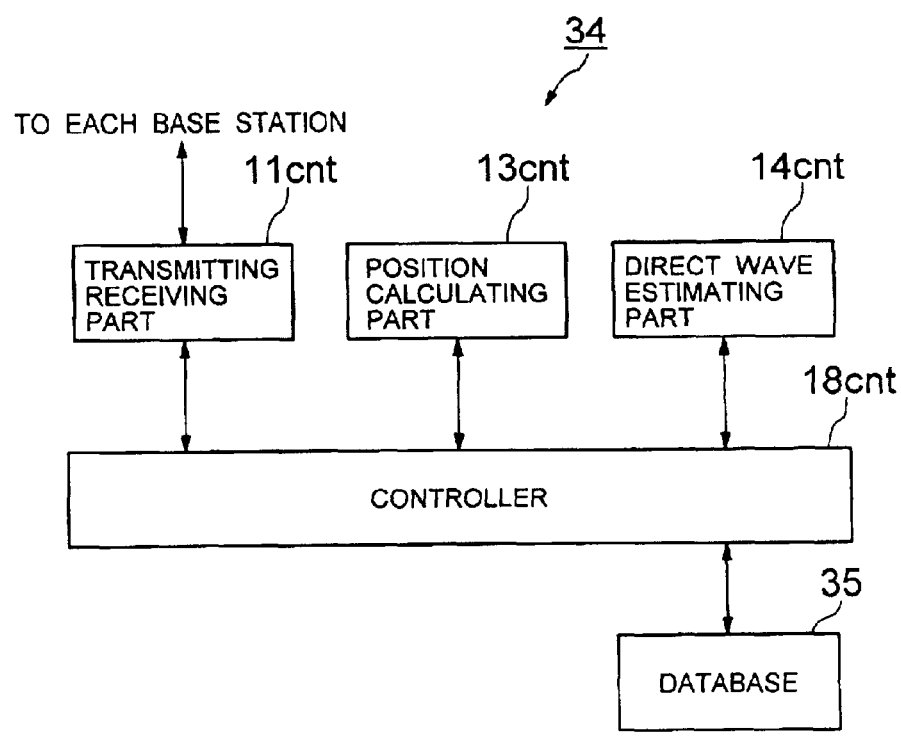

FIG. 25 is a block diagram illustrating a main portion of a positioning apparatus 10 of the mobile station in the third embodiment, FIG. 26A is a block diagram illustrating a positioning apparatus 33 provided in each base station, and FIG. 26B is a block diagram illustrating the configuration of a main portion of the communication area management center 34.

The configuration of the positioning apparatus 10 in the third embodiment illustrated in FIG. 25 will be described in comparison with the positioning apparatus 10 in the first embodiment illustrated in FIG. 9 in the following manner. Specifically, the positioning apparatus 10 in the third embodiment comprises a transmission/reception antenna ANT, a transmitting/receiving part 11, a manipulation part 15, a display part 16, a memory part 17, and a controller 18 for communicating with each base station, however, omits the range measureing part 12, position calculating part 13, direct wave detecting part 14, and direct wave estimating part 19 which have been previously described in the first embodiment. Therefore, in the third embodiment, when the user of the mobile station (positioning apparatus) 10 desires to confirm the current position, the user should request base stations for positioning through the manipulation part 15.

On the other hand, each base station comprises a positioning apparatus 33 in the configuration illustrated in FIG. 26A. The positioning apparatus 33 comprises a transmission/reception antenna ANTbs, a transmitting/receiving part 11bs, a range measureing part 12bs, and a direct wave estimating part 19bs for communicating with the positioning apparatus 10, and a controller 18bs for intensively controlling the operation of the overall positioning apparatus 33.

The transmitting/receiving part 11bs is basically identical in configuration to the transmitting/receiving part 11 (see the aforementioned FIG. 10) which comprises the receiver section 11rx and transmitter section 11tx in the first embodiment. Therefore, as the transmitting/receiving part 11bs receives an incoming radio wave (i.e., the aforementioned positioning radio wave) from the positioning apparatus 10 in the mobile station, a despread code sequence generator 24 provided in the receiver section 11rx in the transmitting/receiving part 11bs generates a despread code sequence CODErx corresponding to the positioning apparatus 10, and a despreader 22 performs a cross correlation calculation of the despread code sequence CODErx with output data Ds output from a roll off filter 21. On the other hand, for transmitting a radio wave to the positioning apparatus 10 in the mobile station, a spread code sequence generator 28 provided in the transmitter section 11tx in the transmitting/receiving part 11bs generates a spread code sequence CODEtx corresponding to the positioning apparatus 10, and a spreader 27 performs a cross correlation calculation of the spread code sequence CODEtx with transmission data Dtx to be transmitted, and supplies the result to the roll off filter 26.

The range measureing part 12bs has the configuration similar to the range measureing part 12 in the first embodiment illustrated in the aforementioned FIGS. 9 and 11. However, the range measureing part 12 in the first embodiment is configured to comprise at least three or more signal processing systems in order to calculate a correlation value corresponding to each base station based on each incoming radio wave from each of at least three base stations. On the other hand, the range measureing part 12bs in the third embodiment illustrated in FIG. 26A may be provided with at least one or more signal processing system in order to calculate a correlation value based on the positioning radio wave from the positioning apparatus 10 during the positioning. In other words, the range measureing part 12bs is only required to have one signal processing system as a minimum number of signal processing apparatus.

Therefore, for convenience of explaining the third embodiment, assume that the positioning apparatus 33 of the base station A, for example, is provided with the range measureing part 12bs which has one signal processing system that comprises the correlator 29a, correlation data generator 31a, range calculating part 30a, and threshold value generator 32a illustrated in FIG. 11 of the first embodiment. Assume also that the positioning apparatus 33 of the base station B is provided with the range measureing part 12bs which has one signal processing system that comprises the correlator 29b, correlation data generator 31b, range calculating part 30b, and threshold value generator 32b likewise illustrated in FIG. 11. Then, assume that the positioning apparatus 33 of the base station C is provided with the range measureing part 12bs which has one signal processing system that comprises the correlator 29c, correlation data generator 31c, range calculating part 30c, and threshold value generator 32c likewise illustrated in FIG. 11. The following description will be made on the foregoing assumption.

Assume further that each of the correlation data generators 31a, 31b, 31c provided in each of these base stations generates correlation data Da, Db, Dc corresponding to mobile station identification data included in the positioning radio wave from the positioning apparatus 10, and supplies the correlation data Da, Db, Dc to each correlator 29a, 29b, 29c. Then, the positioning apparatus 33 of the base station A, for example, detects a peak in a manner similar to that illustrated in FIG. 12A, to detect a pseudo range PRa1 from the correlation value CRRa. Similarly, the positioning apparatuses 33 in the other base stations B, C, detect respective pseudo ranges Prb1, PRc1 from respective correlation values CRRb, CRRc.

Subsequently, each pseudo range detected in the range measureing part 12bs in the positioning apparatus 33 of each base station is supplied to the direct wave estimating part 19bs, and subjected to direct wave estimation processing based on an error correction calculation.

In the third embodiment, the error correction processing for estimating a direct wave is performed in the direct wave estimating part 19bs provided in the base station. Therefore, the error correction coefficient for use in the error correction calculation described in the first embodiment is stored in the base station in principle. In other words, the third embodiment also eliminates the processing for transmitting the error correction coefficient from the base station to the mobile station in the position registration which is regarded indispensable when the error correction coefficient is stored in the base station in the first embodiment.

The error correction coefficient suitable for use in the third embodiment may be the universal error correction coefficient ErC in an urban district, as described in the first embodiment, or the error correction coefficient Eri (i=a, b, c) calculated for each base station. The error correction calculation performed by the direct wave estimating part 19bs is similar to the processing in the direct wave estimating part 19 in the mobile station described in the first embodiment, so that description thereon is omitted.

The foregoing processing results in the pseudo ranges PRa1, Prb1, PRc1 detected for the respective base stations A, B, C, and pseudo ranges PRa2, PRb2, PRc2 calculated by applying a predetermined error correction calculation to these pseudo ranges.

In the third embodiment, each base station transfers these pseudo range candidates to the communication area management center 34. Specifically, the positioning apparatus 33 of the base station A transfers the pseudo ranges PRa1, PRa2 to the communication area management center 34; the positioning apparatus 33 of the base station B transfers the pseudo ranges Prb1, PRb2; and the positioning apparatus 33 of the base station C transfers the pseudo ranges PRc1, PRc2.

Also, when the positioning radio wave from the mobile station 10 includes navi information request data indicative of a request for navi information, the navi information request data is simultaneously transferred from each base station A, B, C to the communication area management center 34.

As illustrated in FIG. 26B, the communication area management center 34 comprises a transmitting/receiving part 11cnt for communicating with each base station within the communication area; a position calculating part 13cnt; a direct wave detecting part 14cnt; a database 35; and a controller 18cnt for intensively controlling the overall communication area management center 34.

Assume herein that the transmitting/receiving part 11cnt performs high speed communications, for example, through a dedicated digital line such as an optical fiber communication path routed between the communication area management center and each base station. Specifically, the communication area management center 34 is configured to receive data such as pseudo range data, navi information request data, and the like transferred thereto from the respective base stations A, B, C through an optical fiber communication path or the like.

Further, the position calculating part 13cnt and direct wave detecting part 14cnt provided in the communication area management center 34 perform the positioning processing based on the triangulation or successive approximation using respective pseudo ranges transferred from the base stations A, B, C and the respective known positions (xa, ya), (xb, yb), (xc, yc) of the base stations A, B, C.

In other words, the position calculating part 13cnt and direct wave detecting part 14cnt perform the positioning processing similar to that illustrated in the flow charts of FIGS. 15–21 in the first embodiment, or the positioning processing similar to that illustrated in the flow chart of FIG. 23 in the second embodiment.

The database 35 contained in the communication area management center 34 is formed of a so-called high capacity database server which stores a variety of information such as information on maps and a variety of facilities, information on a variety of events, information on shopping, and the like. Then, when a request for navi information has been made from the mobile station 10, the controller 18cnt searches the database 35 based on the position information (xp, yp) of the mobile station 10 resulting from the positioning processing by the position calculating part 13cnt and direct wave detecting section 14cnt to extract data associated with the position information. Then, the extracted data is transferred (returned) as the navi information, together with the previously calculated position information (xp, yp), to any of the base stations A, B, C, or another base station which exhibits a favorable communication environment with the mobile station 10. The information is transmitted (delivered) from the base station, to which it has been transferred, to the positioning apparatus of the mobile station 10 as the navi information and position information (xp, yp).

Next, description will be made on the positioning processing performed between the positioning apparatus of the mobile station 10, the base stations A, B, C, and the communication area management center 34, having the configuration as described above, with reference to a flow chart illustrated in FIG. 27.

In FIG. 27, at step S1000, as the user issues an instruction for requesting the positioning processing by manipulating the manipulation part 15 (see FIG. 25) provided in the positioning apparatus 10 of the mobile station, the controller 18 instructs the transmitting/receiving part 11 to transmit a positioning radio wave. Also, when the user instructs a request for the positioning processing and a request for navi information, the controller 18 instructs the transmitting/receiving part 11 to transmit navi information request data for instructing the request for navi information included in the positioning radio wave.

As the mobile station 10 (i.e., the positioning apparatus 10) transmits the positioning radio wave, the base stations A, B, C, for example, located around the positioning apparatus 10, will individually receive the positioning radio wave at step S1002.

Then, at step S1004, when the transmitting/receiving part 11bs provided in the positioning apparatus 33 of each base station A, B, C confirms that the positioning radio wave has been received, confirmation information is transferred from the respective positioning apparatuses 33 to the communication area management center 34. Also, each positioning apparatus 33 proceeds to the processing at step S1006, where the each base station individually detects a pseudo range.

At step S1006, the positioning apparatus 33 in the base station A, for example, calculates a correlation value CRRa corresponding to the positioning radio wave by means of the range measureing part 12bs provided therein, and detects a peak of the correlation value CRRa to detect a pseudo range PRa1. Further, based on the pseudo range PRa1 the direct wave estimating part 19bs in the positioning apparatus 33 calculates a pseudo range PRa2 to which a predetermined error correction is applied. Likewise, in the other base stations B, C, the positioning apparatuses 33 in the respective base stations calculate the pseudo ranges Prb1, PRb2, and PRc1, PRc2. Subsequently, the pseudo ranges calculated by the respective base stations are transferred from the respective base stations A, B, C to the communication area management center 34.

Next, at step S1008, the position calculating part 13cnt and direct wave detecting part 14cnt in the communication area management center 34 determine current position (xp, yp) of the mobile station 10 based on the triangulation and successive approximation using the transferred pseudo ranges, and the known positions (xa, ya), (xb, yb), (xc, yc) of the respective base stations A, B, C.

Here, the position calculating part 13cnt and direct wave detecting part 14cnt perform the processing similar to the positioning processing illustrated in FIGS. 15–21 in the first embodiment, or the positioning processing illustrated in FIG. 23 in the second embodiment to determine the current position (xp, yp) of the mobile station 10.

Next, at step S1010, when a request for navi information is made from the mobile station 10, the controller 18cnt in the communication area management center 34 searches information in the database 35 based on the current position (xp, yp) of the positioned mobile station 10. Then, as the controller 18cnt acquires navi information associated with the current position (xp, yp) of the mobile station 10, the flow proceeds to step S1012. When no request for navi information is made from the mobile station 10, the flow proceeds to step s1012 without making the search.

Subsequently, at step S1012, the controller 18cnt transfers (returns) the current position information of the mobile station 10, and the retrieved navi in-formation to any of the base stations A, B, C, or another base station which exhibits a favorable communication environment with the mobile station 10. When no request for navi information is made from the mobile station, the current position information alone is transferred to the base station.

The current position information of the mobile station, or the current position information and navi information transferred from each base station is transmitted (delivered) from each base station to the positioning apparatus 10 of the mobile station. Then, as such transmission (delivery) is performed, the positioning apparatus 10 of the mobile station receives an incoming radio wave from the base station at step S1014. Specifically, the transmitting/receiving part 11 of the positioning apparatus 10 illustrated in FIG. 25 receives the incoming radio wave and reproduces received data. Then, the controller 18 acquires the current position (xp, yp) of the mobile station, or the current position (xp, yp) and navi information from the received data.

Subsequently, at step S1016, the controller 18 stores the acquired information on the current position (xp, yp), or current position (xp, yp) and navi information in the memory part 17, and supplies the same to the display part 16 to display as illustrated in FIG. 22A, followed by the termination of the processing.

Though not described in the flow chart of FIG. 27, when the communication area management center 34 performs the positioning processing at step S1008, a positioning error HDOP corresponding to the calculated current position (xp, yp) is converted to a distance, and information on the converted distance may be additionally transmitted (delivered) from the base station to the mobile station 10, thereby displaying a circle Cerr or the like for notifying the positioning accuracy on the display part 16 of the positioning apparatus 10, as illustrated in FIG. 22B.

As described above, according to the third embodiment, since the base station performs the positioning related to the current position of the mobile station, the positioning apparatus 10 in the mobile station need not comprise the functions for the positioning. It is therefore possible to significantly simplify the configuration of the positioning apparatus 10. Particularly, the third embodiment can provide such effects as the ability to determine the current position of an existing CDMA-based portable telephone which does not have the positioning function even if such a mobile station is utilized.

Also, since the base station stores the error correction coefficient for use in the error correction calculation made by the direct wave estimating part 19bs, the use of the error correction coefficient calculated for each base station is facilitated in the extreme. In other words, more accurate error correction processing can be accomplished corresponding to a particular radio wave propagation situation of each base station.

In the third embodiment, as illustrated in FIGS. 26A and 22B, the positioning apparatus 33 in the base station is provided with the range measureing part 12bs and direct wave estimating part 19bs, and the communication area management center 34 is provided with the position calculating part 13cnt and direct wave detecting part 14cnt. The third embodiment, however, is not limited to this configuration.

For example, the range measureing part 12 having a plurality of signal processing systems, the direct wave estimating part 19, the position calculating part 13, and the direct wave detecting part 14, illustrated in FIG. 11 of the first embodiment, may be provided in the communication area management center 34, while the transmitting/receiving part 11bs and controller 18bs alone may be provided in each base station.

In such a system configuration, if employed, the illustrated base stations A, B, C receive a positioning radio wave from the positioning apparatus 10 of the mobile station, and transfer output data Dd output from roll off filters in the respective transmitting/receiving parts 11bs to the communication area management center 34. In this manner, the communication area management center 34 collectively performs the processing up to the determination of the current position of the mobile unit, which is implemented by the range measureing part 12, direct wave estimating part 19, position calculating part 13 and direct wave detecting part 14 in the first embodiment. Further, since this configuration, if employed, eliminates the need for providing the functions for the positioning in each base station, it is possible to construct a system which is capable of determining the current position of the mobile station in accordance with the present invention, using base stations in an existing CDMA-based portable telephony.

Alternatively, upon receipt of a positioning radio wave from the positioning apparatus 10 of the mobile station, the base station may transfer the positioning radio wave to the communication area management center 34, as it is, without reproducing the positioning radio wave, such that the communication area management center 34 receives the positioning radio wave and determines the current position (xp, yp) of the mobile station by means of the range measureing part 12 having a plurality of signal processing systems, illustrated in FIG. 11, the direct wave estimating part 19, the position calculating part 13, and the direct wave detecting part 14. Likewise, with such a system configuration, it is possible to construct a system which is capable of determining the current position of the mobile station in accordance with the present invention, using existing CDMA-based base stations.

While a variety of foregoing embodiments according to the present invention have been described for a portable telephone, or a car-equipped navigation apparatus as the mobile station, the present invention is not limited to them, but may be applied to an electronic information device, for example, a personal digital assistant (PDA), a personal computer and the like, when such a device is provided with a communication adapter or the like for use as a mobile station.

Similar determination of the current position is possible not only in the CDMA scheme but also in other communication schemes.

While a variety of embodiments according to the present invention have been shown, the number of pseudo range candidates derived by the detection of pseudo range candidates by the range measureing part 12, and the estimation of pseudo range candidates by the direct wave estimating part 19, in the positioning apparatus 10 or positioning apparatus 33 in the respective embodiments is not limited to that indicated in the foregoing embodiments.

For example, when the range calculating part 30t (t=a, b, c) in the range estimating part 12 detects a peak of a correlation value CRRt (t=a, b, c, . . .) for each signal system, the range calculating part 30t may detect two or more peak values which exceed a threshold value THDt (t=a, b, c).

Taking as an example the correlation value CRRa from the base station A for explanation, where there are a plurality of peak values which exceed a threshold value THDa, in addition to the largest peak value exceeding the threshold value THDa, peak values including them may be detected. For example, when two peak values, i.e., the largest value and the next largest peak value are detected, delay times t1, t2 to the detection of these peaks are found, and pseudo range calculated based on the delay times are designated PRa1, PRa2.

In this case, assume that the direct wave estimating part 19 performs the error correction calculation processing for the aforementioned direct wave estimation based on the pseudo range PRa1 which exhibits the largest peak to generate an estimated pseudo range PRa3. Therefore, the position calculation processing and direct wave detection processing respectively performed by the position calculating part 13 and direct wave detecting part 14, illustrated in FIGS. 15–21 and 23, involve calculations using three pseudo ranges PRt1–PRt3 in each of the base stations A, B, C.

Specifically showing, count values for determining the completion of calculations in FIGS. 15, 17, 19, 23 may be set i=3, j=3, k=3, respectively.

Further, the number of peaks extracted from a correlation value CRRt by the range calculating part 30t in the range estimating part 12 is not limited to the aforementioned two. For example, the number may be increased if such an increase is allowed from the relationship with the processing speed of the positioning apparatus 10 or positioning apparatus 33, and the capacity of built-in memories. It should be understood that in this case, the values of i, j, k increase.

Also, the number of direct wave candidates estimated by the direct wave estimating part 19 through the error correction calculations may be increased. For example, as for the aforementioned illustration, the direct wave estimating part 19 may perform the error correction calculation processing on each of the pseudo ranges PRa1, PRa2 detected by the range estimating part to generate two pseudo range candidates PRa3, PRa4 which may be used for subsequent positioning calculation processing.

By thus increasing the number of direct wave candidates, the accuracy of the approximation is increased in the positioning calculation processing, so that the current position of the mobile station can be more accurately calculated.

In each of the embodiments described above, only one error correction coefficient is used by the direct wave estimating part 19 to perform the error correction calculation for the direct wave estimation. Alternatively, two or more error correction coefficients may be used.

For example, the direct wave estimating part 19 may utilize a standard deviation $\sigma$ of error correction coefficients which are derived in statistically calculating the universal error correction coefficient ErC in a base station in an urban district. Specifically, three error correction coefficients ErC and ErC±$\sigma$ are utilized. In this case, therefore, assuming that a pseudo range detected from the peak value of the correlation value CRRa attributable to the incoming radio wave from the base station A is PRa1 the direct wave estimating part 19 performs the error correction calculations as expressed by the following equations (19)–(21) using the three error correction coefficients as mentioned above to calculate pseudo range candidates PRa2–PRa4 which are estimated to be direct waves.

$$PR2a=PRa1\times(1-ErC) \quad (19)$$

$$PR3a=PRa1\times(1-(ErC+\sigma)) \quad (20)$$

$$PR4a=PRa1\times(1-(ErC-\sigma)) \quad (21)$$

In the subsequent positioning processing, such four pseudo range candidates may be used for each base station, or only three pseudo range candidate PRa2–PRa4, to which the error correction processing is applied, may be used. Further, arbitrary two pseudo range candidates may be selected from PRa2–PRa4 for use in the positioning processing.

As described above in detail, the positioning apparatus according to the present invention can perform a highly accurate position detection while preventing a degraded positioning accuracy due to the influence of multipath wave and the like in an urban district, which have been conventionally problematic.

Also, since the basic functions of a receiving part in a portable telephone are utilized as the positioning apparatus, the present invention does not require functional blocks dedicated to a positioning system such as a GPS receiver. It is therefore possible to realize an extremely small-size and low-cost positioning apparatus and simultaneously reduce the power consumption.

In addition, by providing the positioning function in base stations, a system capable of positioning can be constructed even using a quite general portable telephone. Further, by providing the positioning function in a management center for collectively managing a plurality of base stations, it is possible to construct a system capable of positioning using a general portable telephone communications system.

This application is based on Japanese Patent Application No. 2001-90928 which is herein incorporated by reference.

What is claimed is:

1. A positioning apparatus for determining a current position of a mobile station located in a communication area utilizing radio waves arriving from a plurality of base stations installed in said communication area, said positioning apparatus disposed in said mobile station, comprising:

a received signal generating part which receives radio waves arriving from said plurality of base stations to generate a received signal in accordance with each received radio wave;

a direct wave candidate extracting part which extracts at least one or more direct wave candidate for each base station from the respective radio waves arriving from said plurality of base stations based on said received signals;

a direct wave candidate estimating part which performs predetermined error correction processing on a direct wave candidate extracted by said direct wave candidate extracting part to estimate at least one or more corrected direct wave candidate;

a direct wave deriving part which derives a received signal corresponding to a true direct wave using at least one or more direct wave candidate for each base station within the direct wave candidates and corrected direct wave candidate extracted and estimated in said direct wave candidate extracting part and said direct wave candidate estimating part; and a positioning calculating part which determines the current position of said mobile station based on the received signal corresponding to the true direct wave derived by said direct wave deriving part.

2. A positioning apparatus for determining a current position of a mobile station utilizing a radio wave emitted from said mobile station located in a communication area and arriving at a plurality of base stations installed in said communication area, said positioning apparatus disposed in each of said base stations, comprising:

a received signal generating part provided in each of said plurality of base stations which receives a radio wave arriving from said mobile station to generate a received signal in accordance with each received radio wave;

a direct wave candidate extracting part which extracts at least one or more direct wave candidate for each base station from each radio wave arriving at each of said plurality of base stations based on said received signal;

a direct wave candidate estimating part which performs predetermined error correction processing on the direct wave candidate extracted by said direct wave candidate extracting part to estimate at least one ore more corrected direct wave candidate;

a direct wave deriving part which derives a received signal corresponding to a true direct wave using at least one or more direct wave candidate for each base station within the direct wave candidates and corrected direct wave candidate extracted and estimated in said direct wave candidate extracting part and said direct wave candidate estimating part; and a positioning calculating part which determines the current position of said mobile station based on the received signal corresponding to the true direct wave derived by said direct wave deriving part.

3. A positioning apparatus according to claim 1, wherein said mobile station performs a position registration with said plurality of base stations, wherein said mobile station acquires installation environment information related to each base station from said base station to determine an environment in which said base station is installed based on said information, and conducts a predetermined control on the estimation of direct wave candidate by said direct wave candidate estimating part in accordance with the result of determination on said installation environment.

4. A positioning apparatus according to claim 3, wherein said mobile station forces said direct wave candidate estimating part to perform said error correction processing to estimate a direct wave when said installation environment is bad as a radio wave propagation environment, and said mobile station controls said direct wave candidate estimating part to stop said error correction processing to estimate a direct wave when said installation environment is good as a radio wave propagation environment.

5. A positioning apparatus according to claim 1, wherein said mobile station previously stores a predetermined error correction coefficient, and said direct wave candidate estimating part, when estimating a direct wave by said error correction processing, performs predetermined error correction calculation related to a radio wave propagation on the direct wave candidate extracted by said direct wave candidate extracting part based on said error correction coefficient to estimate at least one or more corrected direct wave candidate.

6. A positioning apparatus according to claim 1, wherein:

each of said plurality of base stations stores at least one or more error correction coefficient related to a radio wave propagation, previously calculated from the installation environment of each base station;

said mobile station acquires said error correction coefficient related to each base station from said base station when said mobile station performs a position registration with said plurality of base stations, or communicates with said plurality of base stations; and said direct wave candidate estimating part performs predetermined error correction calculation related to the radio wave propagation on the direct wave candidate extracted by said direct wave candidate extracting part based on the acquired error correction coefficients, when said error correction processing is performed, to estimate at least one or more corrected direct wave candidate.

7. A positioning apparatus according to claim 2, wherein:

each of said plurality of base stations stores at least one or more error correction coefficient related to a radio wave propagation situation previously calculated from an installation environment of each base station; and said direct wave candidate estimating part performs a predetermined error correction calculation related to a radio wave propagation for the direct wave candidate extracted by said direct wave candidate extracting part based on said error correction coefficient, when said error correction processing is performed, to estimate at least one or more corrected direct wave candidate.

8. A positioning apparatus according to claim 6, wherein said error correction coefficient is calculated by a predetermined statistical calculation processing based on a measurement result of the radio wave propagation situation in a communication area of each base station.

9. A positioning apparatus according to claim 1, wherein:

said direct wave candidate extracting part and said direct wave candidate estimating part extract and estimate one or more each of direct wave candidate and modified direct wave candidate for each of radio waves arriving at said mobile station from at least three different base stations;

said direct wave deriving part performs first direct wave derivation processing, wherein said direct wave deriving part fixes two of said direct wave candidates selected one by one for each base station from said extracted and estimated direct wave candidates corresponding to a first and a second base station of said three different base stations and uses the remaining one of said direct wave candidates corresponding to a third base station as a variable to create a combination of said direct radio wave candidates, and performs a positioning calculation using said combination to derive a rough position of said mobile station and a positioning error of each rough position for each said combination, and derives said direct wave candidate corresponding to a minimal positioning error of the positioning errors calculated for each said combination as a received signal corresponding to a direct wave arriving at said mobile station from said third base station;

said direct wave deriving part performs second direct wave derivation processing, wherein said direct wave deriving part fixes said direct wave candidate derived as the received signal corresponding to the direct wave arriving from said third base station and said one direct wave candidate selected from said direct wave candidates corresponding to said first base station in the first direct wave derivation processing, and uses said direct wave candidate corresponding to said second base station as a variable to create a combination of said direct radio wave candidates, and performs a positioning calculation using said combination to derive a second rough position of said mobile station for each said combination and a positioning error of each second rough position, and derives said direct wave candidate corresponding to a minimal positioning error of the positioning errors calculated second time as a received signal corresponding to a direct wave arriving at said mobile station from said second base station;

said direct wave deriving part performs third direct wave derivation processing, wherein said direct wave deriving part fixes said direct wave candidate derived as a received signal corresponding to a direct wave arriving from said third base station in the first direct wave derivation processing, and said direct wave candidate derived as the received signal corresponding to the direct wave arriving from said second base station in the second direct wave derivation processing, and uses said direct wave candidate corresponding to said first base station as a variable to create a combination of said direct wave candidates, and performs a positioning calculation using said combination to derive a third rough position of said mobile station and a positioning error of each third rough position, and derives said direct wave candidate corresponding to a minimal positioning error of said positioning errors calculated the third time as a received signal corresponding to a direct wave arriving at said mobile station from said first base station; and said position calculating part determines the current position of said mobile station using the three received signals corresponding to the respective direct waves from said three different base stations, and the positions of said three different base stations derived by said first through third direct wave derivation processing.

10. A positioning apparatus according to claim 1, wherein:

said direct wave candidate extracting part and said direct wave candidate estimating part extract and estimate one or more each of direct wave candidate and modified direct wave candidate for each of radio waves arriving at said mobile station from at least three different base stations;

said direct wave deriving part selects one of said extracted and estimated direct wave candidates for each base station and combines the selected direct wave candidates to create a plurality of combinations each comprised of said direct wave candidates for each base station, calculates a rough position of said mobile station and a positioning error of each rough position using said plurality of combinations, and derives said direct wave candidate included in said combination which exhibits the smallest positioning error, as a received signal corresponding to a direct wave arriving at said mobile station from each base station; and said positioning calculating part determines the current position of said mobile station using the received signal corresponding to the direct wave arriving from said each base station derived by said direct wave deriving part, and the position of said each base station.

11. A positioning apparatus according to claim 2, wherein:

said direct wave candidate extracting part and said direct wave candidate estimating part extract and estimate one or more each of direct wave candidate and modified direct wave candidate for each of radio waves arriving at at least three different base stations from said mobile station;

said direct wave deriving part performs first direct wave derivation processing, wherein said direct wave deriving part fixes two of said direct wave candidates selected one by one for each base station from said extracted and estimated direct wave candidates corresponding to a first and a second base station of said three different base stations and uses the remaining one of said direct wave candidates corresponding to a third base station as a variable to create a combination of said direct radio wave candidates, and performs a positioning calculation using said combination to derive a rough position of said mobile station and a positioning error of each rough position for each said combination, and derives said direct wave candidate corresponding to a minimal positioning error of the positioning errors calculated for each said combination as a received signal corresponding to a direct wave arriving at said third base station from said mobile station;

said direct wave deriving part performs second direct wave derivation processing, wherein said direct wave deriving part fixes said direct wave candidate derived as the received signal corresponding to the direct wave arriving at said third base station and said one direct wave candidate selected from said direct wave candidates corresponding to said first base station in the first direct wave derivation processing, and uses said direct wave candidate corresponding to said second base station as a variable to create a combination of said direct radio wave candidates, and performs a positioning calculation using said combination to derive a second rough position of said mobile station for each said combination and a positioning error of each second rough position, and derives said direct wave candidate corresponding to a minimal positioning error of the positioning errors calculated second time as a received signal corresponding to a direct wave arriving at said second base station from said mobile station;

said direct wave deriving part performs third direct wave derivation processing, wherein said direct wave deriving part fixes said direct wave candidate derived as a received signal corresponding to a direct wave arriving at said third base station in the first direct wave derivation processing, and said direct wave candidate derived as the received signal corresponding to the direct wave arriving at said second base station in the second direct wave derivation processing, and uses said direct wave candidate corresponding to said first base station as a variable to create a combination of said direct wave candidates, and performs a positioning calculation using said combination to derive a third rough position of said mobile station and a positioning error of each third rough position, and derives said direct wave candidate corresponding to a minimal positioning error of said positioning errors calculated the third time as a received signal corresponding to a direct wave arriving fat said first base station from said mobile station; and said position calculating part determines the current position of said mobile station using the three received signals corresponding to the respective direct waves from said mobile station to said three different base stations, and the positions of said three different base stations derived by said first through third direct wave derivation processing.

12. A positioning apparatus according to claim 2, wherein:

said direct wave candidate extracting part and said direct wave candidate estimating part extract and estimate one or more each of direct wave candidate and modified direct wave candidate for each of radio waves arriving at at least three different base stations from said mobile station;

said direct wave deriving part selects one of said extracted and estimated direct wave candidates for each base station and combines the selected direct wave candidates to create a plurality of combinations each comprised of said direct wave candidates for each base station, calculates a rough position of said mobile station and a positioning error of each rough position using said plurality of combinations, and derives said direct wave candidate included in said combination which exhibits the smallest positioning error, as a received signal corresponding to a direct wave arriving at each base station from said mobile station; and said positioning calculating part determines the current position of said mobile station using the received signal corresponding to the direct wave arriving at said each base station derived by said direct wave deriving part, and the position of said each base station.

13. A positioning method for determining a current position of a mobile station located in a communication area utilizing radio waves arriving from a plurality of base stations installed in said communication area, method comprising:

a first step of receiving radio waves arriving from said plurality of base stations to generate a received signal in accordance with each received radio wave;

a second step of extracting at least one or more direct wave candidate for each base station from the respective radio waves arriving from said plurality of base stations based on said received signals;

a third step of performing predetermined error correction processing on a direct wave candidate extracted in said second step to estimate at least one or more corrected direct wave candidate;

a fourth step of deriving a received signal corresponding to a true direct wave using at least one or more direct wave candidate for each base station within the direct wave candidates and corrected direct wave candidate extracted and estimated in said second step and said third step; and a fifth step of determining the current position of said mobile station based on the received signal corresponding to the true direct wave derived in said fourth step.

14. A positioning method for determining a current position of a mobile station utilizing a radio wave emitted from said mobile station located in a communication area and arriving at a plurality of base stations installed in said communication area, said positioning method, comprising:

a first step of receiving a radio wave arriving from said mobile station to generate a received signal in accordance with each received radio wave;

a second step of extracting at least one or more direct wave candidate for each base station from each radio wave arriving at each of said plurality of base stations based on said received signal;

a third step of performing predetermined error correction processing on the direct wave candidate extracted in said second step to estimate at least one or more corrected direct wave candidate;

a fourth step of deriving a received signal corresponding to a true direct wave using at least one or more direct wave candidate for each base station within the direct wave candidates and corrected direct wave candidate extracted and estimated in said second step and said third step; and a fifth step of determining the current position of said mobile station based on the received signal corresponding to the true direct wave derived in said fourth step.

15. A positioning method according to claim 13, wherein said mobile station performs a position registration with said plurality of base stations, wherein said mobile station acquires installation environment information related to each base station from said base station to determine an environment in which said base station is installed based on said information, and conducts a predetermined control on the estimation of direct wave candidate for said third step in accordance with the result of determination on said installation environment.

16. A positioning method according to claim 15, wherein said mobile station performs said error correction processing in said third step to estimate a direct wave when said installation environment is bad as a radio wave propagation environment, and said mobile station controls to stop said third step when said installation environment is good as a radio wave propagation environment.

17. A positioning method according to claim 13, wherein said mobile station previously stores a predetermined error correction coefficient, and said third step includes, for estimating a direct wave, performing predetermined error correction calculation related to a radio wave propagation on the direct wave candidate extracted in said second step based on said error correction coefficient to estimate at least one corrected direct wave candidate.

18. A positioning method according to claim 13, wherein:

each of said plurality of base stations stores at least one or more error correction coefficient related to a radio wave propagation, previously calculated from the installation environment of each base station;

said mobile station acquires said error correction coefficient related to each base station from said base station when said mobile station performs a position registration with said plurality of base stations, or communicates with said plurality of base stations; and said third step includes performing predetermined error correction calculation related to the radio wave propagation on the direct wave candidate extracted in said second based on the acquired error correction coefficients, when said error correction processing is performed, to estimate at least one or more corrected direct wave candidate.

19. A positioning method according to claim 14, wherein:

each of said plurality of base stations stores at least one or more error correction coefficient related to a radio wave propagation situation previously calculated from an installation environment of each base station; and said third step includes performing a predetermined error correction calculation related to a radio wave propagation for the direct wave candidate extracted in said second step based on said error correction coefficient, when said error correction processing is performed, to estimate at least one or more corrected direct wave candidate.

20. A positioning method according to claim 18, wherein said error correction coefficient is calculated by a predetermined statistical calculation processing based on a measurement result of the radio wave propagation situation in a communication area of each base station.

21. A positioning method according to claim 13, wherein:

said second and third steps include extracting and estimating one or more each of direct wave candidate and modified direct wave candidate for each of radio waves arriving at said mobile station from at least three different base stations;

said fourth step includes:

first direct wave derivation processing including fixing two of said direct wave candidates selected one by one for each base station from said extracted and estimated direct wave candidates corresponding to a first and a second base station of said three different base stations and using the remaining one of said direct wave candidates corresponding to a third base station as a variable to create a combination of said direct radio wave candidates, and performing a positioning calculation using said combination to derive a rough position of said mobile station and a positioning error of each rough position for each said combination, and deriving said direct wave candidate corresponding to a minimal positioning error of the positioning errors calculated for each said combination as a received signal corresponding to a direct wave arriving at said mobile station from said third base station;

second direct wave derivation processing including fixing said direct wave candidate derived as the received signal corresponding to the direct wave arriving from said third base station and said one direct wave candidate selected from said direct wave candidates corresponding to said first base station in the first direct wave derivation processing, and using said direct wave candidate corresponding to said second base station as a variable to create a combination of said direct radio wave candidates, and performing a positioning calculation using said combination to derive a second rough position of said mobile station for each said combination and a positioning error of each second rough position, and deriving said direct wave candidate corresponding to a minimal positioning error of the positioning errors calculated second time as a received signal corresponding to a direct wave arriving at said mobile station from said second base station; and third direct wave derivation processing including fixing said direct wave candidate derived as a received signal corresponding to a direct wave arriving from said third base station in the first direct wave derivation processing, and said direct wave candidate derived as the received signal corresponding to the direct wave arriving from said second base station in the second direct wave derivation processing, and using said direct wave candidate corresponding to said first base station as a variable to create a combination of said direct wave candidates, and performing a positioning calculation using said combination to derive a third rough position of said mobile station and a positioning error of each third rough position, and deriving said direct wave candidate corresponding to a minimal positioning error of said positioning errors calculated the third time as a received signal corresponding to a direct wave arriving at said mobile station from said first base station; and said fifth step includes determining the current position of said mobile station using the three received signals corresponding to the respective direct waves from said three different base stations, and the positions of said three different base stations derived by said first through third direct wave derivation processing.

22. A positioning method according to claim 13, wherein:

said second step and said third step includes extracting and estimating one or more each of direct wave candidate and modified direct wave candidate for each of radio waves arriving at said mobile station from at least three different base stations;

said fourth step includes selecting one of said extracted and estimated direct wave candidates for each base station and combines the selected direct wave candidates to create a plurality of combinations each comprised of said direct wave candidates for each base station, calculating a rough position of said mobile station and a positioning error of each rough position using said plurality of combinations, and deriving said direct wave candidate included in said combination which exhibits the smallest positioning error, as a received signal corresponding to a direct wave arriving at said mobile station from each base station; and said fifth step includes determining the current position of said mobile station using the received signal corresponding to the direct wave arriving from said each base station derived in said fourth step, and the position of said each base station.

23. A positioning method according to claim 14, wherein:

said second and third steps include extracting and estimating one or more each of direct wave candidate and modified direct wave candidate for each of radio waves arriving at at least three different base stations from said mobile station;

said fourth step includes:

first direct wave derivation processing including fixing two of said direct wave candidates selected one by one for each base station from said extracted and estimated direct wave candidates corresponding to a first and a second base station of said three different base stations and using the remaining one of said direct wave candidates corresponding to a third base station as a variable to create a combination of said direct radio wave candidates, and performing a positioning calculation using said combination to derive a rough position of said mobile station and a positioning error of each rough position for each said combination, and deriving said direct wave candidate corresponding to a minimal positioning error of the positioning errors calculated for each said combination as a received signal corresponding to a direct wave arriving at said third base station from said mobile station;

second direct wave derivation processing including fixing said direct wave candidate derived as the received signal corresponding to the direct wave arriving at said third base station and said one direct wave candidate selected from said direct wave candidates corresponding to said first base station in the first direct wave derivation processing, and using said direct wave candidate corresponding to said second base station as a variable to create a combination of said direct radio wave candidates, and performing a positioning calculation using said combination to derive a second rough position of said mobile station for each said combination and a positioning error of each second rough position, and deriving said direct wave candidate corresponding to a minimal positioning error of the positioning errors calculated second time as a received signal corresponding to a direct wave arriving at said second base station from said mobile station;

third direct wave derivation processing including fixing said direct wave candidate derived as a received signal corresponding to a direct wave arriving at said third base station in the first direct wave derivation processing, and said direct wave candidate derived as the received signal corresponding to the direct wave arriving at said second base station in the second direct wave derivation processing, and using said direct wave candidate corresponding to said first base station as a variable to create a combination of said direct wave candidates, and performing a positioning calculation using said combination to derive a third rough position of said mobile station and a positioning error of each third rough position, and deriving said direct wave candidate corresponding to a minimal positioning error of said positioning errors calculated the third time as a received signal corresponding to a direct wave arriving at said first base station from said mobile station; and said fifth step includes determining the current position of said mobile station using the three received signals corresponding to the respective direct waves from said mobile station to said three different base stations, and the positions of said three different base stations derived by said first through third direct wave derivation processing.

24. A positioning method according to claim 14, wherein:

said second and third steps include extracting and estimating one or more each of direct wave candidate and modified direct wave candidate for each of radio waves arriving at at least three different base stations from said mobile station;

said fourth step includes selecting one of said extracted and estimated direct wave candidates for each base station and combines the selected direct wave candidates to create a plurality of combinations each comprised of said direct wave candidates for each base station, calculating a rough position of said mobile station and a positioning error of each rough position using said plurality of combinations, and deriving said direct wave candidate included in said combination which exhibits the smallest positioning error, as a received signal corresponding to a direct wave arriving at each base station from said mobile station; and said fifth step includes determining the current position of said mobile station using the received signal corresponding to the direct wave arriving from said each base station derived in said fourth step, and the position of said each base station.

25. A positioning system for determining a current position of a mobile station located in a communication area in which a plurality of base stations are installed, wherein:

said mobile station comprises:

a received signal generating part which receives radio waves arriving from said plurality of base stations to generate a received signal in accordance with each received radio wave;

a direct wave candidate extracting part which extracts at least one or more direct wave candidate for each base station from the respective radio waves arriving from said plurality of base stations based on said received signals;

a direct wave candidate estimating part which performs predetermined error correction processing on a direct wave candidate extracted by said direct wave candidate extracting part to estimate at least one or more corrected direct wave candidate;

a direct wave deriving part which derives a received signal corresponding to a true direct wave using at least one or more direct wave candidate for each base station within a plurality of direct wave candidates extracted and estimated in said direct wave candidate extracting part and said direct wave candidate estimating part; and a positioning calculating part which determines the current position of said mobile station based on the received signal derived by said direct wave deriving part, wherein the current position of said mobile station is determined in said mobile station utilizing radio waves arriving at said mobile station from a plurality of base stations installed in said communication area.

26. A positioning system for determining a current position of a mobile station located in a communication area in which a plurality of base stations are installed, said system comprising:

a received signal generating part provided in each of said plurality of base stations which receives a radio wave arriving from said mobile station to generate a received signal in accordance with each received radio wave;

a direct wave candidate extracting part which extracts at least one or more direct wave candidate for each base station from each radio wave arriving at each of said plurality of base stations based on said received signal;

a direct wave candidate estimating part which performs predetermined error correction processing on the direct wave candidate extracted by said direct wave candidate extracting part to estimate at least one or more corrected direct wave candidate;

a direct wave deriving part which derives a received signal corresponding to a true direct wave using at least one or more direct wave candidate for each base station within a plurality of direct wave candidates extracted and estimated in said direct wave candidate extracting part and said direct wave candidate estimating part; and a positioning calculating part which determines the current position of said mobile station based on the received signal derived by said direct wave deriving part, wherein the current position of said mobile station is determined in a base station, utilizing a radio wave emitted from said mobile station and arriving at said plurality of base stations.

27. A positioning apparatus according to claim 7, wherein said error correction coefficient is calculated by a predetermined statistical calculation processing based on a measurement result of the radio wave propagation situation in a communication area of each base station.

28. A positioning method according to claim 19, wherein said error correction coefficient is calculated by a predetermined statistical calculation processing based on a measurement result of the radio wave propagation situation in a communication area of each base station.

* * * * *